(12) United States Patent
Al-Herz et al.

(10) Patent No.: US 7,958,057 B2
(45) Date of Patent: *Jun. 7, 2011

(54) VIRTUAL ACCOUNT BASED NEW DIGITAL CASH PROTOCOLS WITH COMBINED BLIND DIGITAL SIGNATURE AND PSEUDONYM AUTHENTICATION

(75) Inventors: Ahmed Ibrahim Al-Herz, Los Angeles, CA (US); Mohammad K. Ibrahim, Leicester (GB)

(73) Assignee: King Fahd University of Petroleum and Minerals, Dhahran (SA)

( * ) Notice: Subject to any disclaimer, the term of this patent is extended or adjusted under 35 U.S.C. 154(b) by 379 days.

This patent is subject to a terminal disclaimer.

(21) Appl. No.: 11/692,210

(22) Filed: Mar. 28, 2007

(65) Prior Publication Data
US 2008/0243703 A1    Oct. 2, 2008

(51) Int. Cl.
*G06Q 20/00* (2006.01)
(52) U.S. Cl. .......................................... 705/69
(58) Field of Classification Search .................. 705/69
See application file for complete search history.

(56) References Cited

U.S. PATENT DOCUMENTS

| | | | | | |
|---|---|---|---|---|---|
| 4,914,698 | A | * | 4/1990 | Chaum | 380/30 |
| 4,926,480 | A | * | 5/1990 | Chaum | 705/69 |
| 4,947,430 | A | * | 8/1990 | Chaum | 713/180 |
| 5,521,980 | A | * | 5/1996 | Brands | 380/30 |
| 5,606,617 | A | * | 2/1997 | Brands | 380/30 |
| 5,666,416 | A | * | 9/1997 | Micali | 713/158 |
| 5,768,385 | A | * | 6/1998 | Simon | 705/69 |
| 5,812,670 | A | * | 9/1998 | Micali | 705/74 |
| 5,901,229 | A | * | 5/1999 | Fujisaki et al. | 380/30 |
| 6,076,078 | A | * | 6/2000 | Camp et al. | 705/65 |
| 6,266,704 | B1 | * | 7/2001 | Reed et al. | 709/238 |
| 6,411,942 | B1 | * | 6/2002 | Fujimoto | 705/64 |
| 6,976,162 | B1 | * | 12/2005 | Ellison et al. | 713/156 |
| 7,162,639 | B1 | * | 1/2007 | Bleumer | 713/180 |
| 7,716,484 | B1 | * | 5/2010 | Kaliski, Jr. | 713/176 |
| 2001/0049667 | A1 | * | 12/2001 | Moribatake et al. | 705/69 |
| 2002/0073318 | A1 | * | 6/2002 | Gennaro et al. | 713/176 |
| 2003/0041035 | A1 | * | 2/2003 | Ebata et al. | 705/64 |

(Continued)

OTHER PUBLICATIONS

Menezes, A., van Oorschot, P.C., & Vanstone, S.A. Handbook of Applied Cryptography, 1997, CRC Press LLC, pp. 559-561.*

(Continued)

*Primary Examiner* — Andrew J. Fischer
*Assistant Examiner* — Calvin K Cheung
(74) *Attorney, Agent, or Firm* — Lowe Hauptman Ham & Berner, LLP

(57) ABSTRACT

Virtual account based digital cash protocols use a combination of blind digital signatures and pseudonym authentication with at least two pairs of public and private keys. A user is provided with one master pair of private and public keys and as many pseudonym pairs of private and public keys as desired. The resulting virtual account based hybrid protocols combine the advantages of blind digital signature and pseudonym authentication. Blind digital signatures based on the master pair of keys are used to withdraw digital cash from the user's bank account under the user's real identity. A pseudonym pair of keys is used for converting digital cash into virtual account based digital cash by a digital cash issuer. All pseudonyms can be used for spending the virtual account based digital cash. These protocols ensure anonymity when withdrawing digital cash from the user's account under the user's real identity in addition to providing pseudonym authentication when spending virtual cash based digital cash under a pseudonym.

3 Claims, 51 Drawing Sheets

U.S. PATENT DOCUMENTS

2004/0111365 A1\* 6/2004 Hong .............................. 705/39
2005/0005125 A1\* 1/2005 Zhang et al. .................. 713/176
2005/0081038 A1\* 4/2005 Arditti Modiano et al. .. 713/176

OTHER PUBLICATIONS

Brown et. al. "Project eWallet" All pages. Retrieved Aug. 30, 2010. <http://www.cs.utah.edu/~bbrown/cs4500/eWalletFinal.pdf>.\*

"Digital Cash" All pages. Retrieved Aug. 30, 2010. <http://www.cs.bham.ac.uk/~mdr/teaching/modules06/netsec/lectures/DigitalCash.html>.\*

Tewari et. al. "Reusable Off-line Electronic Cash Using Secret Splitting" All pages. Retrieved Aug. 30, 2010. <http://www.scss.tcd.ie/publications/tech-reports/reports.98/TCD-CS-1998-27.pdf>.\*

Chaum et. al. "Untraceable Electronic Cash" All pages. Retrieved Aug. 30, 2010. <http://people.dsv.su.se/~matei/courses/IK2001_SJE/Chaum90.pdf>.\*

\* cited by examiner

VIRTUAL ACCOUNT BASED NEW DIGITAL CASH PROTOCOLS WITH COMBINED BLIND DIGITAL SIGNATURE AND PSEUDONYM AUTHENTICATION

TECHNICAL FIELD

This invention relates to digital cash, and more specifically to digital cash based on virtual accounts using more than one user public key.

BACKGROUND

In the near future digital cash will come into wider use and it is expected that people will use the Internet to make digital cash payments for their purchases. Electronic transactions should be convenient, reliable, accurate, and resistant to fraud. Certain electronic transactions also should protect the privacy of payees. For example, a customer purchasing a service from a vendor over a network should be able to pay for the service in an electronic transaction without revealing their identity.

Some schemes using on-line banking may prevent double spending by checking each coin against reuse during the time of payment on-line rather than detecting double spending afterwards. However, on-line banking is obviously not suitable for micro-payments of the average consumer. Banks are too few compared with the vast number of small cash transactions that would need to be processed if average consumer transactions were to be supported. Processing on-line requests for such transactions will result in banks becoming serious bottlenecks to handle these transactions.

Blind signature systems that use off-line digital cash techniques have high system complexity. In some other conventional techniques, a coin has a data size that is too big to be economically used since the coin contains a large number of challenge terms to detect cheating. In addition, some techniques also require using complex challenge-response interactions between the payer and payee for each coin spent. Again, such complex schemes are also not suitable for micro payments.

Some systems have implemented digital coins that are both secure (in the bank's interest) and afford a heightened assurance of consumer privacy by providing some anonymity to users with respect to both merchants and banks. Informally, a digital cash scheme is referred to as unconditionally blind or anonymous if the bank that issues a coin is unable to determine, either at the time of withdrawal or later upon examining circulating or deposited coins, which coin was withdrawn by which user. In a unconditionally blind scheme, the user can withdraw money from the bank, spend it at a merchant, and be confident that when the merchant deposits the money at the bank, the bank will not be able to recognize the money as the same cash given to the user.

However, researchers have observed that unconditional anonymity in payment systems might be exploited to facilitate crimes like blackmail. In addition, there is a fear that such schemes of unconditional anonymity may be abused to perfect crimes of money laundering and kidnapping because this system can make the flow of cash completely untraceable. This observation has spurred research into the idea of making anonymity in payment systems conditional, and, in particular, revocable by a third party. This notion is referred to as a trustee-based coin tracing.

One trustee-based tracing scheme is based on a blind Schnorr-like signature scheme that involves use of interactive proofs between trustees and the bank. Another trustee-based tracing scheme is based on blind RSA signatures, but makes use of a cut-and-choose protocol that results in a scheme that is flexible. Although this scheme may be somewhat flexible, it has rather large coin sizes and computational requirements.

According to another scheme that makes use of a blind signature, a user requests a pseudonym and registration information from a trustee. The user presents this registration information to the bank, and incorporates the information into the coins that are withdrawn.

Another scheme makes use of blind DSS signatures. In this scheme, signing and anonymity revocation may be conducted by differing quorums of trustees. However, the scheme is implemented on-line only and is rather computationally intensive for most operations.

A slightly different approach to trustee-based tracing is a system based on blind Schnorr signatures in which a user transfers finds from a non-anonymous to an anonymous account where a trustee is capable of linking the two accounts. The chief disadvantage of this approach is that once the two accounts are linked, anonymity is eliminated.

Another approach is based on blind Schnorr signatures in which the trustee is off-line. This system is complex and involves well over a dozen modular exponentiations by the user at each coin withdrawal. Later developments have reduced the computational required in the withdrawal protocol, as well as the database search requirements in owner tracing. However, the withdrawal protocol still requires over a dozen modular exponentiations on the part of the user.

The use of blinding alone that protects the anonymity of the customer is not sufficient to safeguard against certain types of fraud. For example, a customer can submit a blinded nonce (a nonce is a piece of data that, for practical purposes, is used only once, for example, a random number) to the certification authority along with $20, receive the blinded certificate, un-blind it, and then submit the un-blinded certificate as being worth $100. This is possible because the certification authority never really sees the actual certificate it is signing because of the blinding factor. Thus, although blinding alone protects privacy, it does not by itself provide adequate reliability against fraud and misuse.

Another problem of blind signature it is a homomorphism, i.e., $Sign(kx)=Sign(k)Sign(x)$. It is possible to create pairs r, $Sign(r)$ for a random message r. More precisely, anyone can choose $Sign(r)$ at random and then compute r as the function $Sign-1$ which is known publicly. The basic idea is as follows. Customer C chooses a message x which is going to be the coin. C also generates a pair, k and $Sign(k)$, for a random number k. C sends the product kx to a bank B which computes $Sign(kx)$. B then sends $Sign(kx)$ to C, using, for instance, a public encryption scheme provided by C (using some session key exchanged between C and B using a Diffie-Hellman session) or some other form of communication (e.g., delivery on a diskette transported by an armored carrier). C may then compute $Sign(x)$ by dividing $Sign(kx)$ by $Sign(k)$. The pair $(x, Sign(x))$ is now redeemable by B at a value usually determined by the signature being used, and B cannot recognize C when some payee P presents $(x, Sign(x))$ (since the knowledge of kx does not allow practical recognition of x nor of $Sign(x)$).

A problem with this approach is that a signature scheme with such properties is not secure. This scheme provides that (1) it is easy to forge signatures on random messages, and (2) after seeing the signatures on two messages x1 and x2, it is easy to compute the signature on the message $x=x1x2$. In order to overcome this problem, valid messages are required to have a special "structure" (e.g., the message x must be encoded using the PKCS#1 standard for digital signature).

The hope is that messages with this structure are sparse and hard to forge even given properties (1) and (2) (since messages with that structure will not appear with a significant probability). However, this is simply a hope and is not a proven mathematical property of the signature scheme or of the encoding. The drawback is that it may be possible to discover an algorithm to forge messages even when we restrict them to this structured sparse set.

Schemes that use virtual accounts have several problems. For example, some virtual accounts do not provide adequate privacy of the user, while others are complex requiring a blind signature to protect the privacy of the user. Still other embodiments have the bank storing encrypted pseudonym corresponding to the user identification which makes linking identity to the pseudonym easy either by cooperation or leakage of the secret key of the issuer. Accordingly, the privacy of all users can be catastrophically destroyed. In addition, there is a problem of proving the ownership of the user identity between the user and the bank.

SUMMARY

In one general aspect, a method of providing virtual account based digital cash includes providing a user with at least two pairs of keys including a master pair having a private and a public key and at least a pseudonym pair having a private and public key; blinding digital signatures based on the master pair of keys for withdrawal of digital cash from a bank account of the user associate with a real identity of the user; converting digital cash into virtual account based digital cash from a digital cash issuer using the pseudonym pair or keys; and spending the digital cash from the virtual account using the pseudonym pair of keys.

In addition, a license may be issued from a certificate authority for the pseudonym public key in response to a request that is signed by the master secret key of the user. The identity of the pseudonym public key may be revealed by the certificate authority when there is misuse of the digital cash or fraud.

A user identification and a certified master public key may be associated in the bank account to authenticate a user.

The issuer of digital cash may register the user known under one or more pseudonyms, in addition to issuing a digital cash virtual account to the registered user; and storing information related to the issued digital cash virtual account.

A certificate authority may certify the pseudonym public key of the user given a master public key and identification of the user. The user may have one pair of master keys and a plurality of pairs of pseudonym keys where each pubic key is certified by a certifying authority using separate certificates.

In another general aspect, a method for implementing digital cash for a user having two pairs of user keys, one pair linked to the real identity of the user including a master public key and a master secret key, and a second pair linked to the pseudonym identity of the user including a pseudonym public key and a pseudonym secret key. The method includes registering by the user the master public key and pseudonym public key with a certificate authority; obtaining separate certificates for both keys that are signed by the certificate authority; sending the pseudonym public key and its certificate to an issuer of digital cash virtual accounts for registration of a user account; opening by the issuer of digital cash virtual accounts a virtual account associated with the pseudonym identity; and sending to the user a pseudonym public key certificate that is signed by a private key of the issuer of digital cash virtual accounts and encrypted with the pseudonym public key.

An account of the user at a bank may be decremented corresponding to a requested amount of money, in addition to using public key cryptography and a blind digital signature protocol to obtain a blinded digital cash voucher from the bank corresponding to the requested amount of money; sending the digital cash voucher to the digital cash issuer together under the registered pseudonym pair of keys; authenticating by the issuer of digital cash the digital cash voucher with the bank; and crediting the virtual account under the pseudonym with the amount of the voucher.

The method also may include encrypting using pseudonym public key by the issuer of digital cash virtual accounts information about the user's digital cash virtual account under the user's pseudonym public key; and sending by the issuer of digital cash virtual accounts the information to the user together with a digital signature of the information using the public key of the issuer of digital cash virtual accounts. Encrypting the information may include encrypting using a private key of the issuer of digital cash virtual accounts a digital cash amount added, a balance of the virtual account, a random number, and a digital signature for all information in the digital cash virtual account.

The method may further includes decrypting by the user the information about the digital cash virtual account using the pseudonym private key; and authenticating the digital cash virtual account using the public key of the issuer of digital cash virtual accounts.

An amount of digital cash and the user's pseudonym public key may be sent to the shop at the time of payment. Sending payment may include sending information encrypted using a private key of the issuer of digital cash virtual accounts with the shop's public key wherein the information includes the digital cash amount, a random number, and a digital signature for the information. Once sent, the validity of a digital cash virtual account may be verified using the public key of the issuer of digital cash virtual accounts, in addition to sending a challenge to the user; signing by the user the challenge using the pseudonym private key; sending the signed challenged to the shop; sending by the shop digital cash virtual account and the challenge to the issuer of digital cash virtual accounts for verification; and sending by the issuer of digital cash virtual accounts the shop id and the amount to a bank of the shop for settlement.

Other features will be apparent from the description, the drawings, and the claims.

DESCRIPTION OF DRAWINGS

Like reference symbols in the various drawings indicate like elements.

DETAILED DESCRIPTION

Overview

Figure 1:
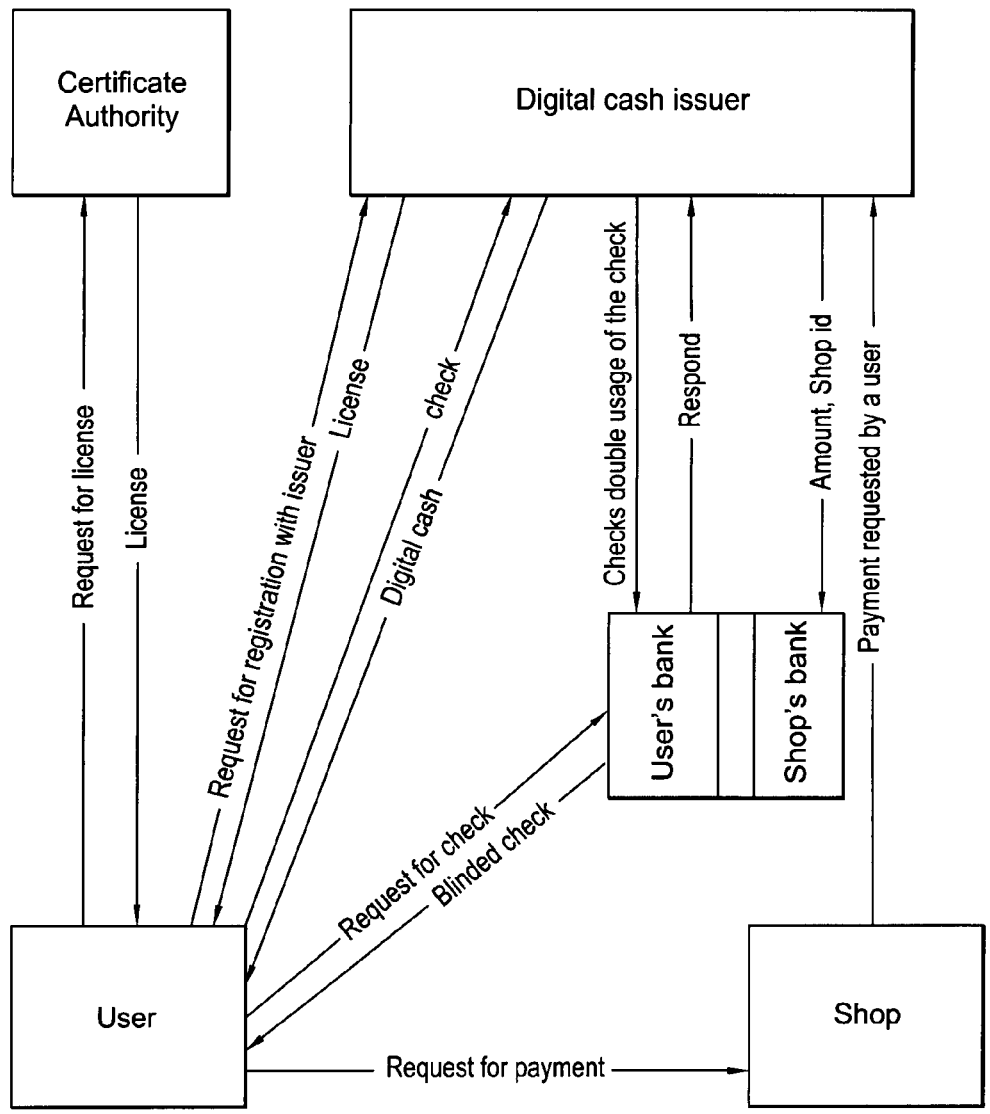
FIG. 1 is an exemplary system diagram for implementing the digital cash protocol.

Virtual account based digital cash protocols are described below that use a combination of blind digital signatures and pseudonym authentication with at least two pairs of public and private keys. A user is provided with one master pair of private and public keys and as many pseudonym pairs of private and public keys as desired.

The resulting virtual account based hybrid protocols combine the advantages of blind digital signature and pseudonym authentication. Blind digital signatures based on the master pair of keys are used to withdraw digital cash from the user's bank account under the user's real identity. A pseudonym pair of keys is used for converting digital cash into virtual account based digital cash by a digital cash issuer. All pseudonyms can be used for spending the virtual account based digital cash. These protocols combine the advantage of ensuring anonymity when withdrawing digital cash from the user's account under the user's real identity in addition to providing the efficiency of pseudonym authentication when spending virtual cash based digital cash under a pseudonym.

The disclosed protocols utilize the following entities: (i) a certificate authority, (ii) a user's bank, (iii) issuers of digital cash, and (iv) a shop and its bank. The certificate authority stores a pseudonym public key in connection with a user id and/or a master public key. The certificate authority also issues a license for the pseudonym public key in response to a request that is signed by the master secret key of the user. The certificate authority reveals the identity of the owner of a pseudonym public key only if there is misuse of digital cash or frauds.

The user's bank stores the user's account in connection with the user identification and the certified user's maser public key (which may be used to authenticate a user).

The issuer of digital cash stores each registered user known under one or more pseudonyms, issues digital cash virtual accounts, and stores information related to the issued digital cash virtual accounts. The type of stored information about a digital virtual account differs depending on whether traceable or untraceable digital cash is being issued, as described below.

Most of the conventional virtual account digital cash protocols use either blind digital signatures or pseudonym based authentication. Digital cash protocols based on blind signatures suffer from low efficiency and high overhead associated with authentication, and digital cash protocols based on pseudonym authentication do not provide suitable user privacy.

The virtual account based digital cash implementation described below provides strong protection of user's privacy, an authenticated protocol, traceability, and efficiency of computation. The disclosed protocols provide strong protection of privacy for the user by separating withdrawal of digital cash from the bank accounts of the user (which are associated with the real identity of the user) from the depositing and expenditure of digital cash. There is no link between the information about the digital cash withdrawn using the master pair of keys of the user and the digital cash deposited and spent under the pseudonyms of the same user. In addition, there is no link between the different pseudonyms of the same user. Therefore, there is no link between the real identity of the user and the user's pseudonyms, or between the different pseudonyms of the same user. The only exception is the certificate authority which certifies a pseudonym public key of a user given a user's master public key and id.

Blind digital signatures using the user's pair of master keys provides authentication of the user with an entity that holds information that is linked to the user's real identity, such as a bank. There is nothing to link the information about the user between the user's bank and an issuer of digital cash. The bank stores the user id, the amount of money, and the user's master pubic key in association with the user account information. The issuer of digital cash stores the user's pseudonym public key and the digital cash in the form of virtual accounts that are issued to a user. The separation makes it very difficult to link the real identity of the user with the user's pseudonym pubic key. Furthermore, any leak of the secret key of the bank or an issuer of digital cash is useless to break the privacy of the user. Since the user's master public key is not linked to digital cash virtual accounts and is not used for payments, the user's privacy is maintained.

The user has one pair of master keys and may have many pairs of pseudonym keys. Each pubic key is certified by a certifying authority using separate certificates. Blind digital signatures with master keys are used to authenticate the user with the bank. Digital signatures with a pair of pseudonym keys are used to authenticate a user with an issuer of digital cash and shops. Since all transactions are authenticated using digital signatures, this prevents anyone from pretending to be someone else by providing information related to the real user.

Traceability is ensured since all transactions are made with certified public keys, a certifying authority can link the master public key with a pseudonym public key, and keeping records of digital cash virtual accounts issued to/spent by a user's pseudonym public key. Since a pseudonym pair of keys is used to authenticate a user during the spending of the digital cash, the high overhead associated with conventional blind digital signatures is avoided.

As shown in FIG. 1, a system for implementing the protocols includes a number of entities, such as, for example, a user, a certificate authority, a digital cash issuer, a user bank, a shop bank, and a shop.

Each of these entities may send and receive data via any number of communications paths. Each entity may include one or more processing devices, such as, for example, a general or special-purpose computer, such as a processor, a microprocessor, a microcomputer, a personal computer ("PC"), a workstation, a mainframe, a server, a laptop, a mobile communications device/phone, a personal digital assistant ("PDA"), an on-board (i.e., vehicle-mounted) computer, or a combination of two or more of these devices capable of responding to, generating, and/or executing instructions in a defined manner. The processing device may include or be associated with any number of other devices, components, and/or peripherals, such as additional computing devices, memory/storage devices, input devices, output devices, user interfaces, and/or communications interfaces.

Each entity also may include one or more software applications including, for example, encryption decryption software, signature generating software, key generating software, random number generating software, signature verification software, in addition to other system and operating system software loaded to command and direct the processing device. Software applications may be implemented as a computer program, a piece of code, an instruction, or some combination thereof, for independently or collectively instructing the processing device to interact and operate as desired.

The applications may be embodied permanently or temporarily in any type of machine, component, physical or virtual equipment, storage medium, or propagated signal wave capable of providing instructions to the processing device. In particular, the applications may be stored on a storage medium or device including volatile and non-volatile (e.g., a read only memory (ROM), a random access memory (RAM), a flash memory, a floppy disk, a hard disk, a tape, a DROM, a filp-flop, a register, an SRAM, DRAM, PROM, EPROM, OPTROM, EEPROM, NOVRAM, or RAMBUS), such that if the storage medium or device is read by the processing device, the specified steps, processes, and/or instructions are performed.

The processing device also may include one or more communications interfaces that allow the processing device to send and receive information using the communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, switches, hubs, repeaters, and storage devices). The one or more networks may include a local area network (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths may include one or more wireless links (e.g., cellular, mobile, GSM, CDMA, TDMA, and satellite) that transmit and receive electromagnetic signals, such as, for example, radio, infrared, and microwave signals, to convey information. Because the communications paths may cover any number of networks and media, generally, they are considered unsecured.

The user may be any entity (person, group, business, government and/or organization) that requires the issuance of digital cash for use a payment to a shop. The certificate authority comprises a storage device, a signature verifying program, an encryption program, a decryption program, and a signature generating program. The user may include a processing device, a storage device, an encryption program, a decryption program, a signature verifying program and a key generating program and a signature generating program.

The digital cash issuer provides digital currency for use by the user as payment to a shop. The issuer may include a processing device, a storage device, an encryption program, a decryption program, a signature generating program, a signature verifying program, and a random number generating program.

The user's bank may include a processing device, a storage device, a signature verifying program encryption program, a decryption program, and a signature generating program.

The shop may include a processing device, a storage device, a signature verifying program encryption program, a decryption program, a signature generating program, a random number generating program and a time generating program.

Each of the exemplary embodiments, described in detail below include at least three primary procedures: a user registration procedure; a withdrawal procedure (e.g., an electronic cash issuing procedure); and a payment procedure.

In the following description PKy denotes the public key of the entity y, Sky denotes the private key of the entity y, mPKy and mSKy denotes the master public and private key of entity y respectively, pPKy and pSKy denotes the pseudonym public and private key of entity y respectively, PKy(.) indicates that the quantity between parenthesis is encrypted using the public key of entity y, Sky(.) indicates that the quantity between parenthesis is encrypted using the private key of entity y, and $[.]_{SKy}$ indicates that the quantity between square brackets is signed by the private key of entity y. The user public key PKC is known to all entities. The master public key mPKU is known to all entities. The issuer public key PKI is known to all entities. The bank's public key PKB are known to all entities. The shop public key PKS is known to all entities.

First Embodiment (1) User Registration Procedure

Figure 2:
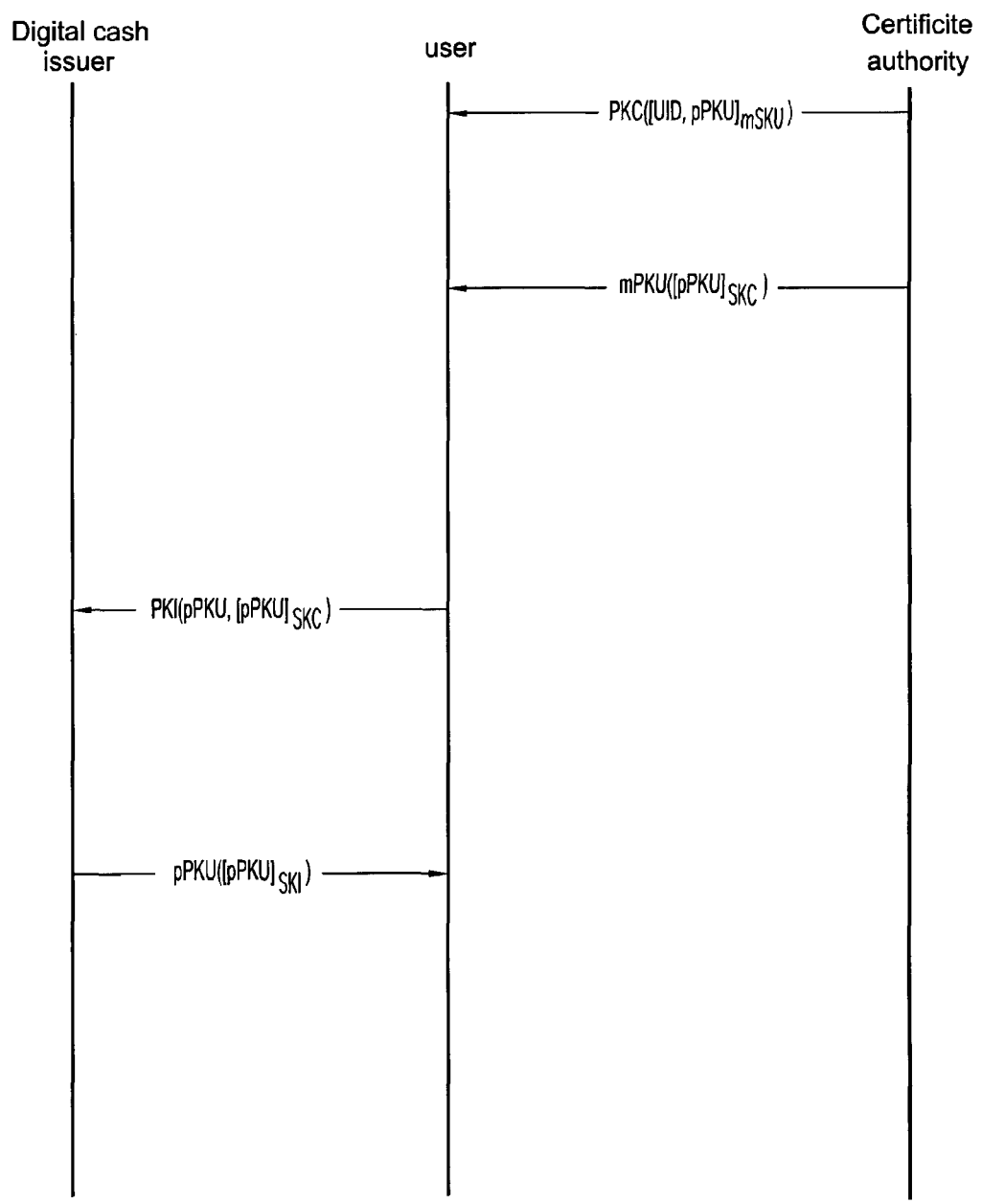
FIG. 2 is an exemplary user registration protocol according to the first embodiment.
Figure 3:
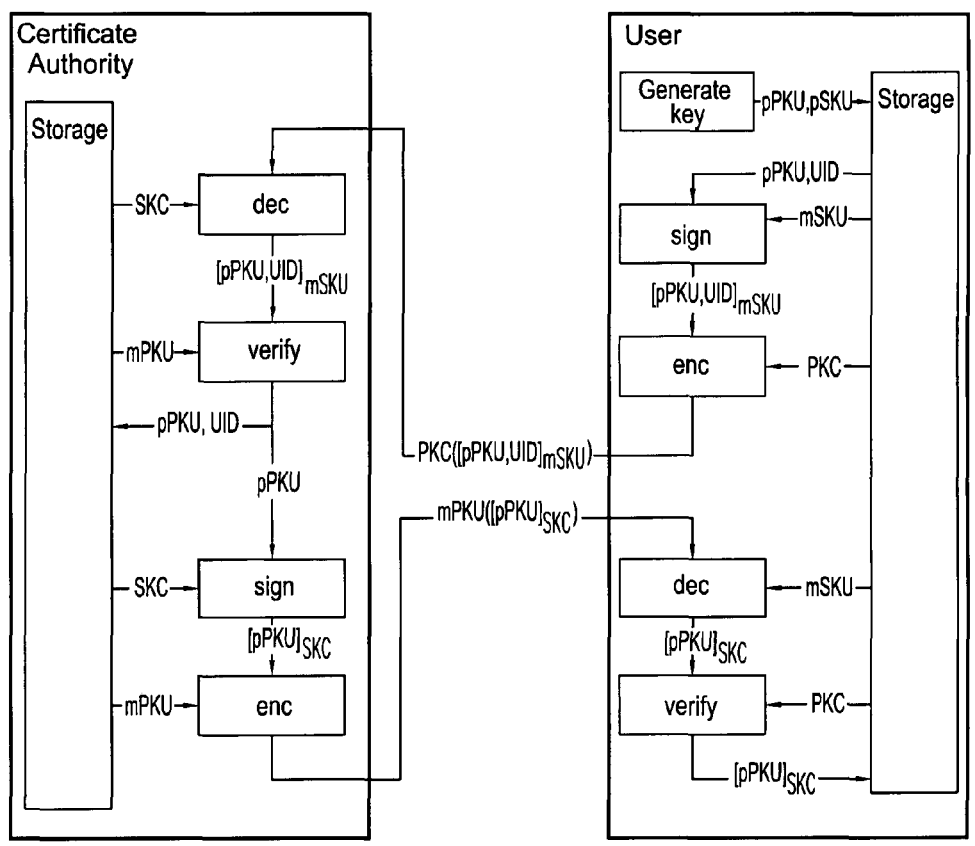
FIG. 3 is an exemplary user registration process part 1 according to the first embodiment.
Figure 4:
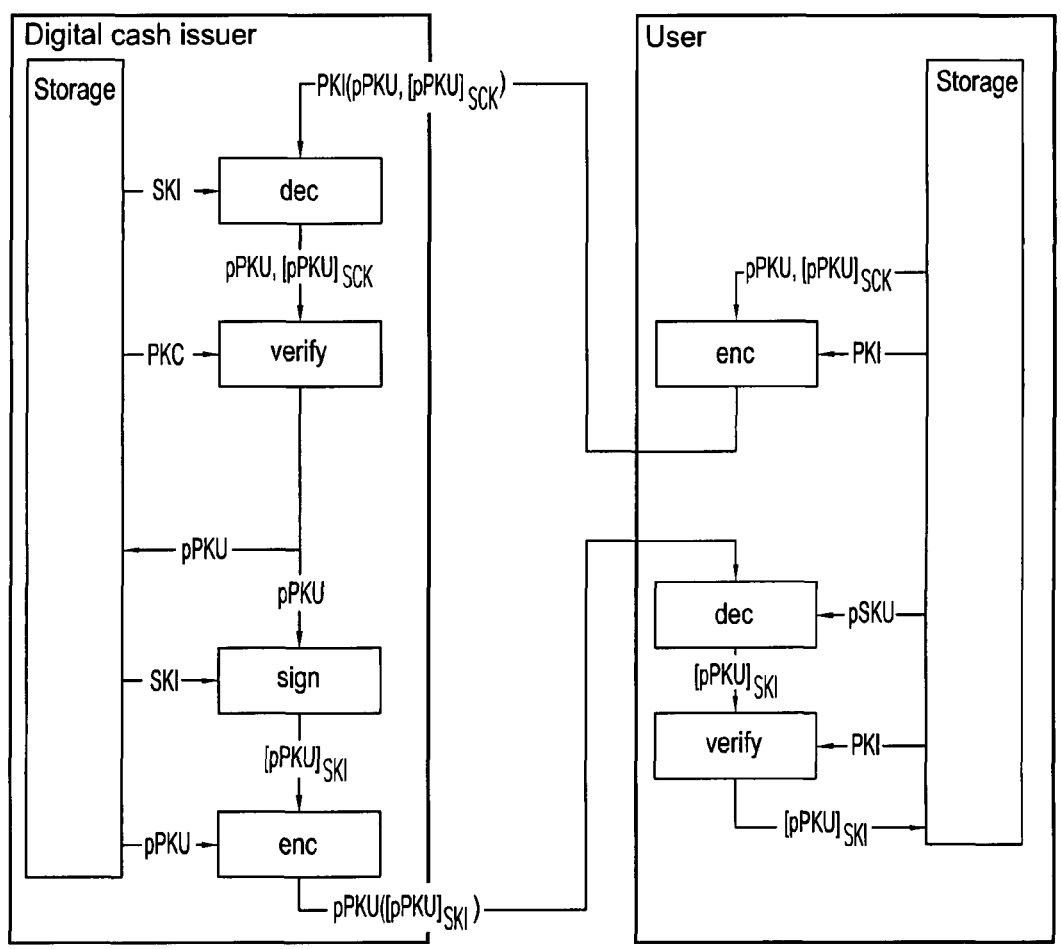
FIG. 4 is an exemplary user registration process part 2 according to the first embodiment.

FIG. 2 shows a diagrammatic representation of a registration protocol, and FIGS. 3 and 4 illustrate parts 1 and 2 of the registration process. Referring to FIG. 3, the user key generating program generates a pseudonym public key and a pseudonym secret key. The signature generating program then signs the pseudonym public key and the user real identification using the user's master secret key. The encryption program encrypts $[UID,pPKU]_{mSKU}$ using the public key of the certificate authority and sends $PKC([UID,pPKU]_{mSKU})$ to the certificate authority via a communications path as a request for a certified pseudonym public key (i.e., a request for the issuance of a license).

The certificate authority receives the request (PKC([UID, $pPKU]_{mSKU}$)) and the decryption program decrypts request using the secret key SKC of the certificate authority. The signature verifying program verifies the validity of the user signature using the user's master public key mPKU. If the signature is valid, the certificate authority signature generating program generates a signature (license) $[pPKU]_{SKC}$ for the user's pseudonym public key using the certificate authority's secret key SKC, and stores the user's pseudonym public key in the storage device in connection with the user's master public key mPKU and the user's real identification UID. The certificate authority encryption program encrypts the license $[pPKU]_{SKC}$ using the user's master public key mPKU and sends the license mPKU($[pPKU]_{SKC}$) to the user via a communications path.

The user receives the encrypted license mPKU($[pPKU]_{SKC}$) and the decryption program decrypts the license using the user's master secret key mSKU. The signature verifying program verifies the validity of the license $[pPKU]_{SKC}$ using the public key PKC of the certificate authority. If the license is valid, the license is stored in the storage device.

Referring to FIG. 4, the user encryption program encrypts the license $[pPKU]_{SKC}$, pseudonym public key pPKU using the public key PKI of the digital cash issuer and sends the encrypted license PKI($[pPKU]_{SKC}$,pPKU) to the digital cash issuer via a communications path as a request for registration in the digital cash issuer and for the digital cash issuer license.

The digital cash issuer receives the request PKI($[pPKU]_{SKC}$,pPKU) and the decryption program decrypts the information using the secret key SKI of the digital cash issuer. The digital cash issuer searches for pPKU in its storage to prevent the use of another user's pseudonym public key. If the user's pseudonym public key pPKU is not registered, the digital cash issuer signature verifying program verifies the validity of the license $[pPKU]_{SKC}$ the using the certificate authority's public key PKC. If the license is valid, the digital cash issuer assigns a storage space to the user and stores the user's pseudonym public key pPKU. The digital cash issuer signature generating program signs the user's pseudonym public key pPKU the using the secret key of the digital cash issuer SKI. The encryption program encrypts the information using the user's pseudonym public key pPKU and sends pPKU($[pPKU]_{SKI}$) as a license to the user via a communications path.

The user receives pPKU($[pPKU]_{SKI}$), and the decryption program decrypts the license using the user's pseudonym secret key pSKU. The signature verifying program verifies the validity of the digital cash issuer signature using the digital cash issuer's public key PKI. If the signature is valid, the license $[pPKU]_{SKI}$ is stored in the storage device. The user may obtain additional certified pseudonym public keys without a limit.

(2) Withdrawal Procedure (i.e., the Electronic Cash Issuing Procedure)

Figure 5:
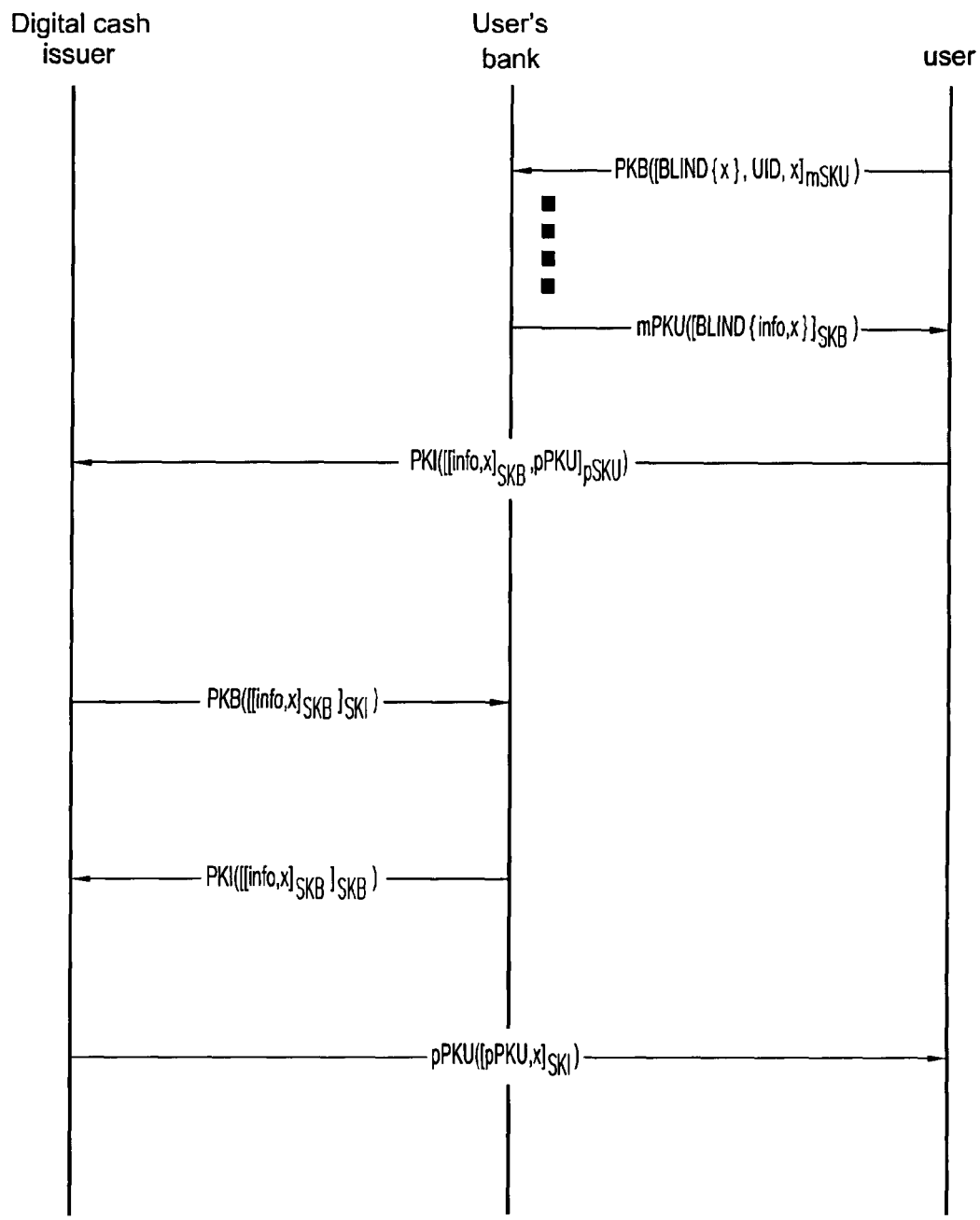
FIG. 5 is an exemplary withdrawal protocol according to the first embodiment.
Figure 6:
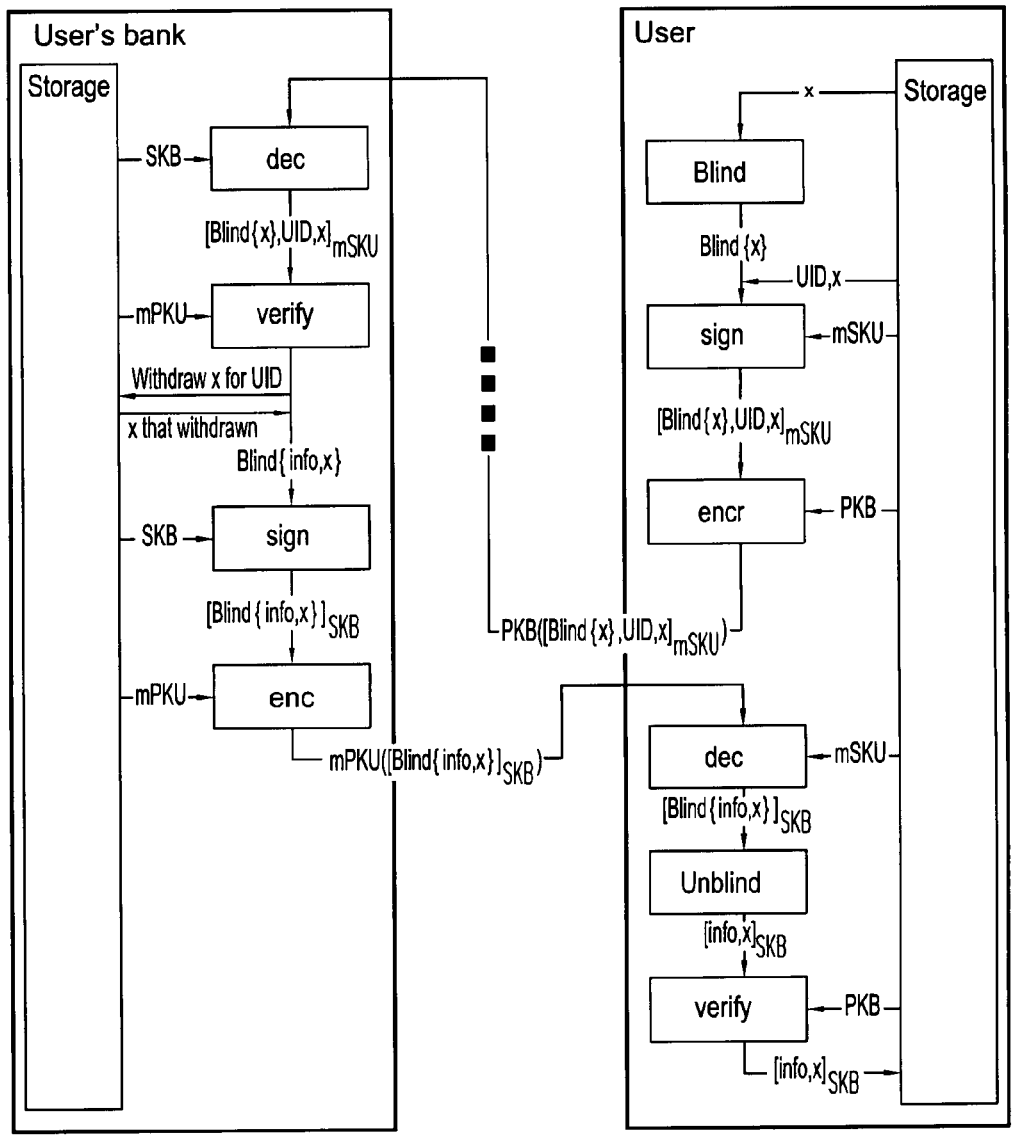
FIG. 6 is an exemplary withdrawal process part 1 according to the first embodiment.

FIG. 5 shows the diagrammatic representation of the withdrawal protocol, and FIGS. 6-9 illustrate parts 1-4 of the registration process. Referring to FIGS. 5 and 6, the user blinds the amount of digital cash x using any proposed blinding signature scheme, and the signature generating program signs the blinded amount of digital cash Blind{x}, the user real identification UID, and the amount of money to be withdrawn x using the user's master secret key mSKU. The encryption program encrypts the information by using the public key of the user's bank PKB and sends PKB($Blind\{x\}$, $UID,x]_{mSKU}$) to the user's bank via a communications path.

The user's bank decryption program decrypts PKB($[Blind\{x\},UID,x]_{mSKU}$) using the user's bank's secret key SKB, and the signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user using any proposed blind signature scheme, using the bank's secret key SKB. The encryption program encrypts $[Blind\{info,x\}]_{SKB}$ using the master public key of the user mPKU and sends mPKU($[BLIND\{info,x\}]_{SKB}$) to the user via a communications path.

The user receives mPKU($[BLIND\{info,x\}]_{SKB}$), and the decryption program decrypts the information using the user's master secret key mSKU. The blind signature scheme unblinds the signed blinded information and the amount of digital cash. The user signature verifying program verifies the validity of the bank's signature using the public key of the user's bank PKB. If the signature is valid, the user stores the signed information and the amount of digital cash $[info,x]_{SKB}$ as a check in the storage device.

Figure 7:
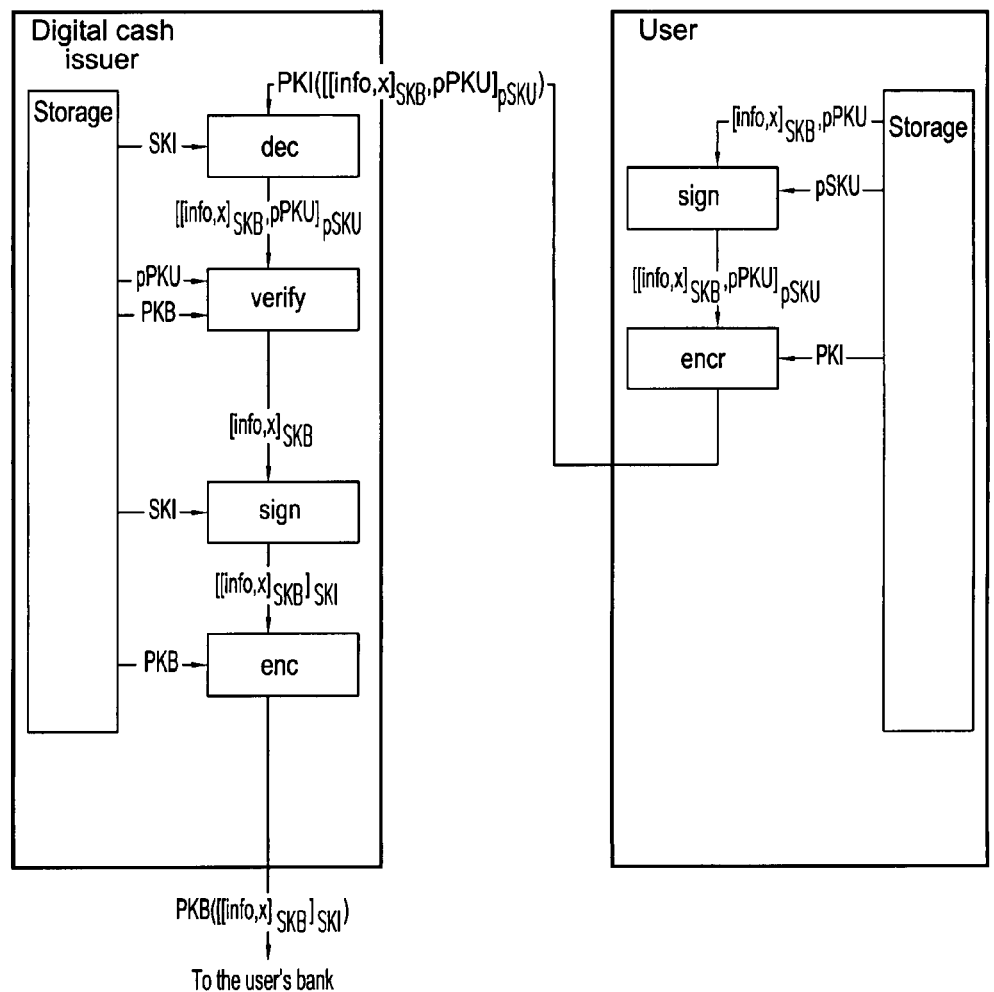
FIG. 7 is an exemplary withdrawal process part 2 according to the first embodiment.

Referring to FIG. 7, the user signature generating program signs the check $[info,x]_{SKB}$ and the user's pseudonym public key pPKU using the user's pseudonym secret key pSKU. The encryption program encrypts $[[info,x]_{SKB},pPKU]_{pSKU}$ using the digital cash issuer's public key PKI and sends PKI([[info, x]$_{SKB}$,pPKU]$_{pSKU}$) to the digital cash issuer.

The digital cash issuer receives PKI([[info,x]$_{SKB}$, pPKU]$_{pSKU}$), and the decryption program decrypts the information using the digital cash issuer's secret key SKI. The signature verifying program verifies the signature of the user, for authentication, using the user's pseudonym public key pPKU. If the signature is valid, the digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKB}$]$_{SKI}$ using the public key of the user's bank PKB and sends PKB([[info,x]$_{SKB}$]$_{SKI}$) to the user's bank via a communications path.

Figure 8:
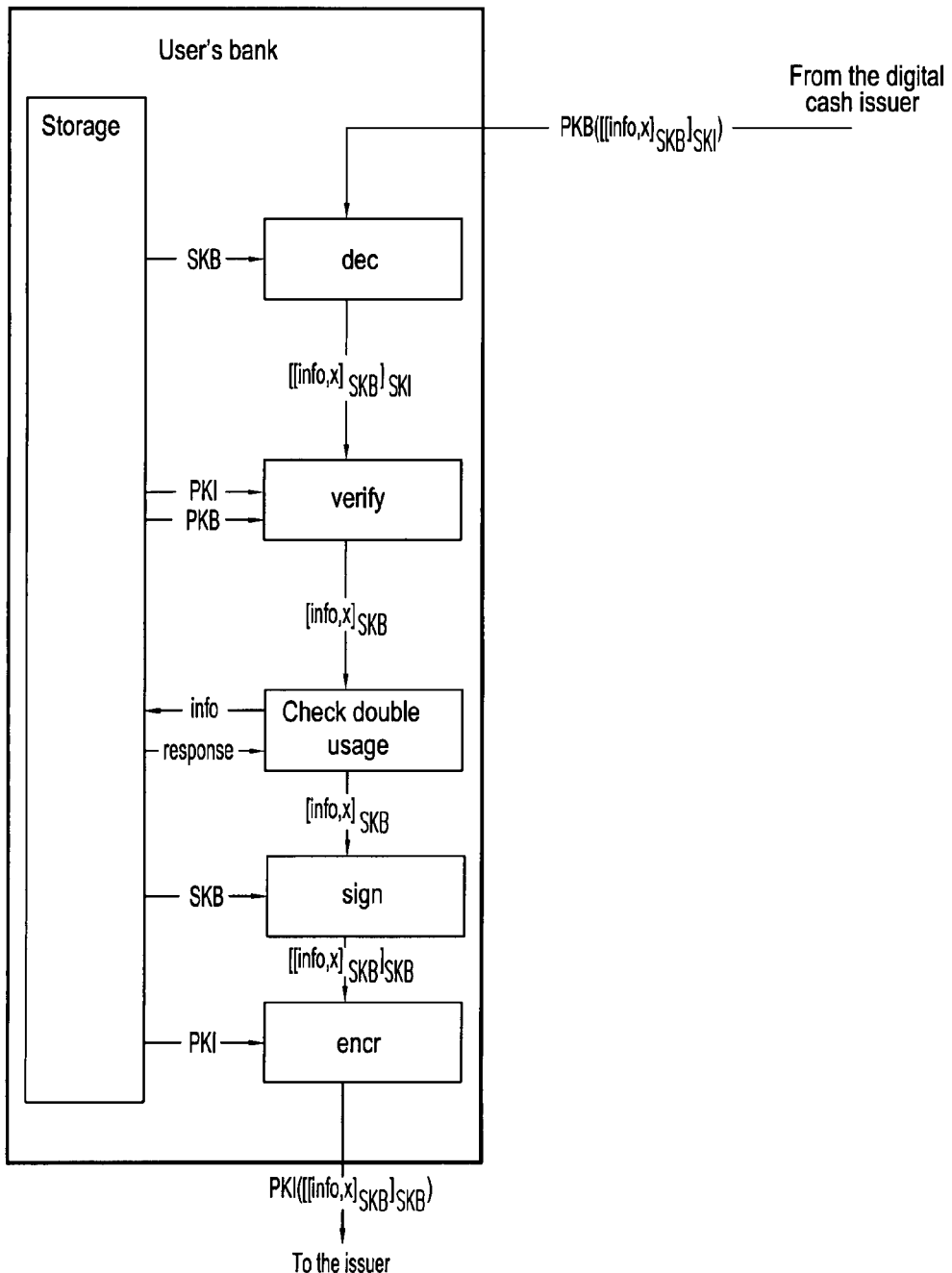
FIG. 8 is an exemplary withdrawal process part 3 according to the first embodiment.

Referring to FIG. 8, the user's bank receives PKB([[info, x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device, and the signature generating program signs the check [info, x]$_{SKB}$ using the secret key of the user's bank SKB. The encryption program encrypts [[info,x]$_{SKB}$]$_{SKB}$ using the digital cash issuer's public key PKI and sends PKI([[info,x]$_{SKB}$]$_{SKB}$) to the digital cash issuer via a communications path.

Figure 9:
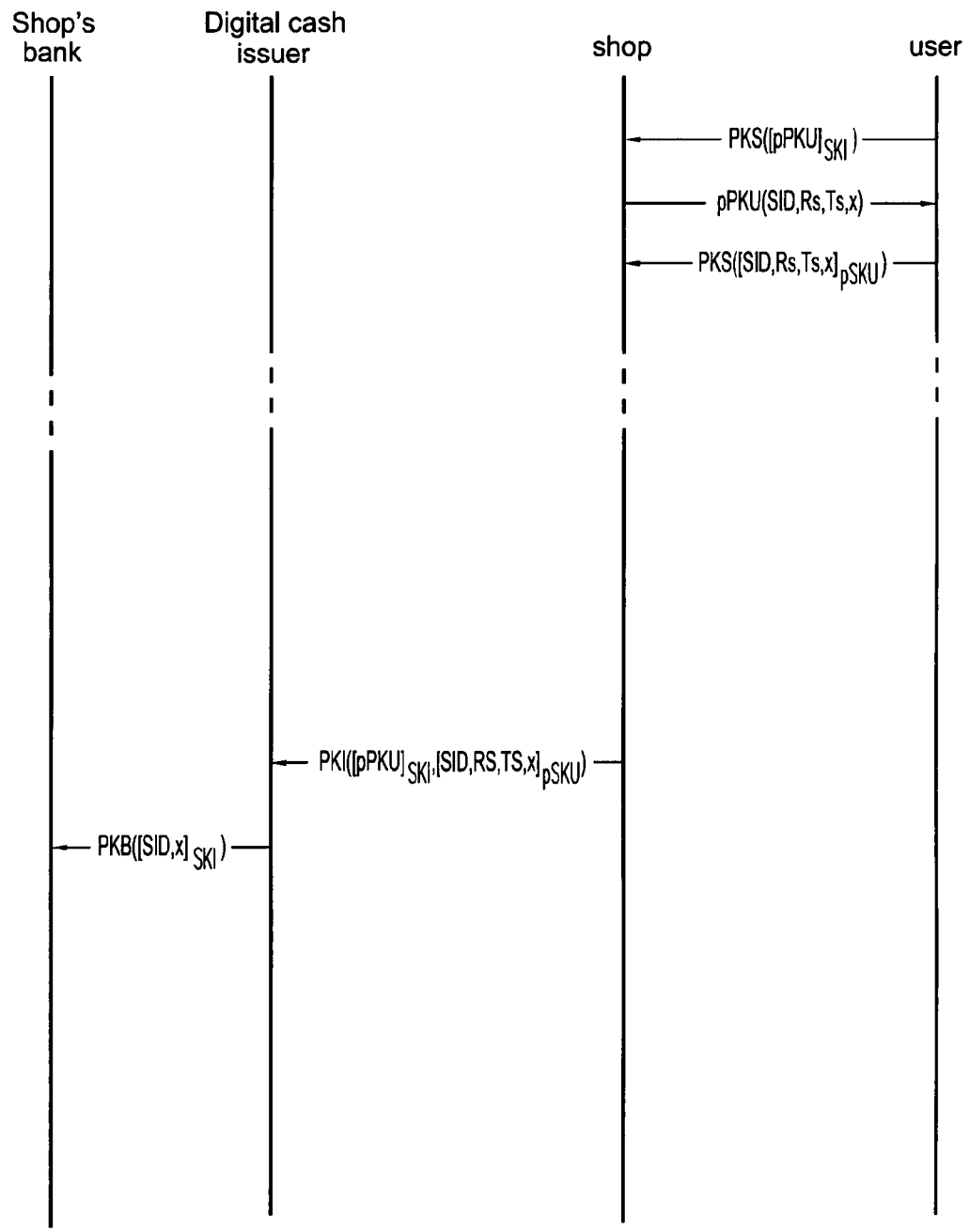
FIG. 9 is an exemplary withdrawal process part 4 according to the first embodiment.

Referring to FIG. 9, the digital cash issuer receives PKI ([[info,x]$_{SKB}$]$_{SKB}$). The decryption program decrypts the information using the digital cash issuer's secret key SKI and verifies the signature of the user's bank twice. If the signature is valid, the digital cash issuer increments the user's virtual account by the amount of digital cash x. The signature generating program signs the pseudonym public key pPKU and the digital cash amount x using the digital cash issuer's secret key SKI. The encryption program encrypts the signed pseudonym public key and the amount of the digital cash [pPKU, x]$_{SKI}$ using the user's pseudonym public key pPKU and sends pPKU([pPKU,x]$_{SKI}$) to the user via a communications path.

The user receives pPKU([pPKU,x]$_{SKI}$), and the decryption program decrypts the information using the user's pseudonym secret key. The signature verifying program verifies the validity of the digital cash issuer signature with the digital cash issuer's public key PKI. If the signature is valid, the cumulative amount of digital cash is incremented by the amount of digital cash x, and the new cumulative amount of digital cash is stored in the storage device of the user.

(3) Payment Procedure

Figure 10:
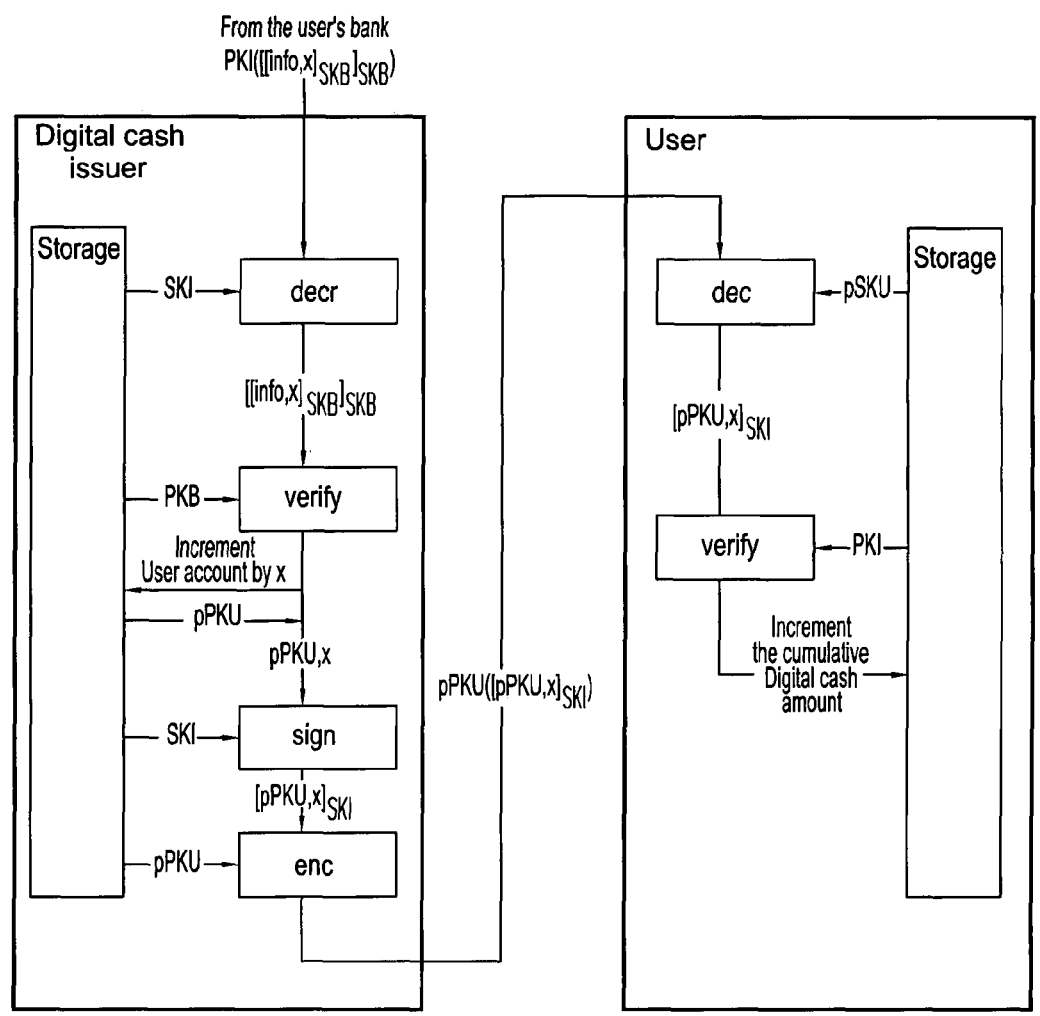
FIG. 10 is an exemplary payment protocol according to the first embodiment.
Figure 11:
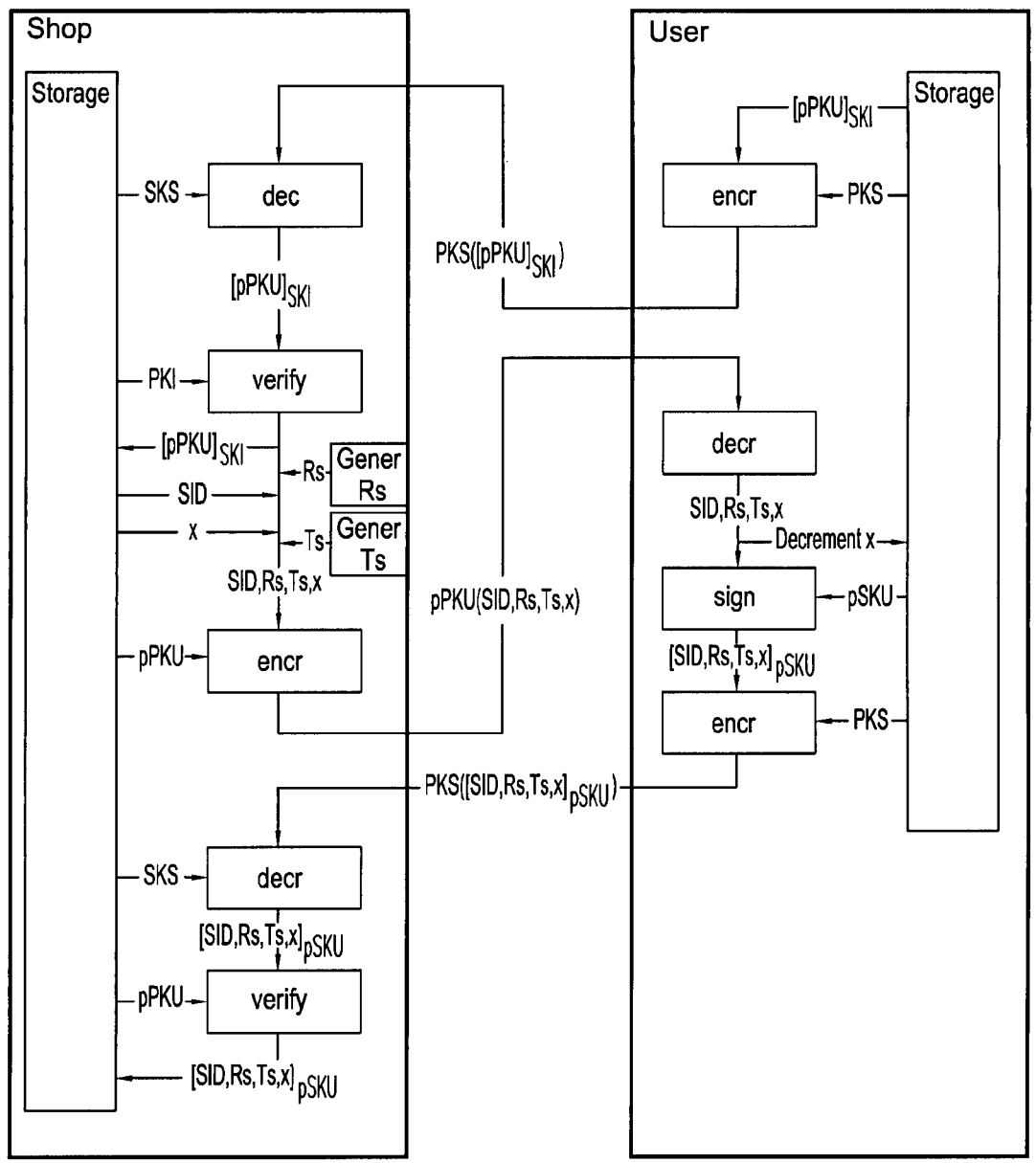
FIG. 11 is an exemplary payment process part 1 according to the first embodiment.
Figure 12:
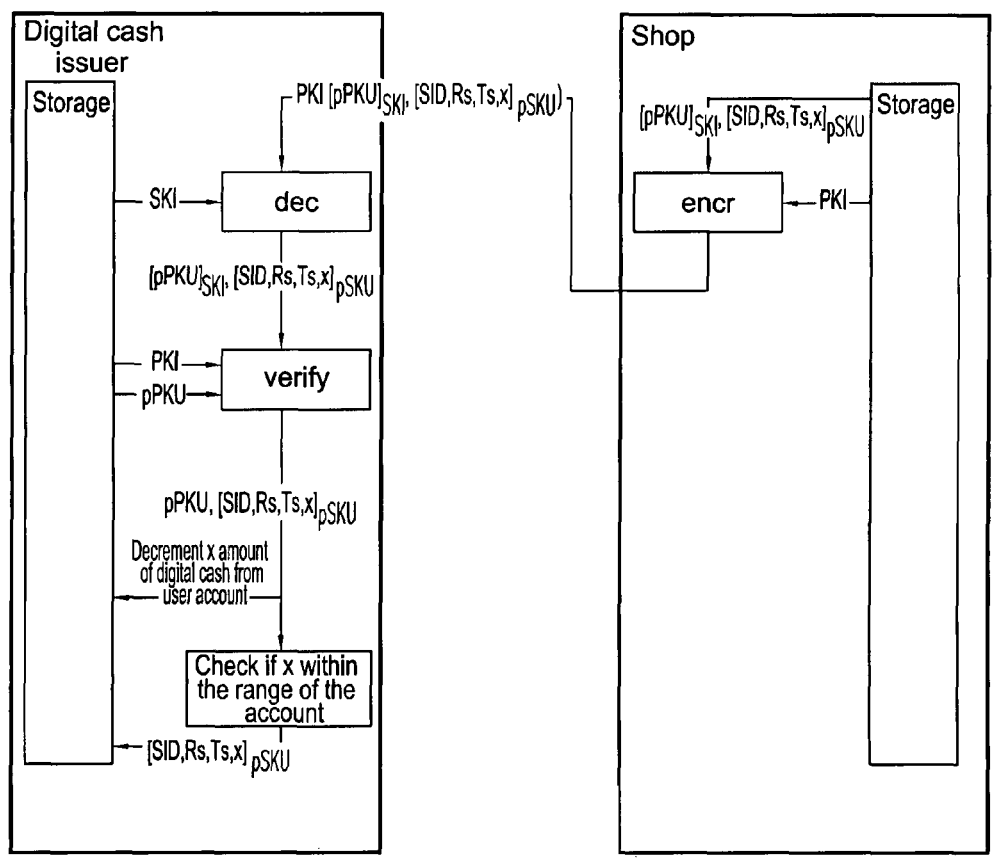
FIG. 12 is an exemplary payment process part 2 according to the first embodiment.
Figure 13:
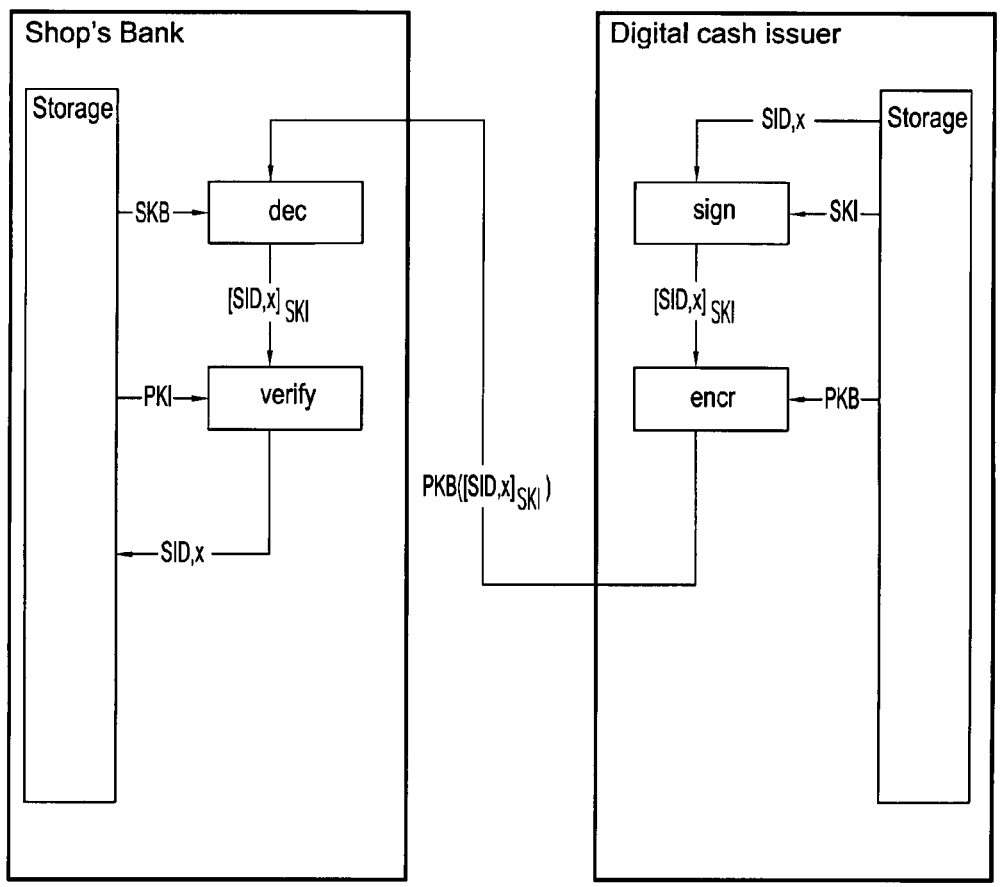
FIG. 13 is an exemplary payment process part 3 according to the first embodiment.

FIG. 10 shows the diagrammatic representation of the payment protocol, and FIGS. 11-13 illustrate parts 1-3 of the payment process. Referring to FIGS. 10 and 11, the user encryption program encrypts the digital cash issuer license [pPKU]$_{SKI}$ using the public key of the shop PKS and sends the license to the shop as request for payment.

The shop decryption program decrypts the encrypted digital cash issuer license PKS([pPKU]$_{SKI}$) using the shop's secret key SKS. The signature verifying program verifies the signature of the issuer with the digital cash issuer public key PKI. If the signature is valid, the shop stores the user's digital cash issuer license. The random number generating program generates a random number Rs, and the time generating program generates the time Ts. The encryption program encrypts the shop identification SID, Rs, Ts, and the price of payment x using the user's pseudonym public key pPKU and sends pPKU(SID,Rs,Ts,x) to the user via a communications path.

The user receives pPKU(SID,Rs,Ts,x) and the decryption program decrypts the information using the user's pseudonym secret key pSKU. The cumulative amount of digital cash in the user's storage device is decremented by x. The signature generating program signs the shop identification SID, the random number Rs, the time Ts, and the price of payment x using the user's pseudonym secret key pSKU. The encryption program encrypts the information using the public key of the shop PKS then sends PKS([SID,Rs,Ts,x]$_{pSKU}$) to the shop via a communications path.

The shop receives the information PKS([SID,Rs, Ts,x]$_{pSKU}$) and the decryption program decrypts the information using the shop's secret key SKS. The signature verifying program verifies the signature using the user's pseudonym public key pPKU. If the signature is valid, the shop stores the challenge and the shop regards the payment as valid.

Referring to FIG. 12, after a period of time, the shop encryption program encrypts the information that contains the challenge that was signed by the user [SID,Rs,Ts,x]$_{pSKU}$, and the user's digital cash issuer license [pPKU]$_{SKI}$ using the public key of the digital cash issuer PKI and sends the information to the digital cash issuer via a communications path.

The digital cash issuer decryption program decrypts PKI ([SID,Rs,Ts,x]$_{pSKU}$, [pPKU]$_{SKI}$) using the digital cash issuer's secret key SKI. The signature verifying program verifies the signature using the digital cash issuer's public key PKI and the user's pseudonym public key pPKU. If the signature is valid, the issuer decrements the user virtual account by the amount of the payment x. If the digital cash issuer determines that the user spends more than the amount in the virtual account, the real user identity is revealed by sending the user's pseudonym public key pPKU to the certificate authority. If the user spends less than the amount in the virtual account, the digital cash issuer stores the challenge [SID,Rs, Ts,x]$_{pSKU}$ in the storage device.

Referring to FIG. 13, the digital cash issuer signature generating program signs the shop identification SID and the amount x to be deposited for the shop with the digital cash issuer's secret key SKI. The encryption program encrypts the information using the public key of the shop's bank PKB and sends PKB([SID,x]$_{SKI}$) to the shop's bank via a communications path.

The shop's bank receives PKB([SID,x]$_{SKI}$) and the decryption program decrypts the information using the secret key SKB. The signature verifying program verifies the signature with the public key of the issuer PKI. If the signature is valid, the shop's bank adds the amount of money x to the shop's account.

Second Embodiment

In the previous embodiments, the withdrawal process and the payment process are performed from fixed positions, which require the user to access user station to buy or to get digital cash. For more convenience and accessibility, the following example allows a user to use a mobile device to buy and to get digital cash. The user mobile device in this implementation includes a processing device, a storage device, an encryption program, and a decryption program. However, because the storage and the computational power of most conventional mobile devices are limited, the mobile device implementation may provide only a minimum requirement to protect the security and privacy.

(1) User Registration Procedure

The user registration procedure for this example is the same as described above for FIGS. 2-4.

(2) Withdrawal Procedure (i.e., Electronic Cash Issuing Procedure)

Figure 14:
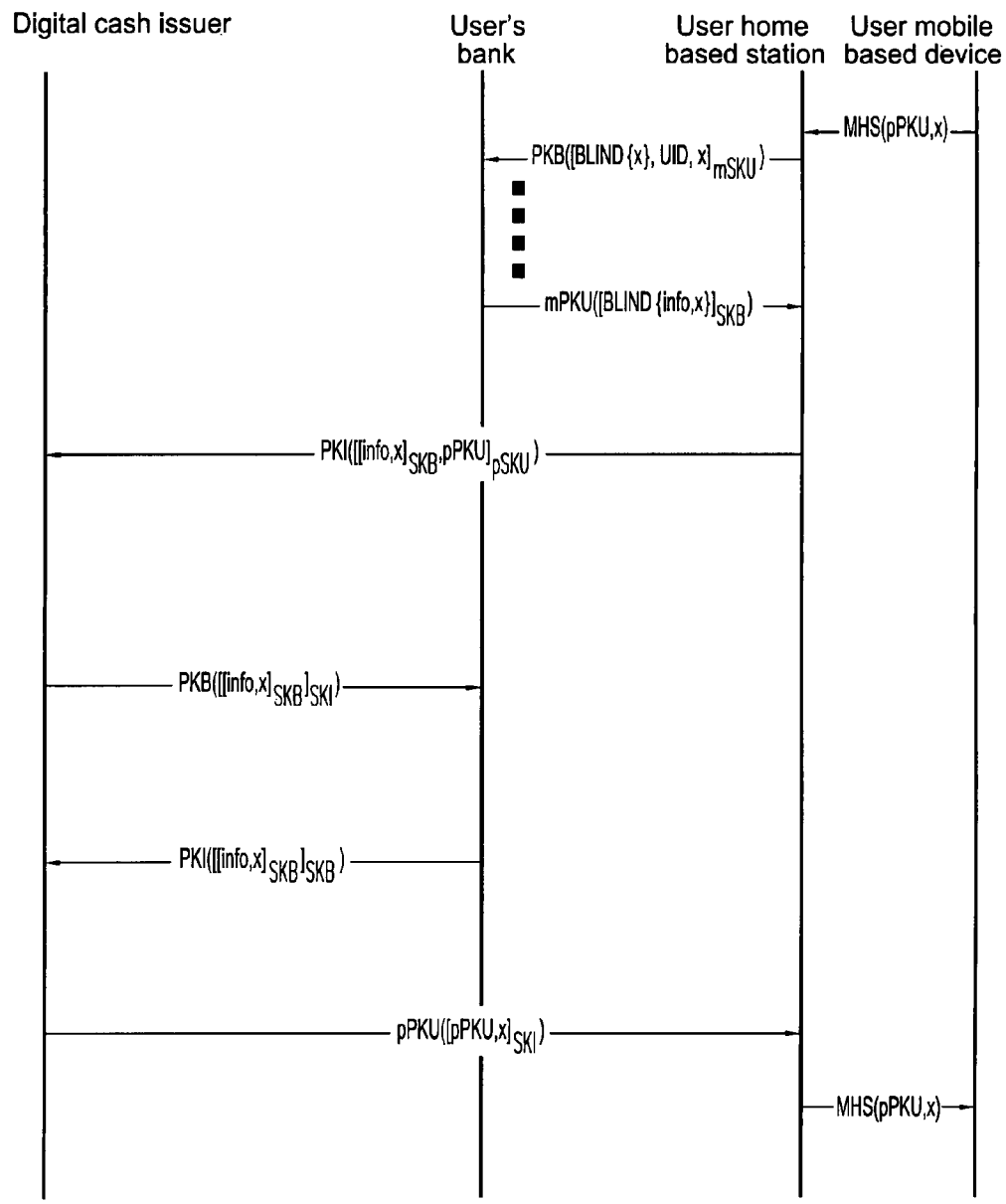
FIG. 14 is an exemplary withdrawal protocol according to the second embodiment.
Figure 15:
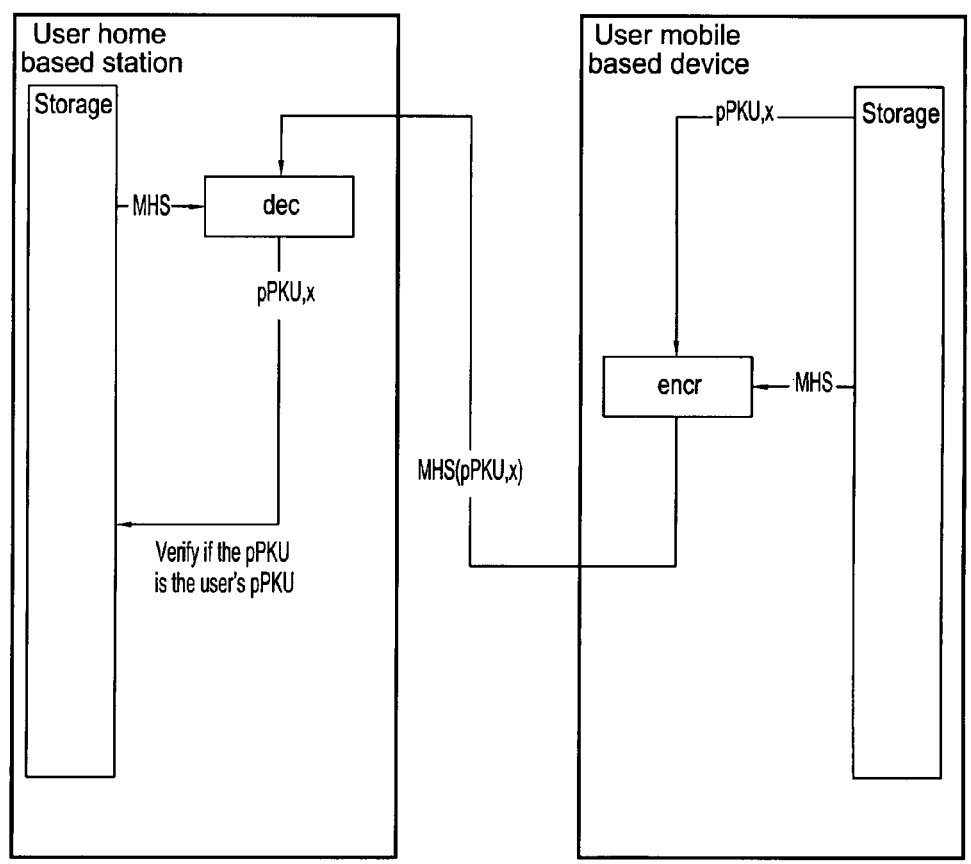
FIG. 15 is an exemplary withdrawal process part 1 according to the second embodiment.

FIG. 14 shows the diagrammatic representation of the withdrawal protocol, and FIGS. 15-20 illustrate parts 1-6 of the withdrawal process. Referring to FIGS. 14 and 15, the user's mobile device encryption program encrypts the user's pseudonym public key pPKU and the amount of digital cash x using the mobile-home shared secret key MHS, and sends the information MHS(pPKU,x) to the user station via a communications path.

The user station receives the encrypted user's pseudonym public key and the amount of digital cash MHS(pPKU,x) and the decryption program decrypts the information using the mobile/home shared secret key MHS and determines whether the decrypted key matches the user's pseudonym public key. If the keys are equal, the user's mobile device is authenticated by the user station.

Figure 16:
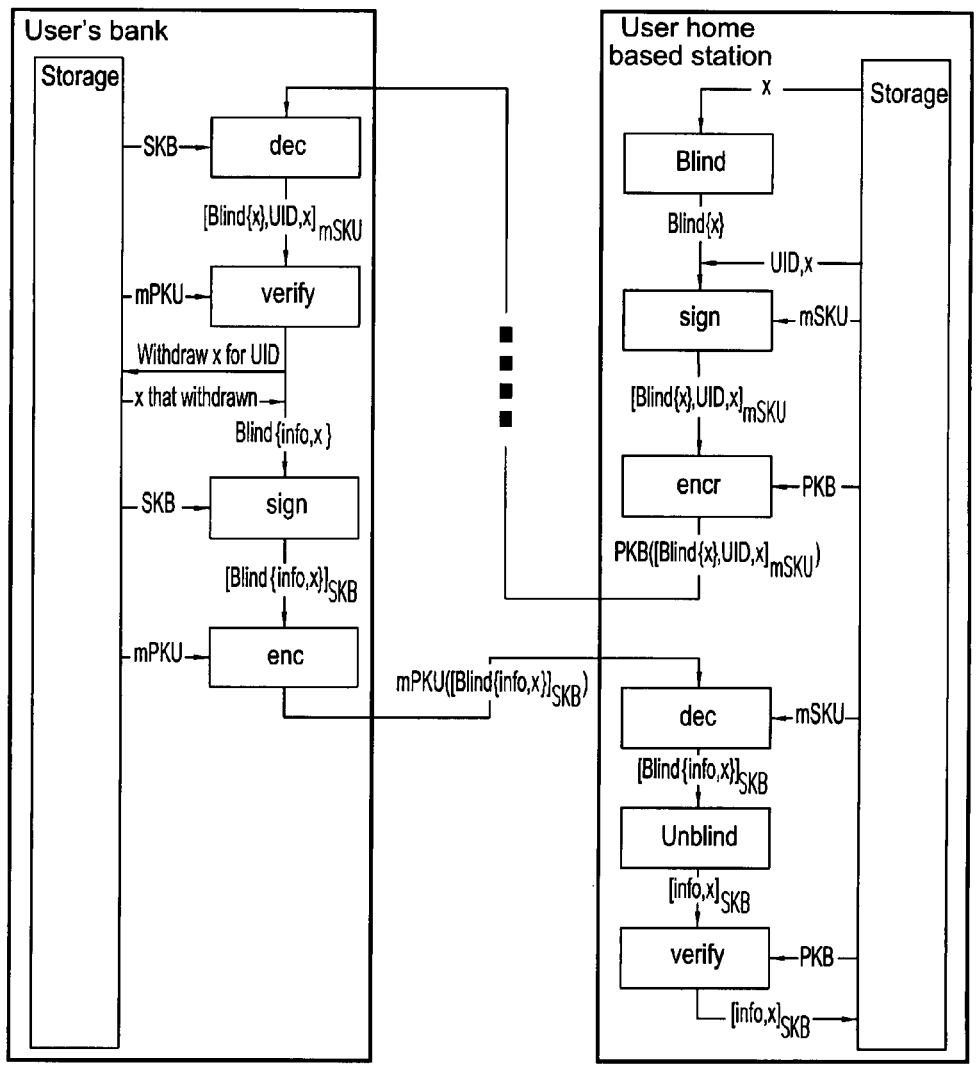
FIG. 16 is an exemplary withdrawal process part 2 according to the second embodiment.

Referring to FIG. 16, the user station blinds the amount of digital cash x using any well known blinding signature scheme. The signature generating program signs the blinded amount of digital cash Blind{x}, the user real identification UID, and the amount of money to be withdrawn x using the user's master secret key mSKU. The encryption program encrypts the information using the public key of the user's bank PKB and sends PKB([Blind{x},UID,x]$_{mSKU}$) to the user's bank via a communications path.

The user's bank decryption program decrypts PKB ([Blind{x},UID,x]$_{mSKU}$) using the user's bank's secret key SKB. The signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user station using any well known blind signature scheme), using the bank's secret key SKB. The encryption program encrypts [Blind{info,x}]$_{SKB}$ using the master public key of the user mPKU and sends mPKU([BLIND{info,x}]$_{SKB}$) to the user station via a communications path.

The user station receives mPKU([BLIND{info,x}]$_{SKB}$). The decryption program decrypts the information using the user's master secret key mSKU and un-blinds the signed, blinded information and the amount of digital cash using any well know blind signature scheme. The use station signature verifying program verifies the validity of the bank's signature using the public key of the user's bank PKB. If the signature is valid, the user station stores the signed information and the amount of digital cash [info,x]$_{SKB}$ as a check in the storage device.

Figure 17:
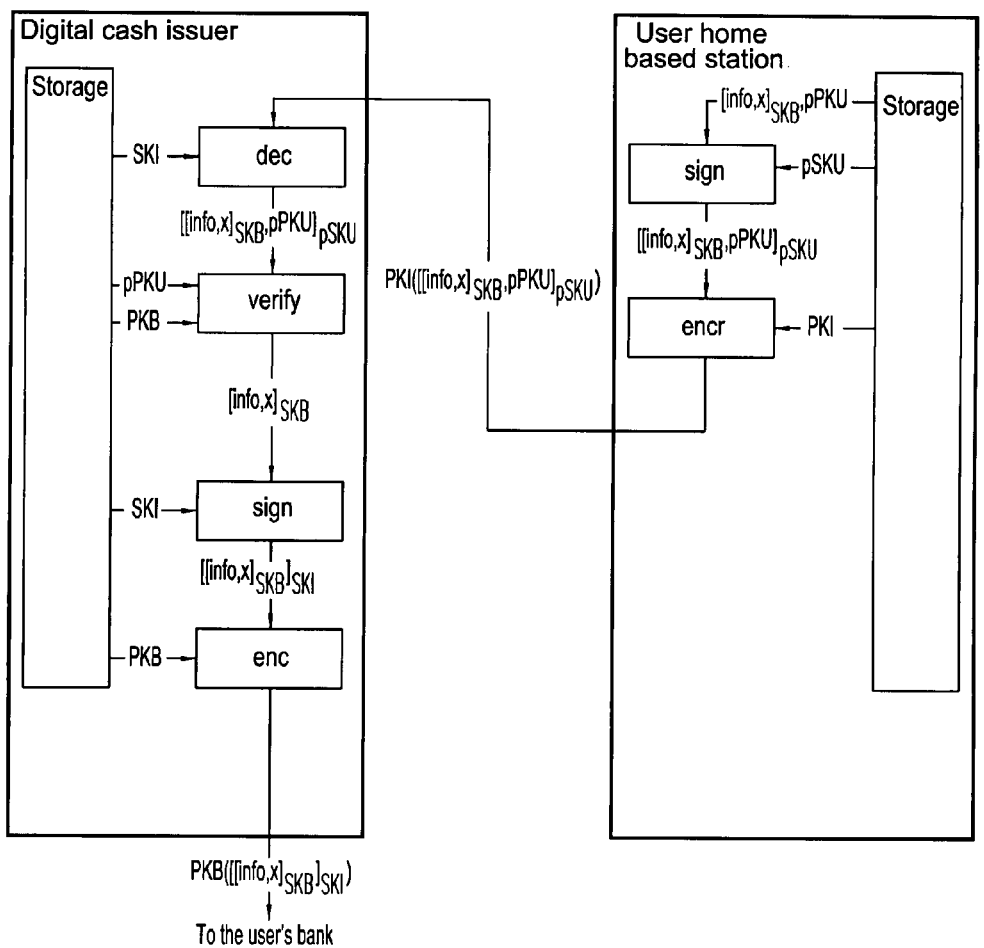
FIG. 17 is an exemplary withdrawal process part 3 according to the second embodiment.

Referring to FIG. 17, the use station signature generating program signs the check [info,x]$_{SKB}$ and the user's pseudonym public key pPKU using the user's pseudonym secret key pSKU. The encryption program encrypts [[info,x]$_{SKB}$, pPKU]$_{pSKU}$ using the digital cash issuer's public key PKI and sends PKI([[info,x]$_{SKB}$,pPKU]$_{pSKU}$) to the digital cash issuer.

The digital cash issuer receives PKI([[info,x]$_{SKB}$, pPKU]$_{pSKU}$), and the decryption program decrypts the information using the digital cash issuer's secret key SKI. The signature verifying program verifies the signature of the user, for authentication, using the user's pseudonym public key pPKU. If the signature is valid, the digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKI}$]$_{SKI}$ using the public key of the user's bank PKB, and sends PKB([[info,x]$_{SKB}$]$_{SKI}$) to the user's bank via a communications path.

Figure 18:
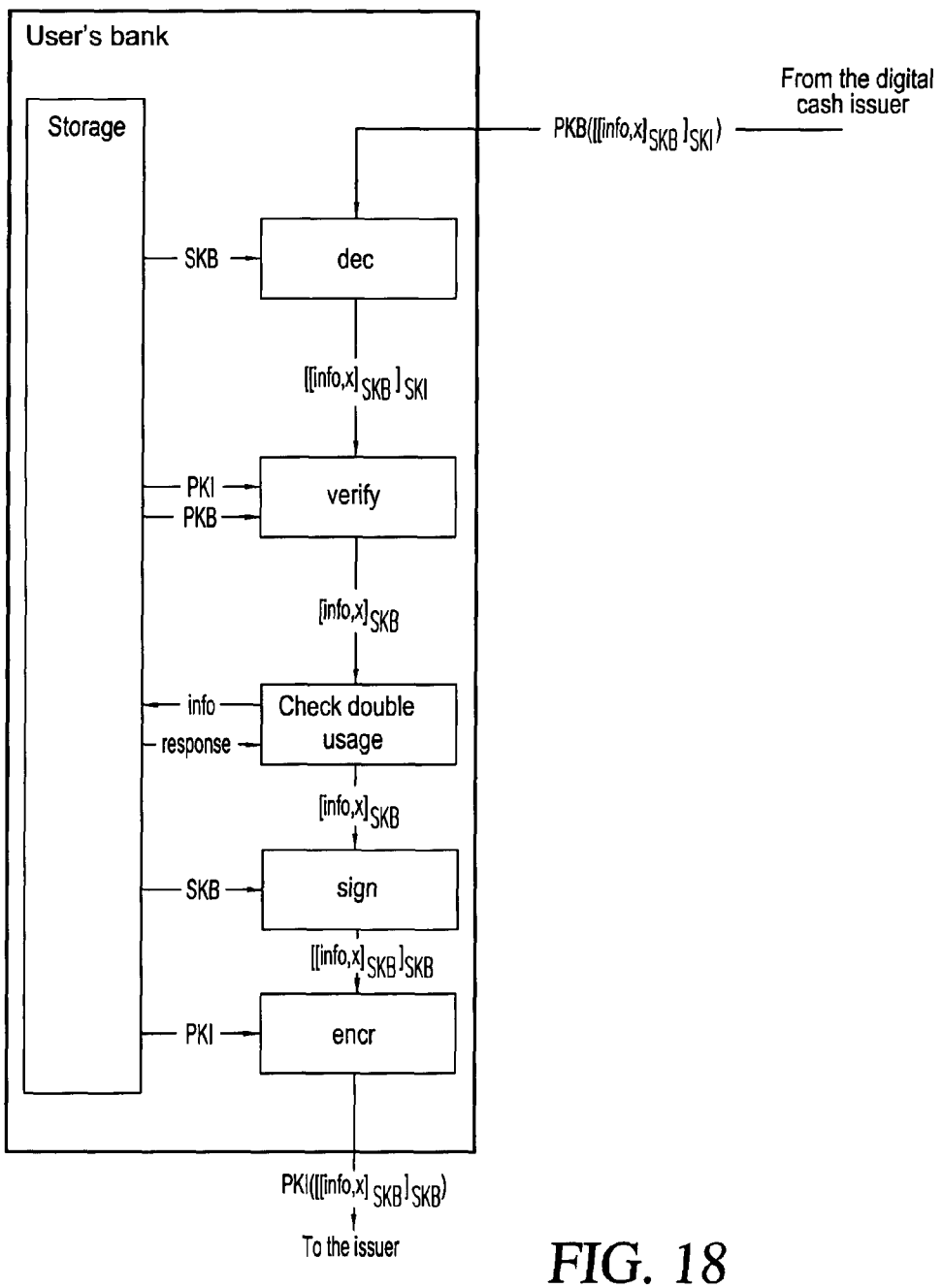
FIG. 18 is an exemplary withdrawal process part 4 according to the second embodiment.

Referring to FIG. 18, the user's bank receives PKB ([[info,x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device and the signature generating program signs the check [info,x]$_{SKB}$ using the secret key of the user's bank SKB. The encryption program encrypts [[info,x]$_{SKB}$]$_{SKB}$ using the digital cash issuer's public key PKI and sends PKI([[info,x]$_{SKB}$]$_{SKB}$) to the digital cash issuer via a communications path.

Figure 19:
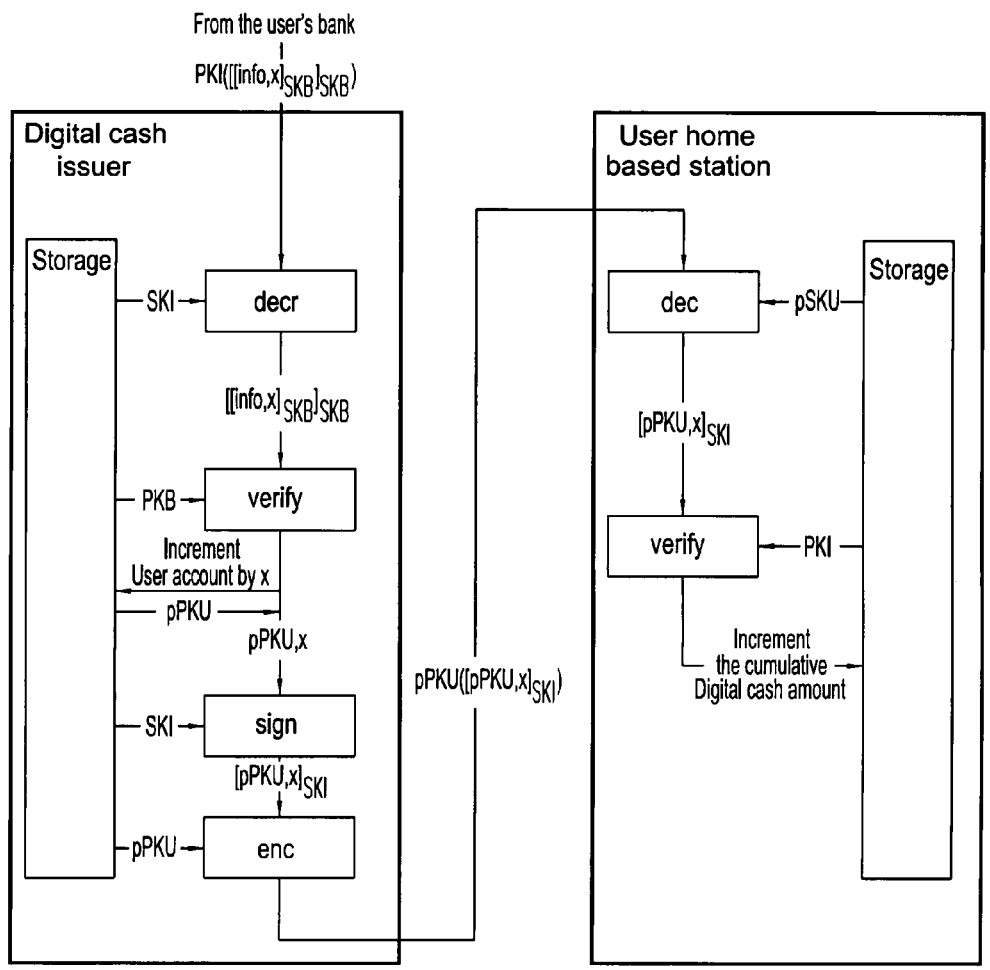
FIG. 19 is an exemplary withdrawal process part 5 according to the second embodiment.

Referring to FIG. 19, the digital cash issuer receives PKI ([[info,x]$_{SKB}$]$_{SKB}$), and the decryption program decrypts the information using the digital cash issuer's secret key SKI and verifies the signature of the user's bank. If the signature is valid, the digital cash issuer increments the user's virtual account by the amount of digital cash x. The signature generating program signs the pseudonym public key pPKU and the digital cash amount x using the digital cash issuer's secret key SKI. The encryption program encrypts the signed pseudonym public key and the amount of the digital cash [pPKU, x]$_{SKI}$ using the user's pseudonym public key pPKU and sends pPKU([pPKU,x]$_{SKI}$) to the user station via a communications path.

The user's home based station receives pPKU ([pPKU,x]$_{SKI}$), and the decryption program decrypts the information using the user's pseudonym secret key. The signature verifying program verifies the validity of the digital cash issuer signature with the digital cash issuer's public key PKI. If the signature is valid, the cumulative amount of digital cash is incremented by the amount of digital cash x and the new cumulative amount of digital cash is stored in the storage device of the user station.

Figure 20:
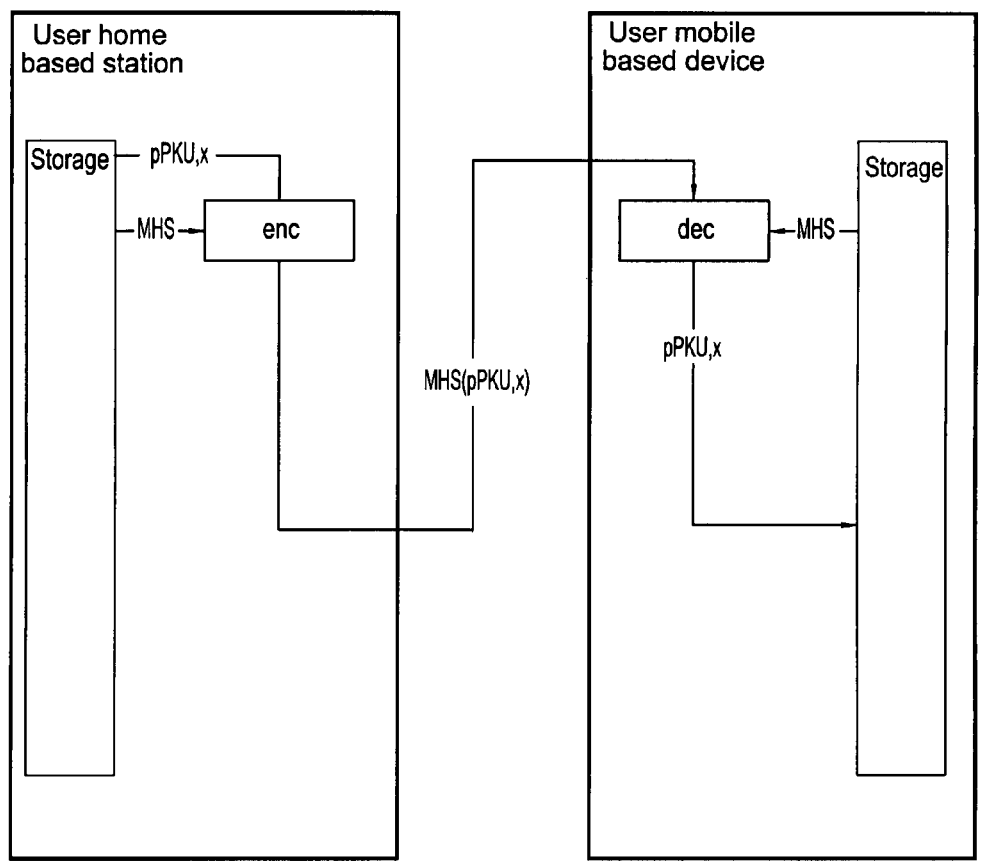
FIG. 20 is an exemplary withdrawal process part 6 according to the second embodiment.

Referring to FIG. 20, the user station encryption program encrypts the value of the new cumulative amount of digital cash x and the user's pseudonym public key pPKU using the mobile-home shared secret key MHS and sends MHS(pPKU, x) to the user's mobile based device via a communications path.

The user's mobile based device receives the encrypted value of the new cumulative amount of digital cash and the user's pseudonym public key MHS(pPKU,x). The decryption program decrypts the information using the mobile-home shared secret key MHS and determines whether the decrypted key matches the user's pseudonym public key to authenticate the user station is. If the keys match, the user stores the new cumulative amount of digital cash in the storage device of the user station.

(3) Payment Procedure

Figure 21:
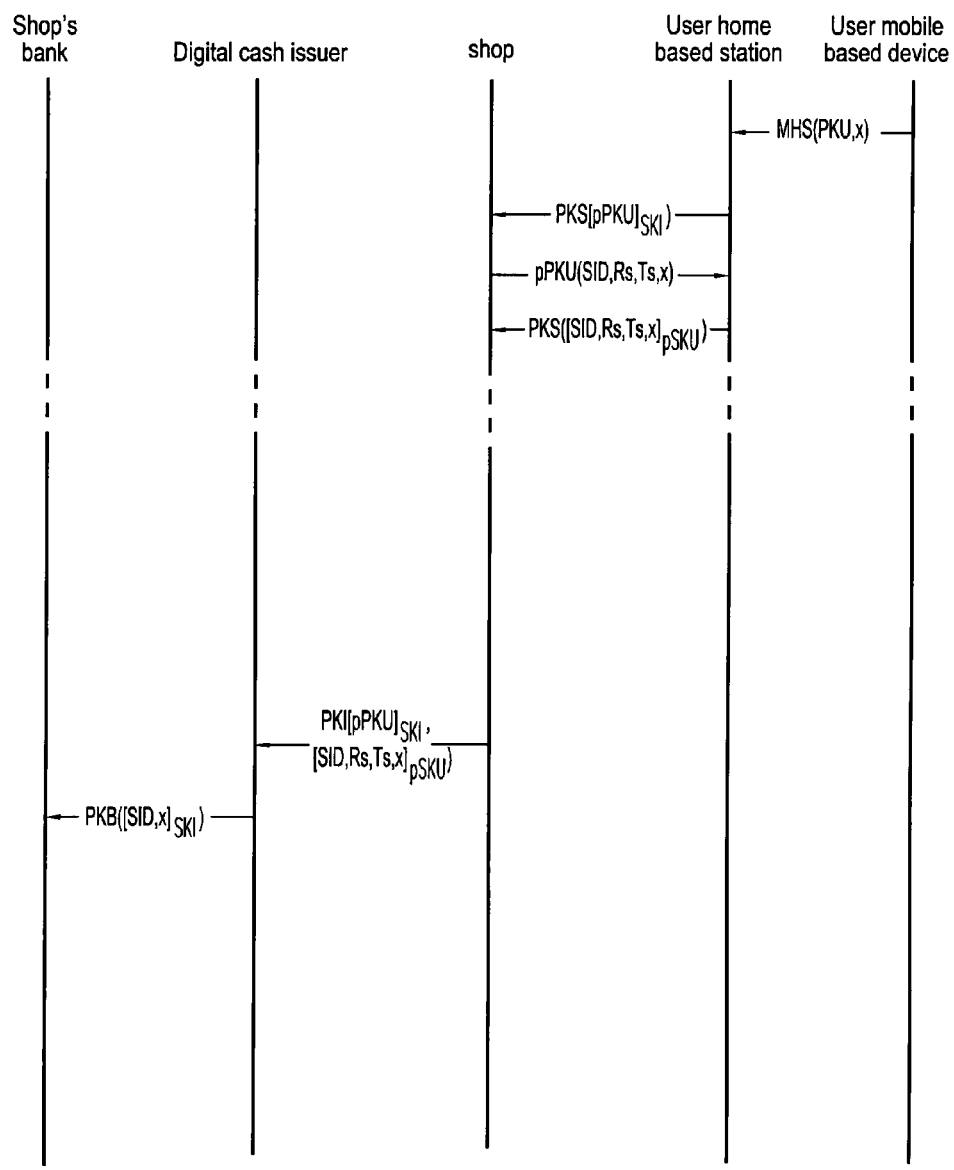
FIG. 21 is an exemplary payment protocol according to the second embodiment.
Figure 22:
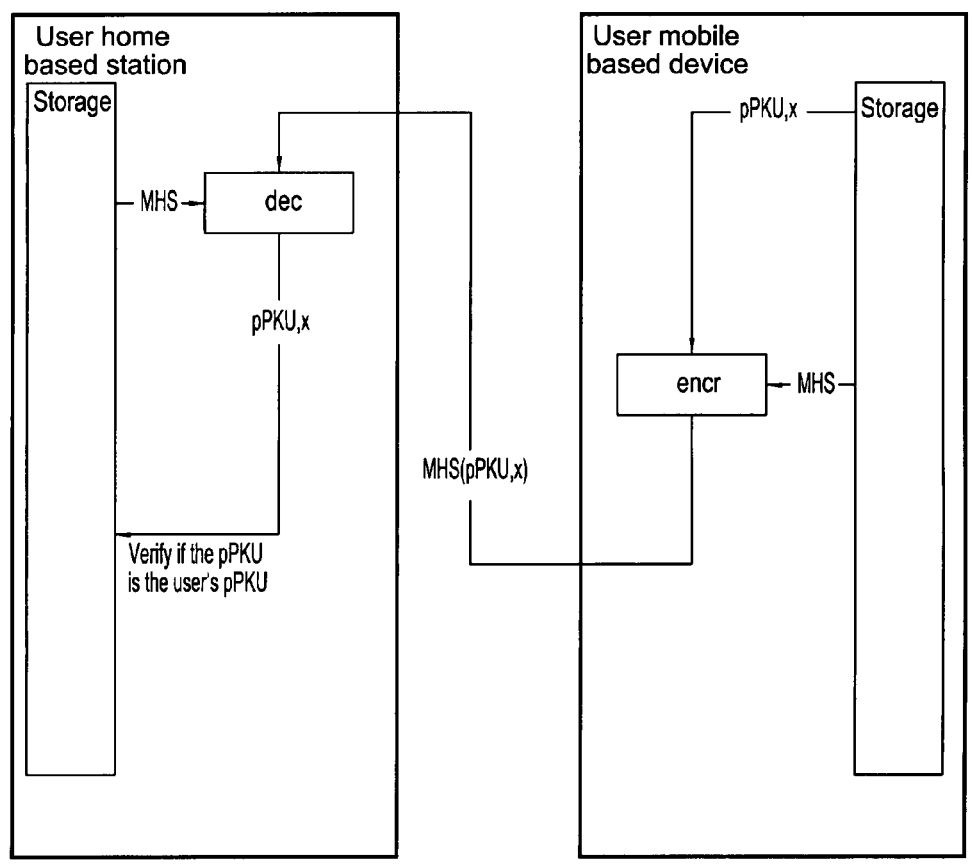
FIG. 22 is an exemplary payment process part 1 according to the second embodiment.

FIG. 21 shows the diagrammatic representation of the payment protocol, and FIGS. 22-25 show parts 1-4 of the payment process. Referring to FIG. 22, the user's mobile device encryption program encrypts the user's pseudonym public key pPKU using the mobile-home based shared secret key MHS and sends MHS(pPKU) to the user's home based station via a communications path.

The user station receives MHS(pPKU) and the decryption program decrypts the information using the mobile/home shared secret key MHS. The user station determined if the decrypted key matches the user's pseudonym public key to authenticate the user's mobile device.

Figure 23:
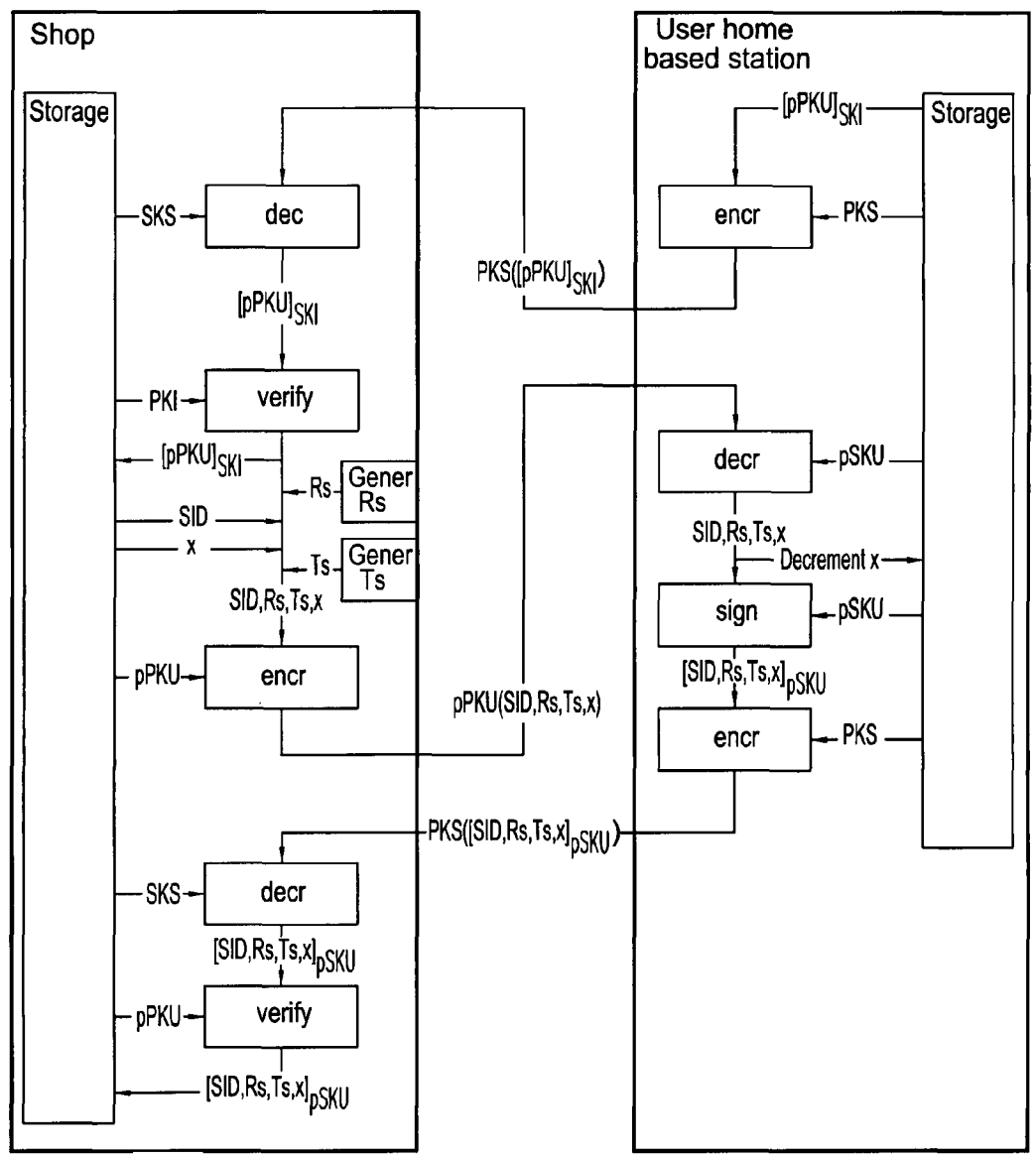
FIG. 23 is an exemplary payment process part 2 according to the second embodiment.

Referring to FIG. 23, the user station encryption program encrypts the digital cash issuer license [pPKU]$_{SKI}$ using the public key of the shop PKS and sends it via a communications path to the shop as request for payment.

The shop decryption program decrypts the encrypted the digital cash issuer license PKS([pPKU]$_{SKI}$) using the shop's secret key SKS. The signature verifying program verifies the signature of the issuer with the digital cash issuer public key PKI. If the signature is valid, the shop stores the user's digital cash issuer license. The random number generating program generates a random number Rs. The time generating program generates the time Ts. The encryption program encrypts the shop identification SID, Rs, Ts, and the price of payment x using the user's pseudonym public key pPKU and sends pPKU(SID,Rs,Ts,x) to the user station via a communications path.

The user station receives pPKU(SID,Rs,Ts,x) and the decryption program decrypts the information using the user's pseudonym secret key pSKU and decrements the cumulative amount of digital cash in the user's storage device by x. Then signature generating program signs the shop identification SID, the random number Rs, the time Ts, and the price of payment x using the user's pseudonym secret key pSKU. The encryption program encrypts the information using the public key of the shop PKS and sends the information PKS([SID,Rs,Ts,x]$_{pSKU}$) to the shop via a communications path.

The shop receives the information PKS([SID,Rs,Ts,x]$_{pSKU}$) and the decryption program decrypts the information using the shop's secret key SKS. The signature verifying program verifies the signature using the user's pseudonym public key pPKU. If the signature is valid, the shop stores the challenge and the shop regards the payment as valid.

Figure 24:
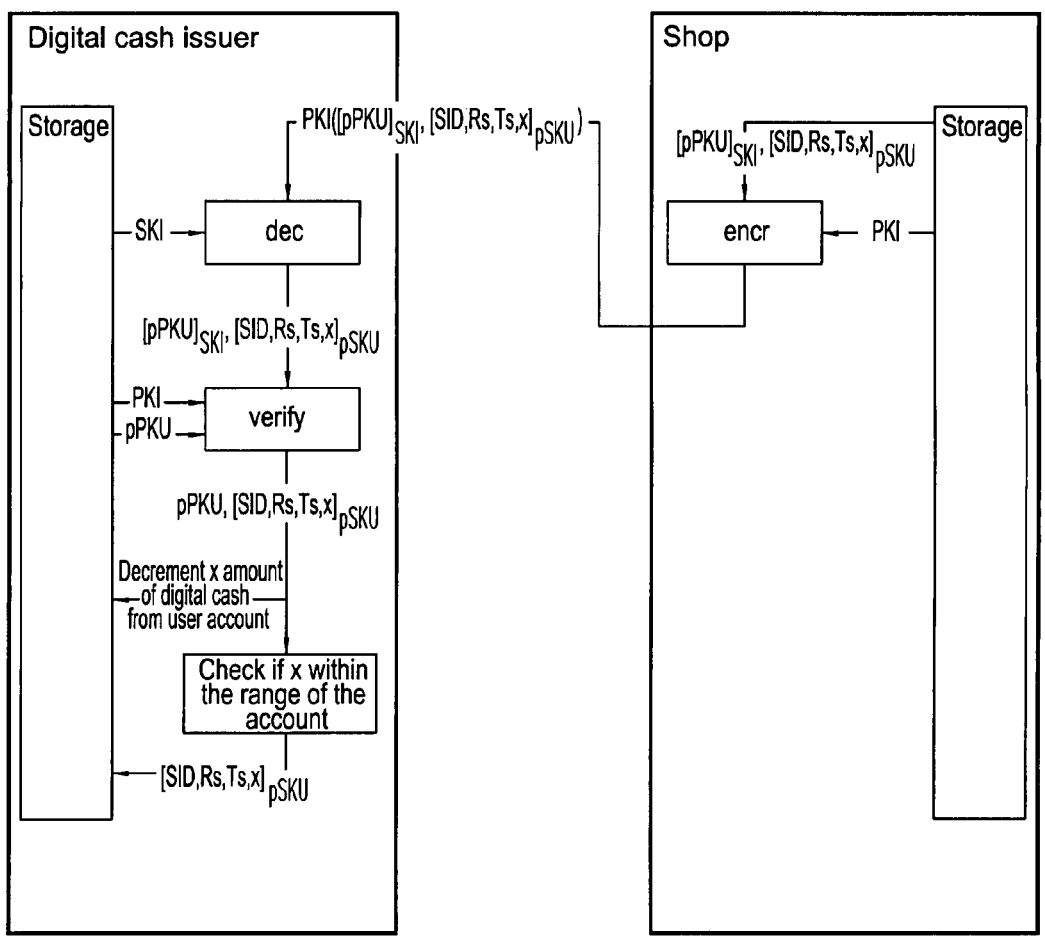
FIG. 24 is an exemplary payment process part 3 according to the second embodiment.

Referring to FIG. 24, after a period of time the shop encryption program encrypts the information that contains the challenge that was signed by the user [SID,Rs,Ts,x]$_{pSKU}$, and the user's digital cash issuer license [pPKU]$_{SKI}$ using the public key of the digital cash issuer PKI and sends the information to the digital cash issuer via a communications path.

The digital cash issuer decryption program decrypts PKI ([SID,Rs,Ts,x]$_{pSKU}$, [pPKU]$_{SKI}$) using the digital cash issuer's secret key SKI and verifies the signature the signature verifying program using the digital cash issuer's public key PKI and the user's pseudonym public key pPKU. If the signatures are valid, the issuer decrements the user virtual account by the amount of the payment x. If the digital cash issuer determines that the user spends more than the amount in the virtual account, the real identity of the user is revealed by sending the user's pseudonym public key pPKU to the certificate authority. If not, the digital cash issuer stores the challenge [SID,Rs,Ts,x]$_{pSKU}$ in the storage device.

Figure 25:
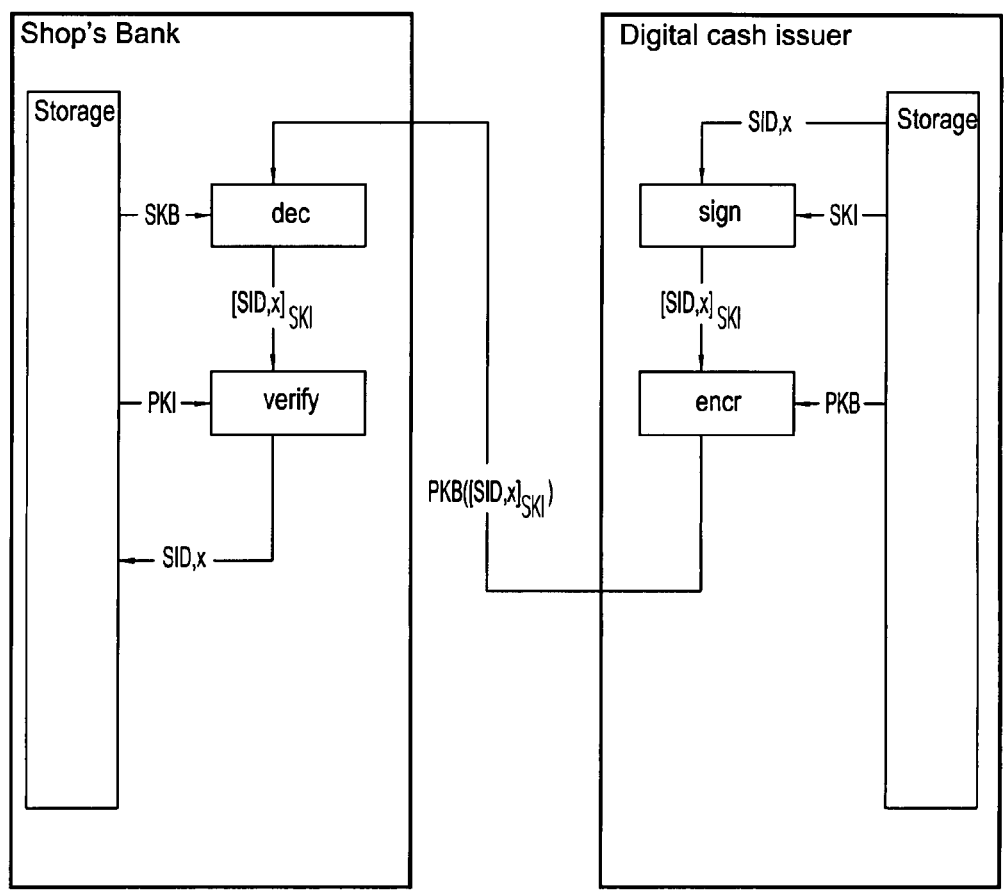
FIG. 25 is an exemplary payment process part 4 according to the second embodiment.

Referring to FIG. 25, the digital cash issuer signature generating program signs the shop identification SID, and the amount x to be deposited for the shop with the digital cash issuer's secret key SKI. The encryption program encrypts the information using the public key of the shop's bank PKB and sends PKB([SID,x]$_{SKI}$) to the shop's bank via a communications path.

The shop's bank receives PKB([SID,x]$_{SKI}$) and the decryption program decrypts the information using the secret key SKB. The signature verifying program verifies the signature with the public key of the issuer PKI. If the signature is valid, the shop's bank adds the amount of money x to the shop's account.

Third Embodiment

In the previous embodiments described above public key encryption is used. Public key encryption adds a cost in power and time used to complete a transaction. Therefore, a shared secret key may be used in place of the public key to hide the pseudonym and the amount of the digital cash as described in the following example. In this example, the certificate authority, bank, and user are as described above; however, in addition to the elements described above, the issuer further includes a key pointer KPr generating program.

(1) User Registration Procedure

Figure 26:
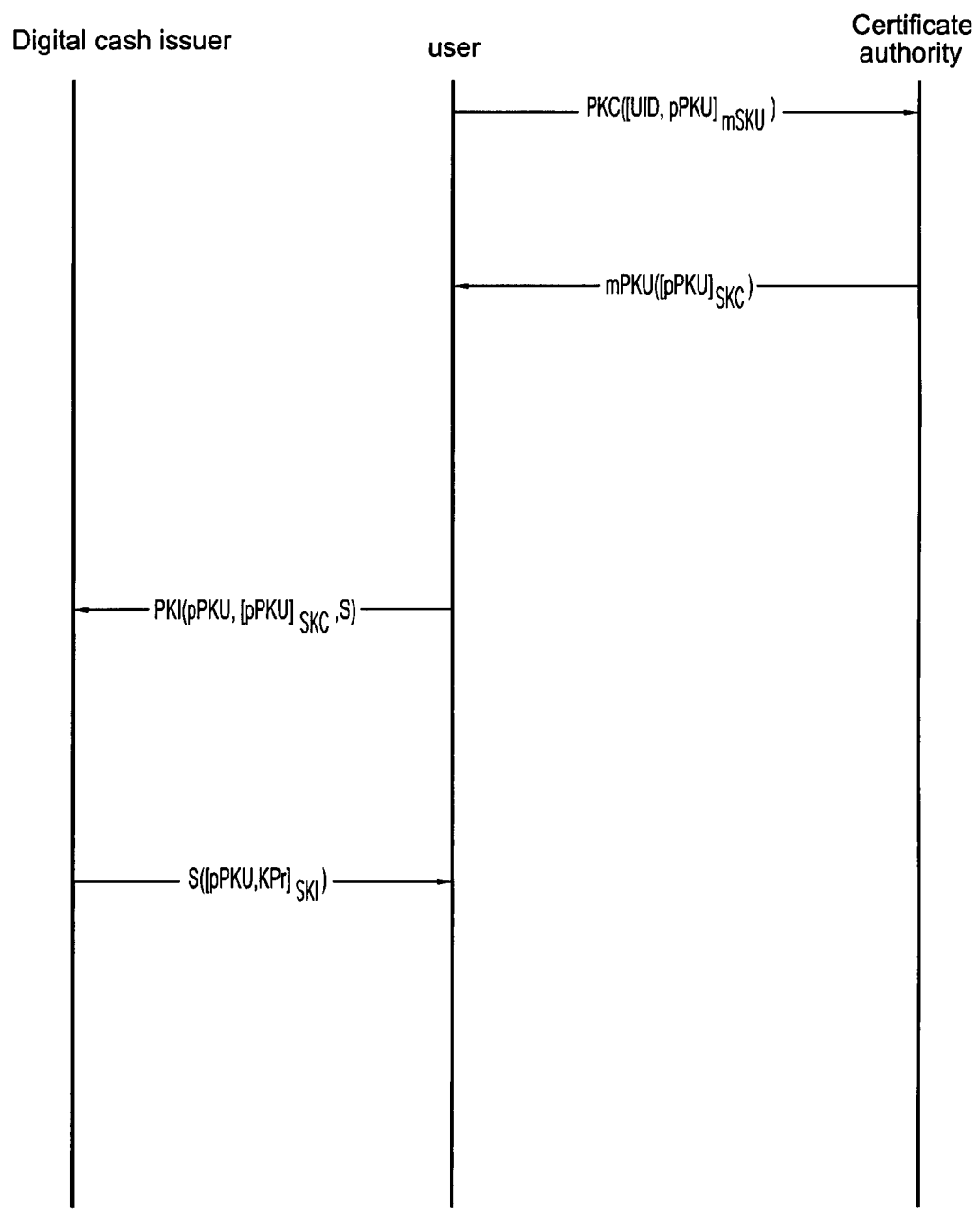
FIG. 26 is an exemplary user registration protocol according to the third embodiment.
Figure 27:
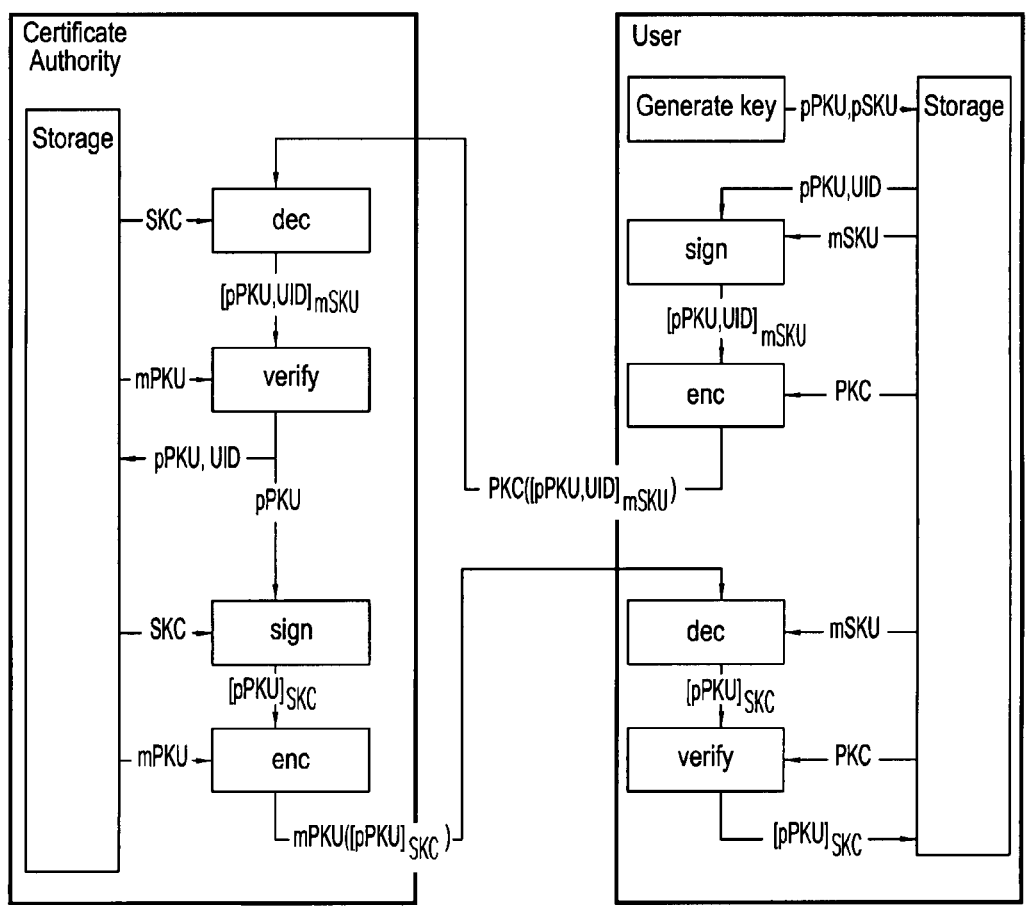
FIG. 27 is an exemplary user registration process part 1 according to the third embodiment.
Figure 28:
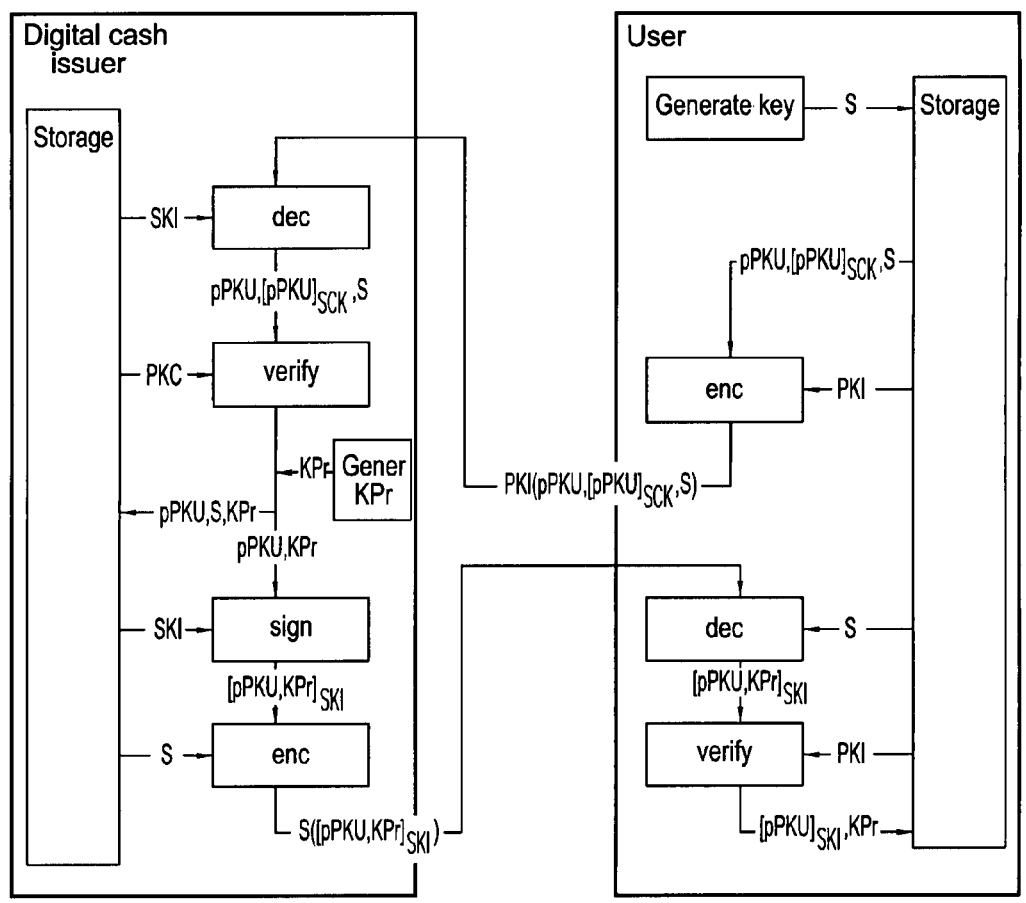
FIG. 28 is an exemplary user registration process part 2 according to the third embodiment.

FIG. 26 shows the diagrammatic representation of the registration protocol, and FIGS. 27 and 28 show parts 1 and 2 of the registration process. Referring to FIGS. 26 and 27, the user the key generating program generates a pseudonym public key and a pseudonym secret key. The signature generating program signs the pseudonym public key and the user real identification using user's master secret key. The encryption program encrypts [UID,pPKU]$_{mSKU}$ using the public key of the certificate authority and sends PKC([UID,pPKU]$_{mSKU}$) to the certificate authority as a request for a certified pseudonym public key (i.e., a request for the issuance of a license).

The certificate authority receives the request (PKC([UID, pPKU]$_{mSKU}$)) and the decryption program decrypts the request using the secret key of the certificate authority SKC. The signature verifying program verifies the validity of the user signature using the user's master public key mPKU. If the signature is valid, the certificate authority the signature generating program generates a signature (i.e., a license) [pPKU]$_{SKC}$ for the user's pseudonym public key using the certificate authority's secret key SKC, and stores the user's pseudonym public key in the storage device in connection with the user's master public key mPKU and the user's real identification UID. The certificate authority encryption program encrypts the license [pPKU]$_{SKC}$ using the user's master public key mPKU and sends mPKU([pPKU]$_{SKC}$) to the user via a communications path.

The user receives the encrypted license mPKU ([pPKU]$_{SKC}$) and the decryption program decrypts the license using the user's master secret key mSKU. The signature verifying program verifies the validity of the license [pPKU]$_{SKC}$ using the public key of the certificate authority PKC. If the signature is valid, the user key generating program establishes a user-issuer shared secret key S and stores the license and the user-issuer shared secret key in the user storage device.

Referring to FIG. 27, the user encryption program encrypts the license [pPKU]$_{SKC}$, pseudonym public key pPKU, and the user-issuer shared secret key S using the public key of the digital cash issuer PKI. The user then sends PKI([pPKU]$_{SKC}$, pPKU,S) to the digital cash issuer via a communications path.

The digital cash issuer receives PKI([pPKU]$_{SKC}$,pPKU,S) and the decryption program decrypts the information using the secret key of the digital cash issuer SKI. The digital cash issuer searches for pPKU in its storage device to prevent misuse of other users' pseudonym public key. If the user's pseudonym public key pPKU is not already registered, the digital cash issuer signature verifying program verifies the validity of the license [pPKU]$_{SKC}$ using the certificate authority's public key PKC. If the license valid, the digital cash issuer assigns an empty storage space to the user and generates a key pointer KPr to identify the user-issuer shared secret key S. In addition, the cash issuer also stores the user's pseudonym public key pPKU, the user-issuer shared secret key S and the key pointer KPr in the storage device. The digital cash issuer signature generating program signs the user's pseudonym public key pPKU and the key pointer KPr using the secret key of the issuer SKI. The encryption program encrypts the information using the user-issuer shared secret key S and sends S([pPKU, KPr]$_{SKI}$) as an acknowledgment to the user via a communications path.

The user receives the acknowledgement S([pPKU, KPr]$_{SKI}$), and the decryption program decrypts the information using the user-issuer shared secret key S. The signature verifying program verifies the validity of the digital cash issuer signature using the digital cash issuer's public key PKI. If the signature valid, the digital cash issuer stores the license [pPKU]$_{SKI}$ and the key pointer KPr in the storage device. According to this example, the user may obtain an unlimited number of certified pseudonym public keys.

(2) Withdrawal Procedure (Electronic Cash Issuing Procedure)

Figure 29:
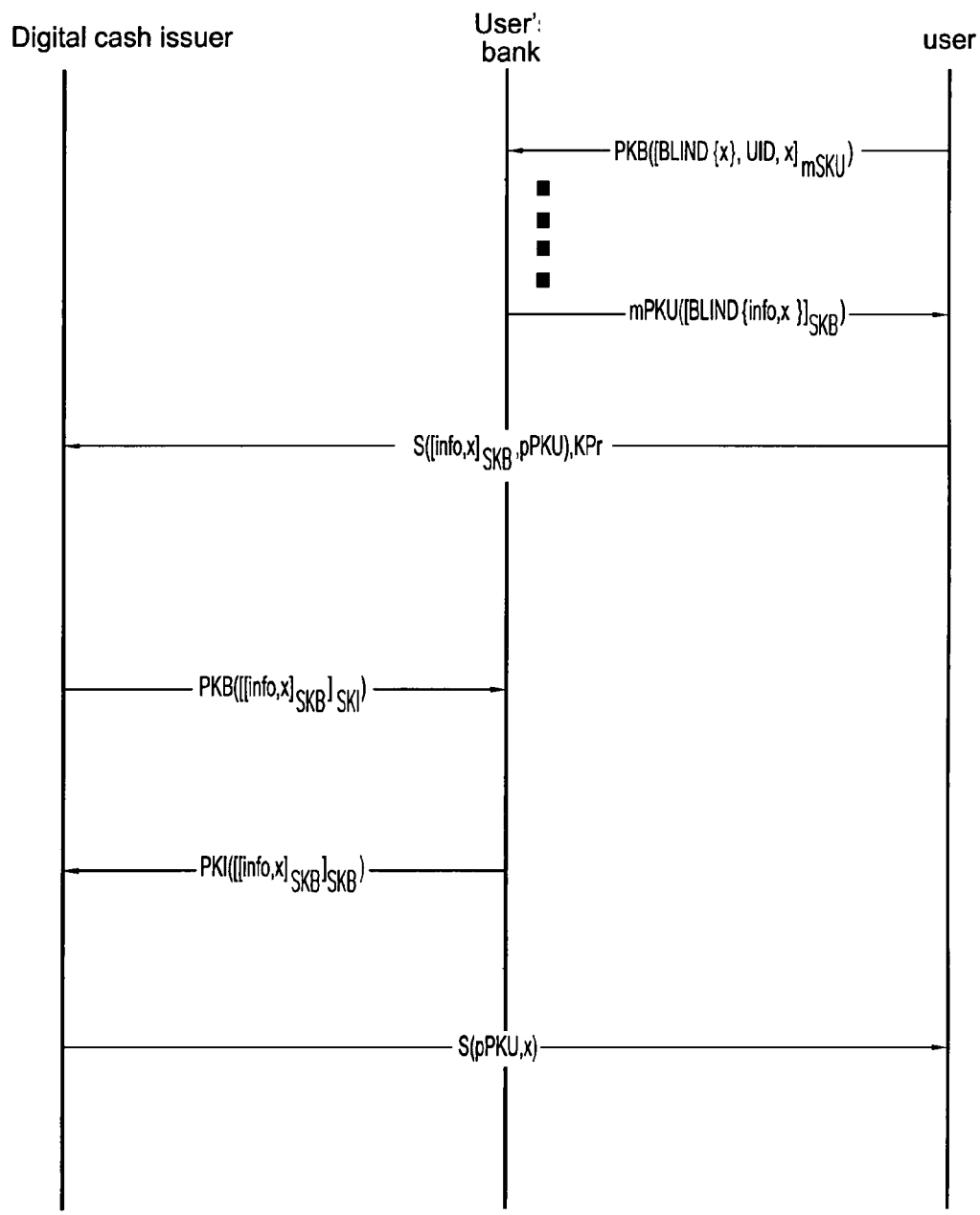
FIG. 29 is an exemplary withdrawal protocol according to the second embodiment.
Figure 30:
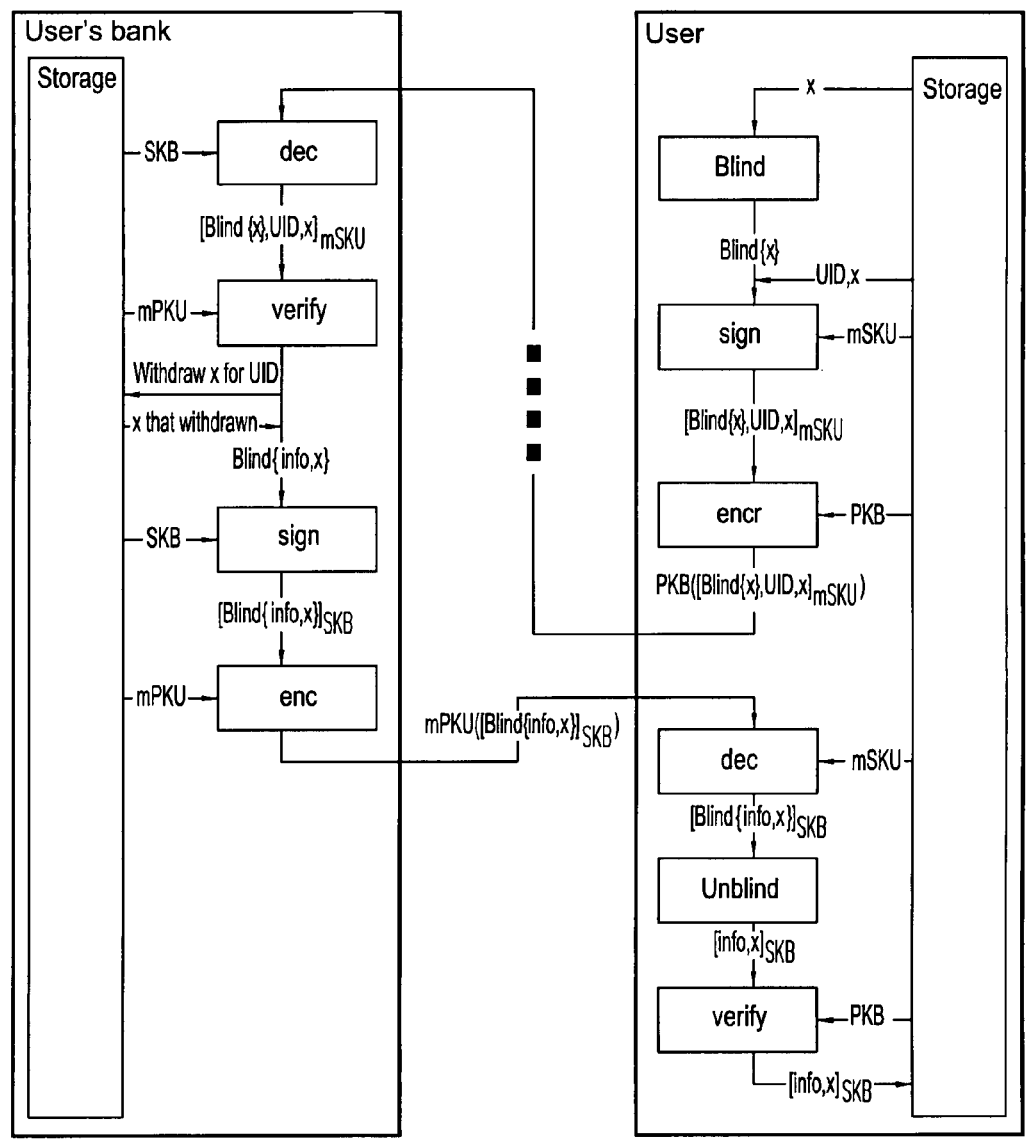
FIG. 30 is an exemplary withdrawal process part 1 according to the third embodiment.

FIG. 29 shows the diagrammatic representation of the withdrawal protocol, and FIGS. 30-33 show parts 1-4 of the withdrawal process. Referring to FIGS. 29 and 30, the user blinds the amount of digital cash x using any well known blinding signature scheme, and the signature generating program signs the blinded amount of digital cash Blind{x}, the user real identification UID, and the amount of money to be withdrawn x using the user's master secret key mSKU. The encryption program encrypts the information using the public key of the user's bank PKB and sends PKB([Blind{x},UID, x]$_{mSKU}$) to the user's bank via a communications path.

The user's bank decryption program decrypts PKB ([Blind{x},UID,x]$_{mSKU}$) using the user's bank's secret key SKB. The signature verifying program verifies the validity of the signature for authentication by using the master public key of the user mPKU. If the signature is valid, the amount of money x is withdrawn from the user account, and the signature generating program signs the blinded information and the amount of digital cash amount Blind(info,x), which is created by the cooperation between the user's bank and the user using any proposed blind signature scheme, using the bank's secret key SKB. The encryption program encrypts [Blind{info,x}]$_{SKB}$ using the master public key of the user mPKU and sends mPKU([BLIND{info,x}]$_{SKB}$) to the user via a communications path.

The user receives mPKU([BLIND{info,x}]$_{SKB}$), and the decryption program decrypts the information using the user's master secret key mSKU and un-blinds the signed blinded information and the amount of digital cash using any well know blind signature scheme. The user signature verifying program verifies the validity of the bank's signature using the public key of the user's bank PKB. If the signature is valid, the user stores the signed information and the amount of digital cash [info,x]$_{SKB}$ as a check in the storage device.

Figure 31:
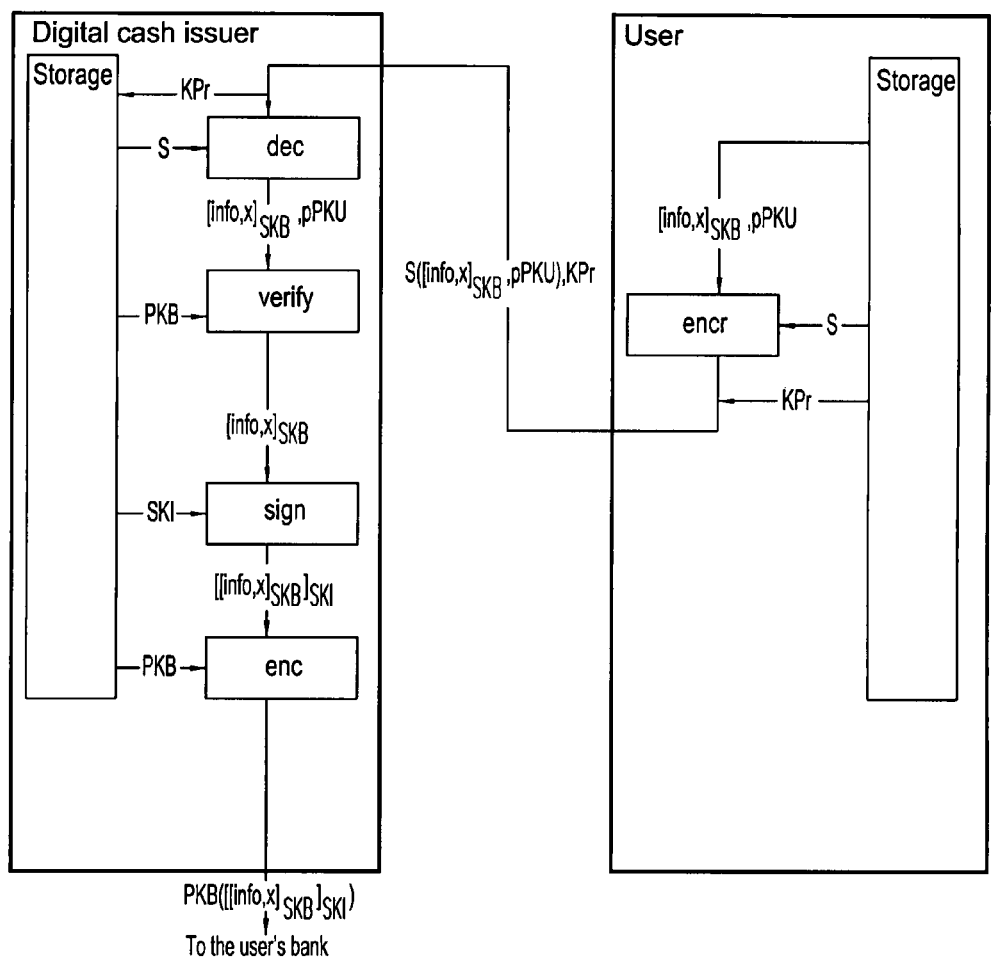
FIG. 31 is an exemplary withdrawal process part 2 according to the third embodiment.

Referring to FIG. 31, the user encryption program encrypts the check [info,x]$_{SKB}$ and the user's pseudonym public key pPKU using the user-issuer shared secret key S and sends S([info,x]$_{SKB}$,pPKU) and the key pointer KPr to the digital cash issuer.

The digital cash issuer receives S([info,x]$_{SKB}$,pPKU) and the key pointer KPr. The digital cash issuer searches for the user-issuer shared secret key S using the key pointer KPr. The decryption program decrypts S([info,x]$_{SKB}$,pPKU) using the user-issuer shared secret key S. The decrypted key is matched the user's pseudonym public key to authenticate the user. If the keys match, the user is authenticated. The digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKB}$]$_{SKI}$ using the public key of the user's bank PKB and sends PKB([[info,x]$_{SKB}$]$_{SKI}$) to the user's bank via a communications path.

Figure 32:
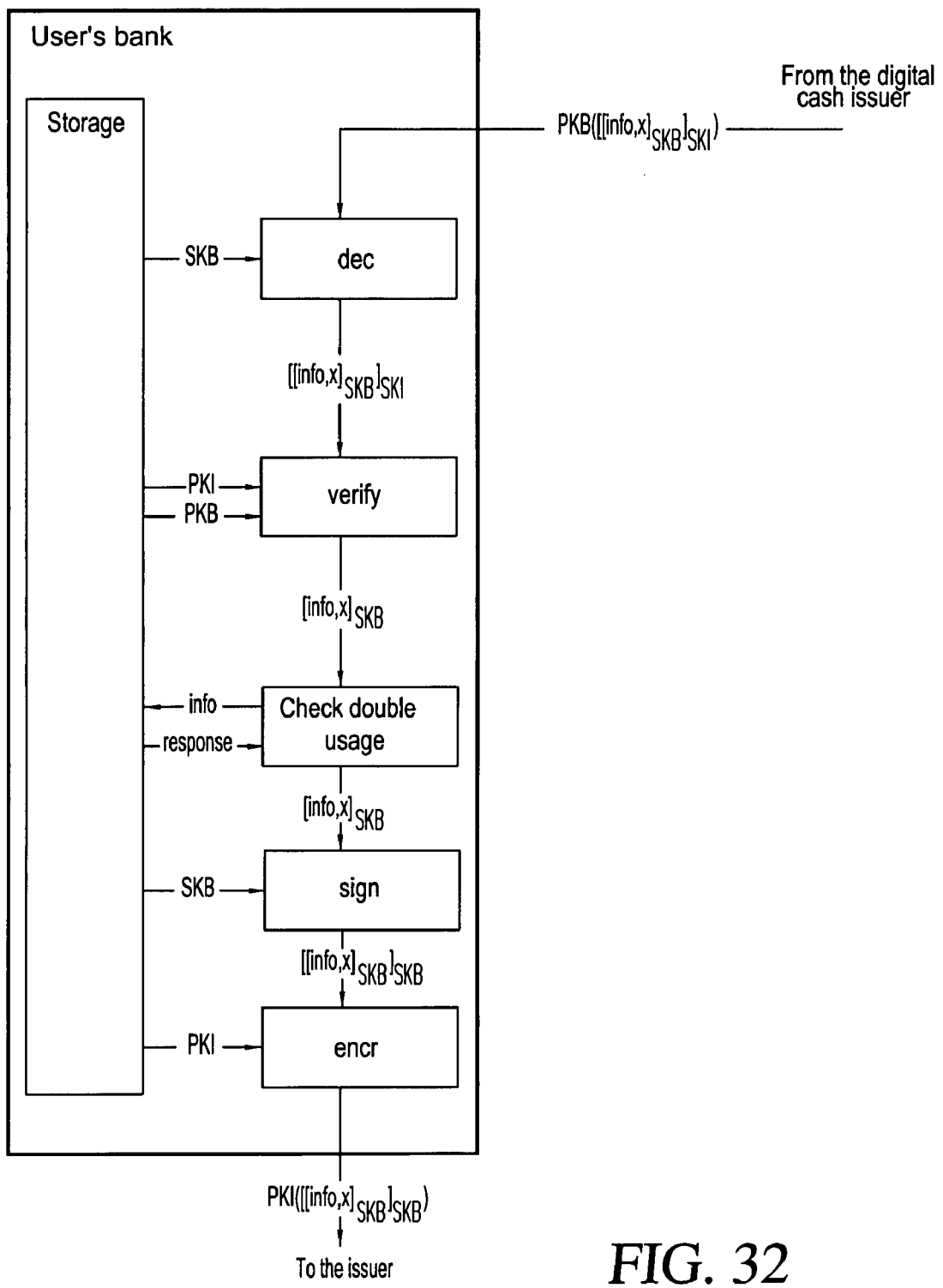
FIG. 32 is an exemplary withdrawal process part 3 according to the third embodiment.

Referring to FIG. 32, the user's bank receives PKB([[info, x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device, and the signature generating program signs the check [info, x]$_{SKB}$ using the secret key of the user's bank SKB. The encryption program encrypts [[info,x]$_{SKB}$]$_{SKB}$ using the digital cash issuer's public key PKI and sends PKI([[info, x]$_{SKB}$]$_{SKB}$) to the digital cash issuer via a communications path.

Figure 33:
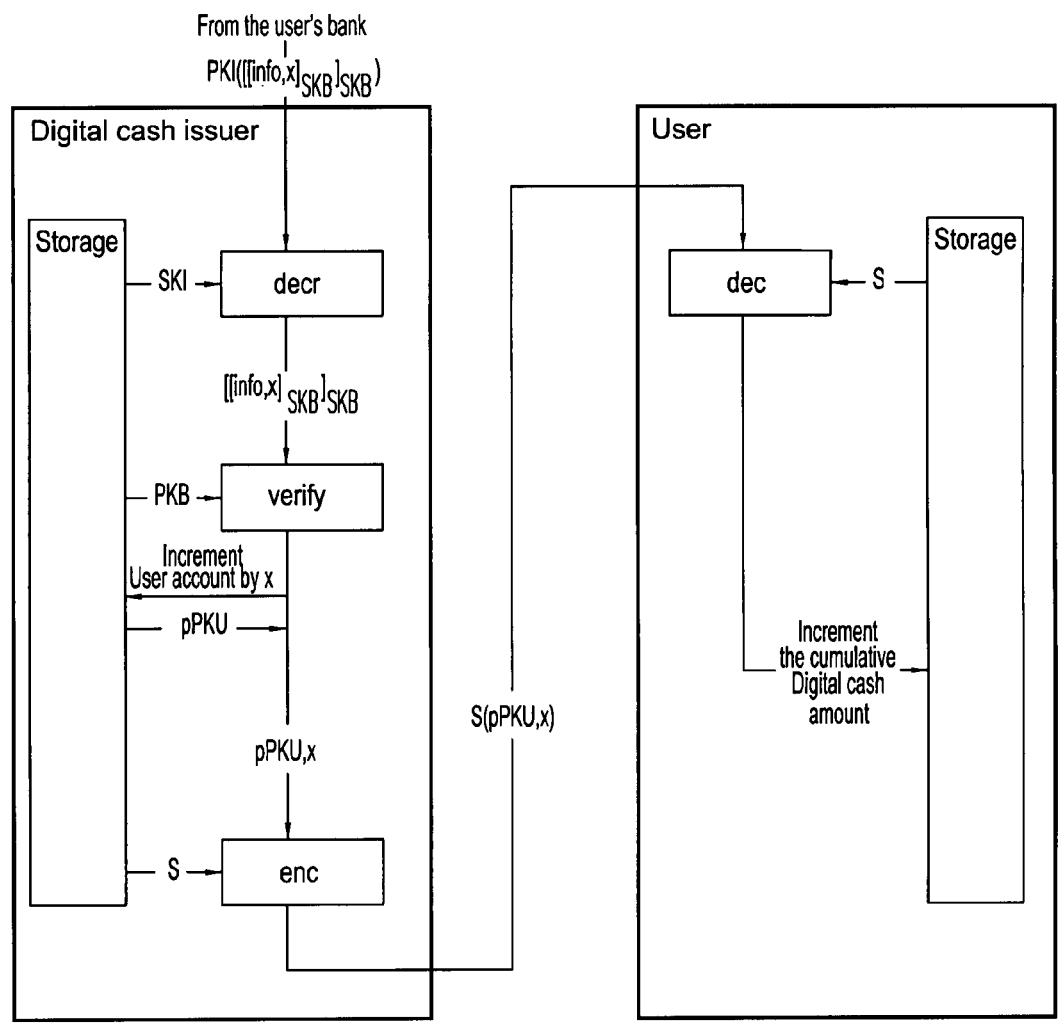
FIG. 33 is an exemplary withdrawal process part 4 according to the third embodiment.

Referring to FIG. 33, the digital cash issuer receives PKI ([[info,x]$_{SKB}$]$_{SKB}$). The decryption program decrypts the information using the digital cash issuer's secret key SKI and verifies the signature of the user's bank. If the signature is valid, the digital cash issuer increments the user's virtual account by the amount of digital cash x. The encryption program encrypts the pseudonym public key pPKU and digital cash amount x using the user-issuer shared secret key S and sends S(pPKU,x) to the user via a communications path.

The user receives S(pPKU,x), and the decryption program decrypts the information using the user-issuer shared secret key S to authenticate the digital cash issuer by matching the decrypted key with the user's pseudonym public key. If the keys match the digital cash issuer is authenticated, the cumulative amount of digital cash is incremented by the amount of digital cash x, and the new cumulative amount of digital cash is stored in the storage device of the user.

(3) Payment Procedure

The payment procedure is the same as that described above for FIGS. 10-13

Fourth Embodiment

In the previous embodiments, the withdrawal process and the payment process are done in fixed station, so the user has to go to the fixed station to buy or to get digital cash. For more convenience and accessibility for the user, the user uses mobile based device to buy and to get digital cash. The mobile based device has the minimum requirement to protect the security and privacy, because of the limit on storage and computational power.

(1) User Registration Procedure

The user registration procedure for this example is the same as described above for FIGS. 26-28.

(2) Withdrawal Procedure (Electronic Cash Issuing Procedure)

Figure 34:
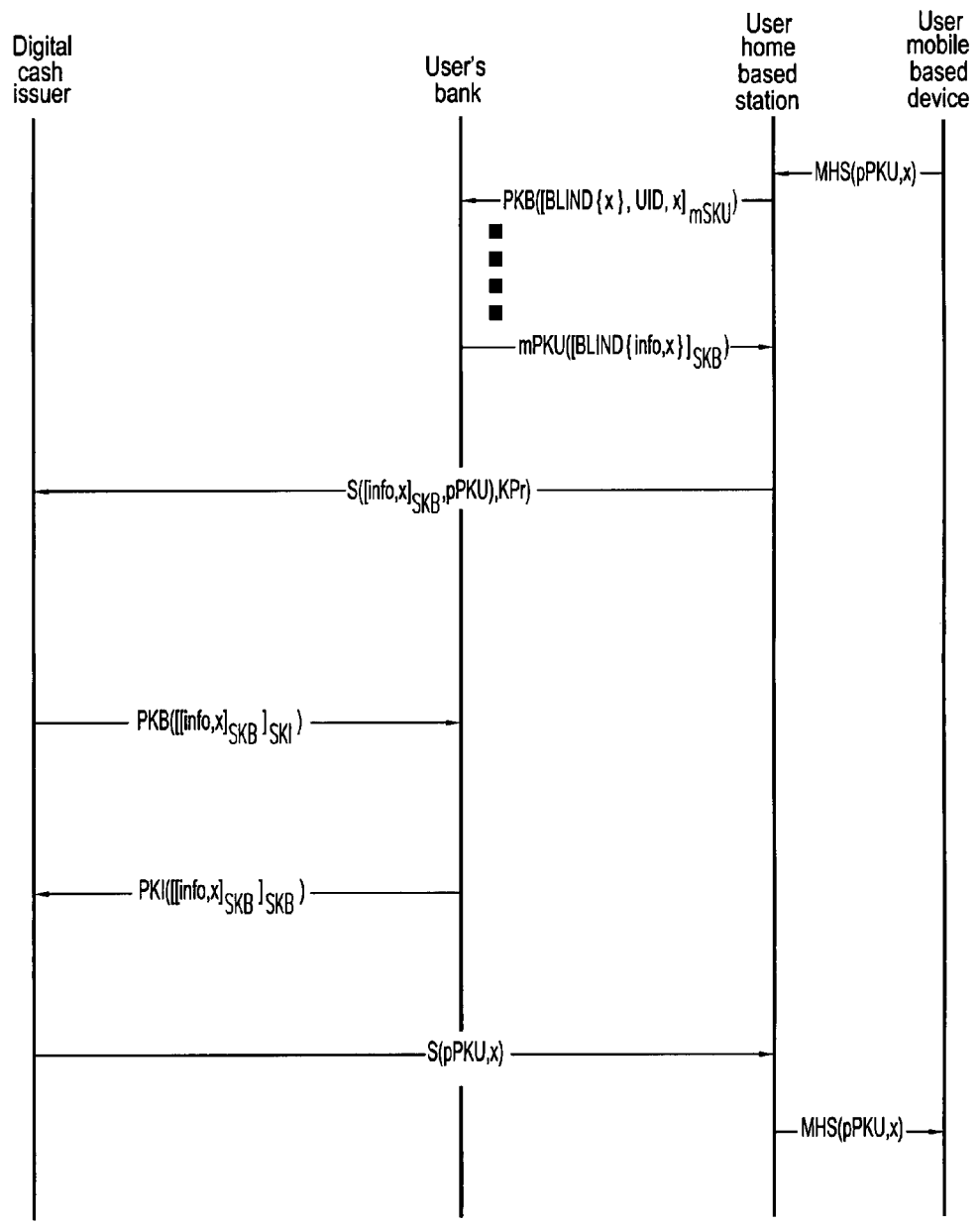
FIG. 34 is an exemplary withdrawal protocol according to the fourth embodiment.
Figure 35:
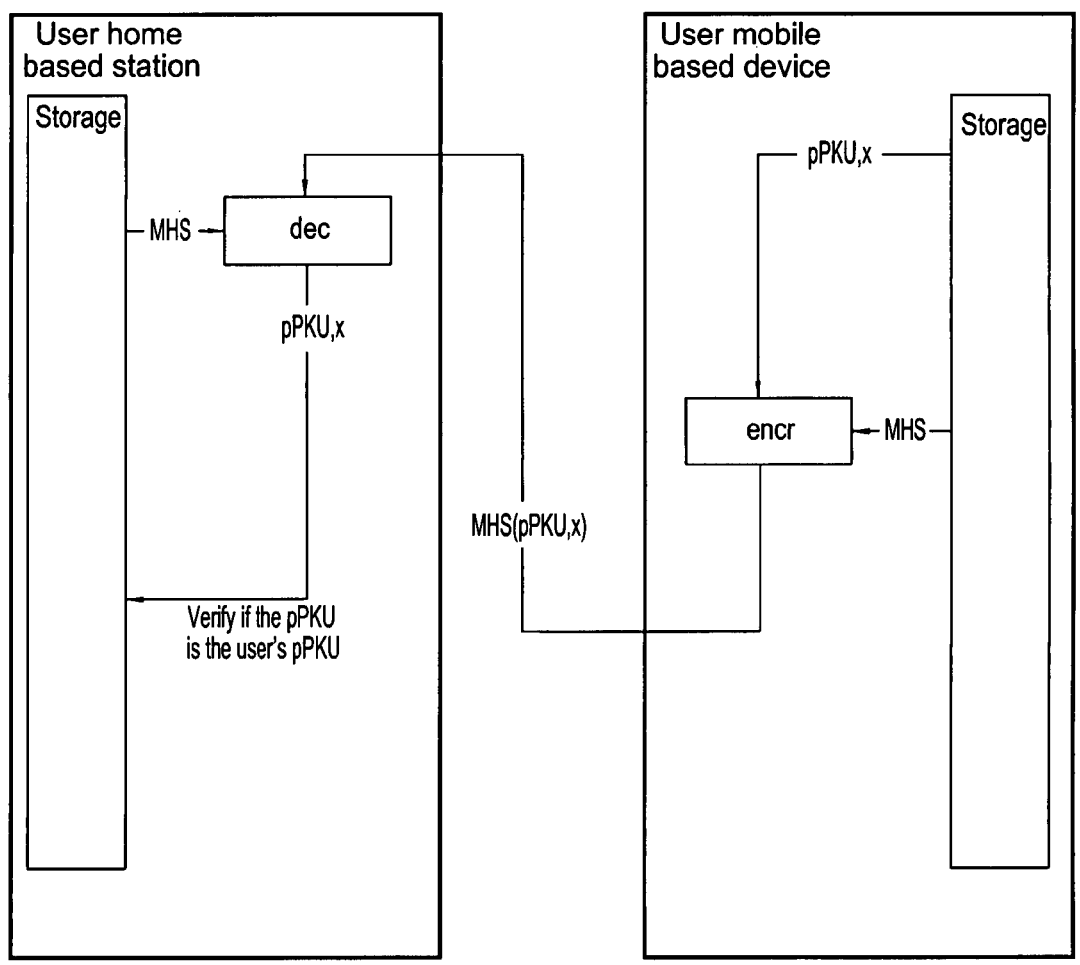
FIG. 35 is an exemplary withdrawal process part 1 according to the fourth embodiment.

FIG. 34 shows the diagrammatic representation of the withdrawal protocol, and FIGS. 35-40 show parts 1-6 of the withdrawal process. Referring to FIGS. 34 and 35, the user's mobile device encryption program encrypts the user's pseudonym public key pPKU and the amount of digital cash x using the mobile-home shared secret key MHS and sends the information MHS(pPKU,x) to the user's station.

The user's station receives the encrypted user's pseudonym public key and the amount of digital cash MHS(pPKU, x). The decryption program decrypts the information using the mobile-home shared secret key MHS and determines whether the decrypted key matches the user's pseudonym public key. The keys match, the user's mobile device is authenticated.

Figure 36:
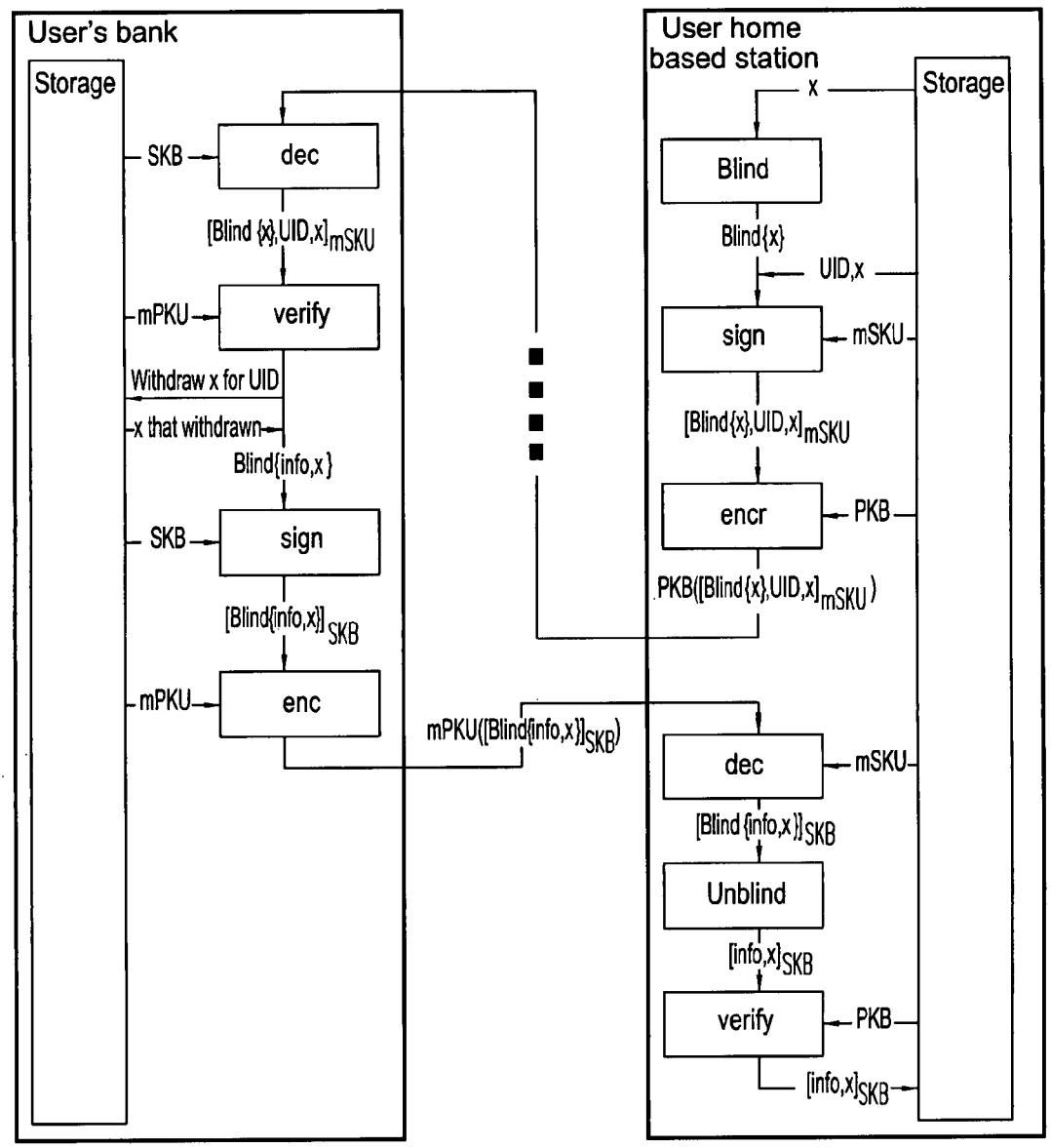
FIG. 36 is an exemplary withdrawal process part 2 according to the fourth embodiment.

Referring to FIG. 36, the user station blinds the amount of digital cash x using any well known blinding signature scheme. The signature generating program signs the blinded amount of digital cash Blind{x}, the user real identification UID, and the amount of money to be withdrawn x using the user's master secret key mSKU. The encryption program encrypts the information using the public key of the user's bank PKB and sends PKB([Blind{x},UID,x]$_{mSKU}$) to the user's bank via a communications path.

The user's bank decryption program decrypts PKB ([Blind{x},UID,x]$_{mSKU}$) using the user's bank's secret key SKB. The signature verifying program verifies the validity of the signature for authentication using the master public key of the user mPKU. If the signature is valid, the amount of money x is withdrawn from the user account. The signature generating program signs the blinded information and the amount of digital cash amount Blind(info,x), which may be created through cooperation between the user's bank and the user station using any well known blind signature scheme), using the bank's secret key SKB. The encryption program encrypts [Blind{info,x}]$_{SKB}$ using the master public key of the user mPKU and sends mPKU([BLIND{info,x}]$_{SKB}$) to the user station via a communications path.

The user receives mPKU([BLIND{info,x}]$_{SKB}$), and the decryption program decrypts the information using the user's master secret key mSKU. The blind signature scheme unblinds the signed blinded information and the amount of digital cash. The user signature verifying program verifies the validity of the bank's signature using the public key of the user's bank PKB. If the signatures is valid, the user stores the signed information and the amount of digital cash [info,x]$_{SKB}$ as a check in the storage device.

Figure 37:
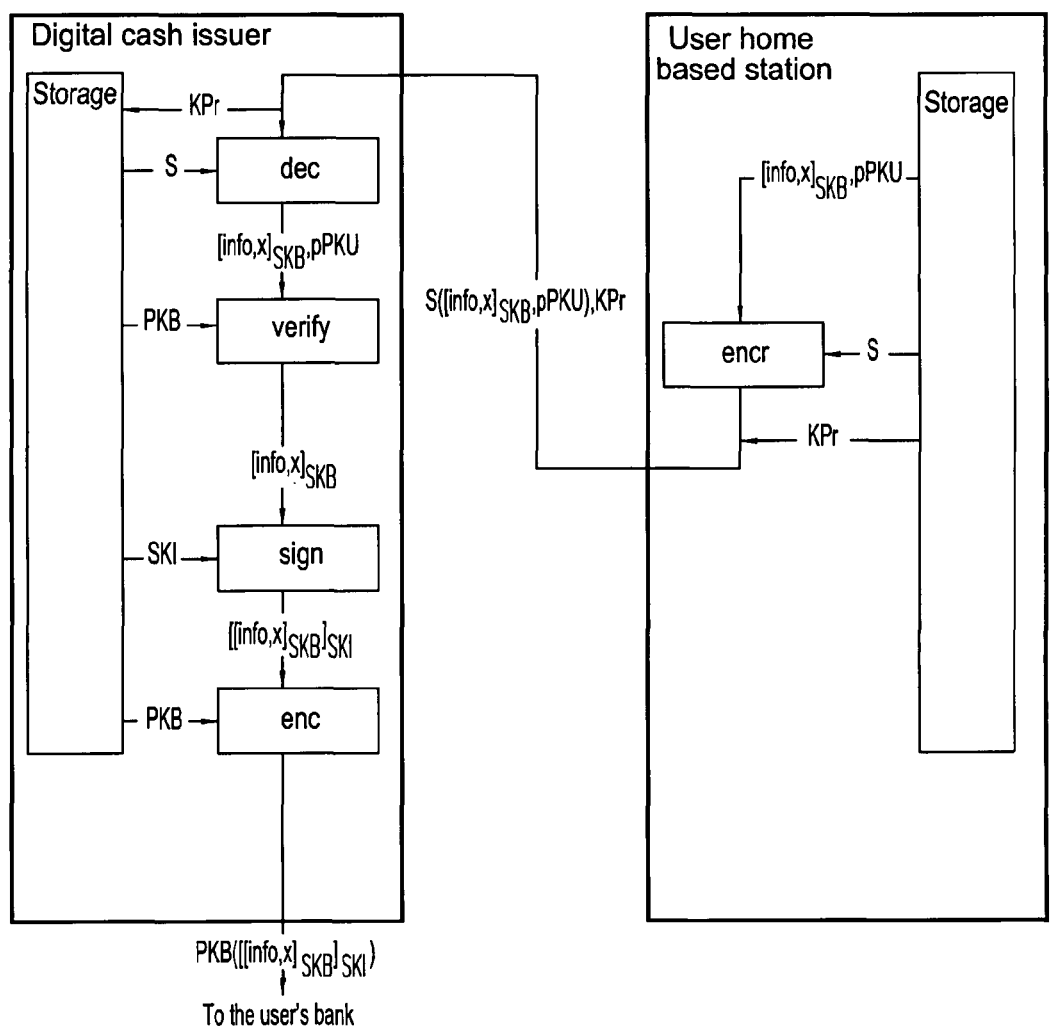
FIG. 37 is an exemplary withdrawal process part 3 according to the fourth embodiment.

Referring to FIG. 37, the user station encryption program encrypts the check [info,x]$_{SKB}$ and the user's pseudonym public key pPKU using the user-issuer shared secret key S and sends S([info,x]$_{SKB}$,pPKU) and the key pointer KPr to the digital cash issuer.

The digital cash issuer receives S([info,x]$_{SKB}$,pPKU) and the key pointer KPr. The digital cash issuer searches for the user-issuer shared secret key S using the key pointer KPr. The decryption program decrypts S([info,x]$_{SKB}$,pPKU) using the user-issuer shared secret key S to authenticate the user by matching the decrypted key with the user's pseudonym public key. If the keys match, the user is authenticated, and the digital cash issuer signature generating program verifies the signature of the bank [info,x]$_{SKB}$ using the public key of the user's bank PKB. If the signature is valid, the digital cash issuer signature generating program signs the check [info,x]$_{SKB}$ using the digital cash issuer's secret key SKI. The encryption program encrypts [[info,x]$_{SKB}$]$_{SKI}$ using the public key of the user's bank PKB and sends PKB([[info,x]$_{SKB}$]$_{SKI}$) to the user's bank via a communications path.

Figure 38:
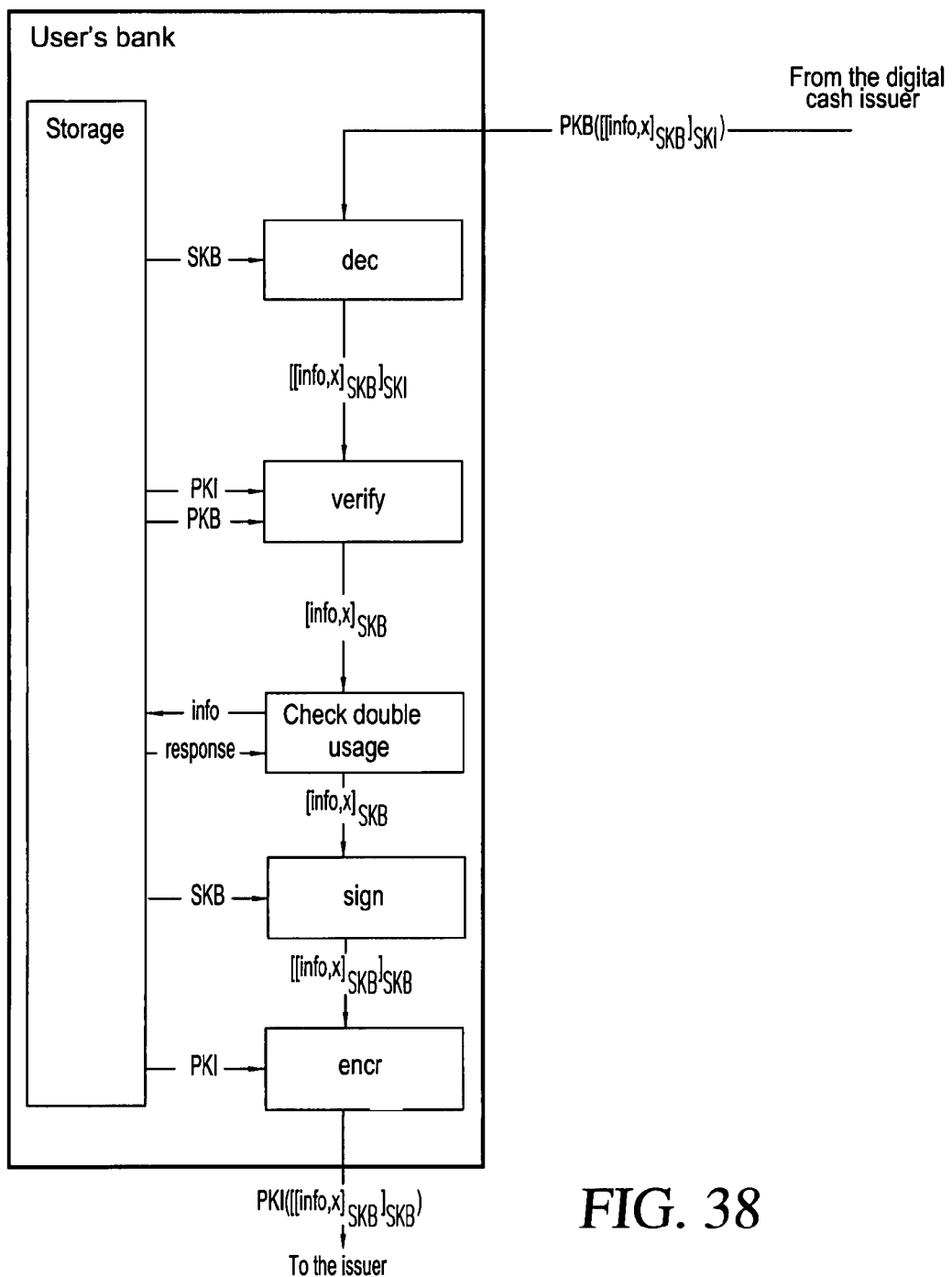
FIG. 38 is an exemplary withdrawal process part 4 according to the fourth embodiment.

Referring to FIG. 38, the user's bank receives PKB([[info,x]$_{SKB}$]$_{SKI}$), and the decryption program decrypts the information using the secret key of the user's bank. The signature verifying program verifies the signature of the digital cash issuer signature using the digital cash issuer's public key PKI. If the signature is valid, the signature verifying program verifies the signature of the user's bank using the public key of the user's bank. If the signature is valid, the bank determines whether the check [info,x]$_{SKB}$ was used. If the check was not used, the user's bank stores the check in the storage device and the signature generating program signs the check [info, x]$_{SKB}$ using the secret key of the user's bank SKB. The encryption program encrypts [[info,x]$_{SKB}$]$_{SKB}$ using the digital cash issuer's public key PKI and sends PKI([[info, x]$_{SKB}$]$_{SKB}$) to the digital cash issuer via a communications path.

Figure 39:
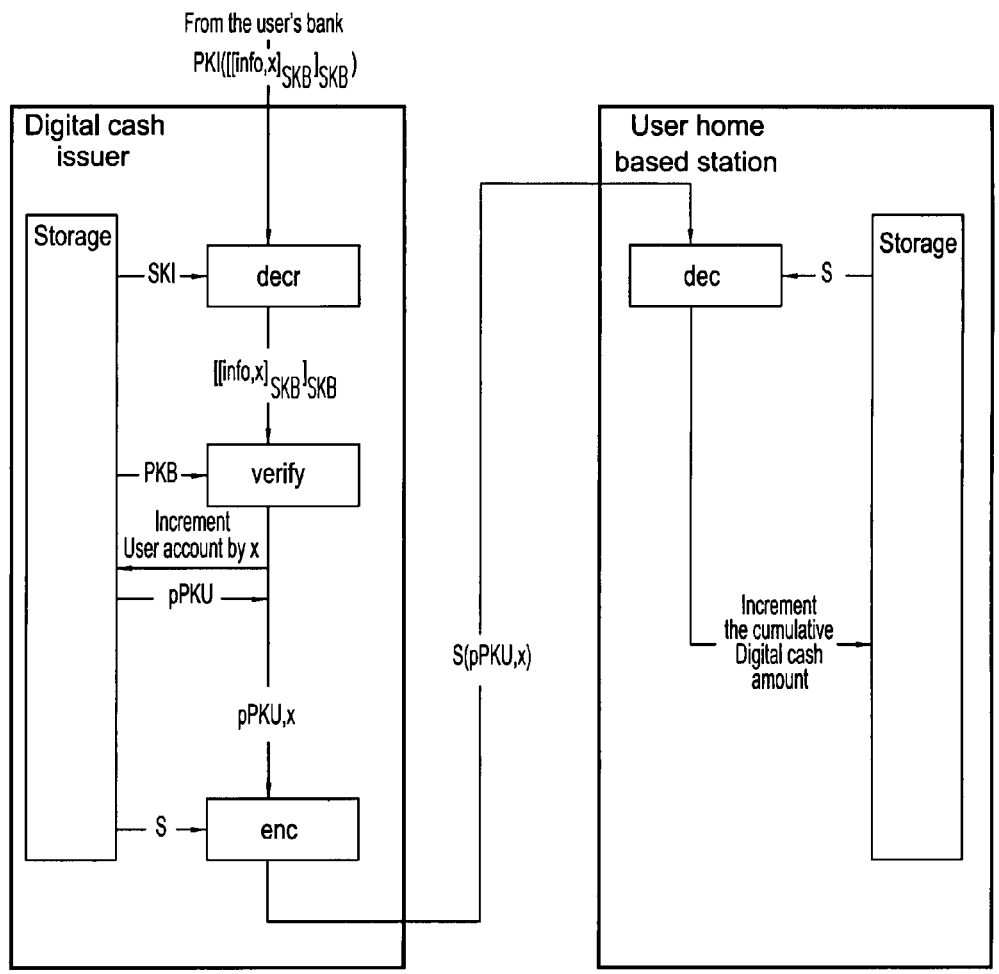
FIG. 39 is an exemplary withdrawal process part 5 according to the fourth embodiment.

Referring to FIG. 39, the digital cash issuer receives PKI ([[info,x]$_{SKI}$]$_{SKB}$). The decryption program decrypts the information using the digital cash issuer's secret key SKI and verifies the signature of the user's bank. If the signature is valid, the digital cash issuer increments the user's virtual account by the amount of digital cash x. The encryption program encrypts the pseudonym public key pPKU and digital cash amount x using the user-issuer shared secret key S and sends S(pPKU,x) to the user station via a communications path.

The user station receives S(pPKU,x), the decryption program decrypts the information using the user-issuer shared secret key S to authenticate the digital cash issuer by matching the decrypted key with the user's pseudonym public key. If the keys match, the digital cash issuer is authenticated, the cumulative amount of digital cash is incremented by the amount of digital cash x, and the new cumulative amount of digital cash is stored in the storage device by the user's home based station.

Figure 40:
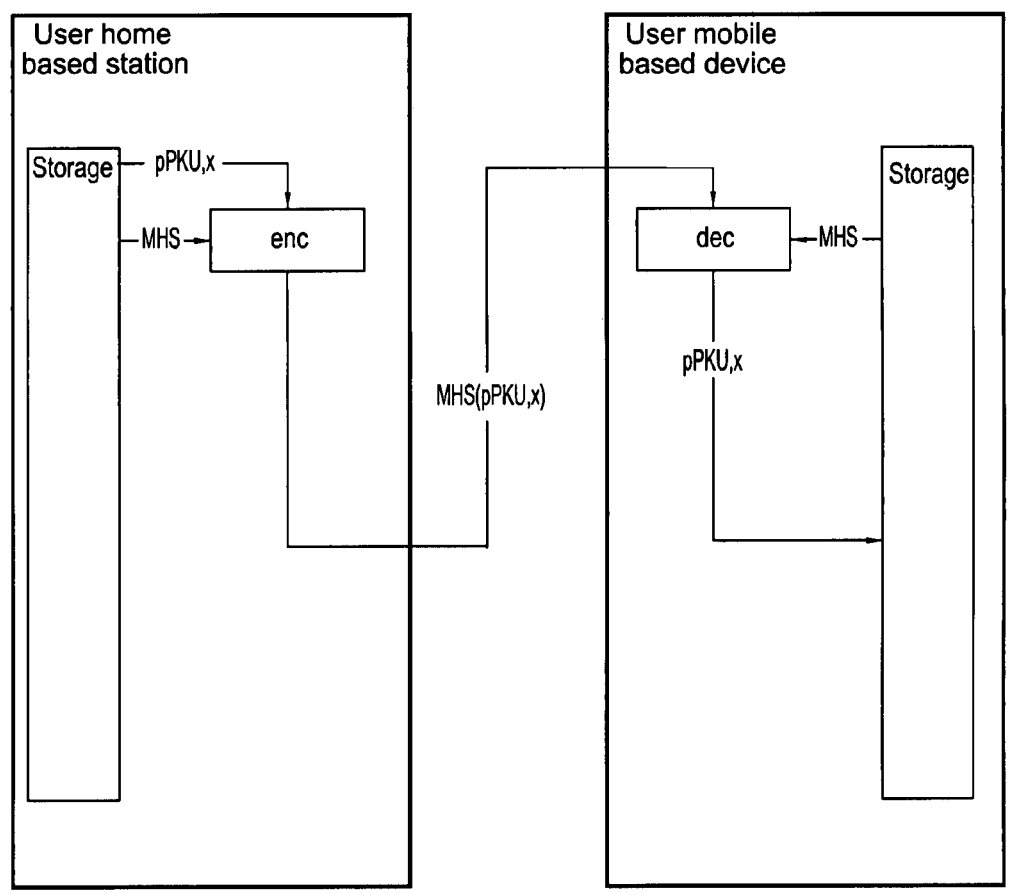
FIG. 40 is an exemplary withdrawal process part 6 according to the fourth embodiment.

Referring to FIG. 40, the user station encryption program encrypts the value of the new cumulative amount of digital cash x and the user's pseudonym public key pPKU using the mobile-home shared secret key MHS and sends MHS(pPKU, x) to the user's mobile based device via a communications path.

The user's mobile based device receives the encrypted value of the new cumulative amount of digital cash and the user's pseudonym public key MHS(pPKU,x). The decryption program decrypts the information using the mobile-home based shared secret key MHS and matches the decrypted key with the user's pseudonym public key to authenticate the user's home based station. If the keys match, the user stores the new cumulative amount of digital cash in the storage device of the user's mobile based device.

(3) Payment Procedure

The payment procedure is the same as that described above for FIGS. 21-25.

Fifth Embodiment

The previous embodiments described above are implemented as off-line protocols. However, these protocols may be modified for on-line operation. One possible example follows.

(1) User Registration Procedure

The user registration protocol is the same as described above for FIGS. 2-4.

(2) Withdrawal Procedure (Electronic Cash Issuing Procedure)

The withdrawal procedure is the same as that described above for FIGS. 5-9.

(3) Payment Procedure

Figure 41:
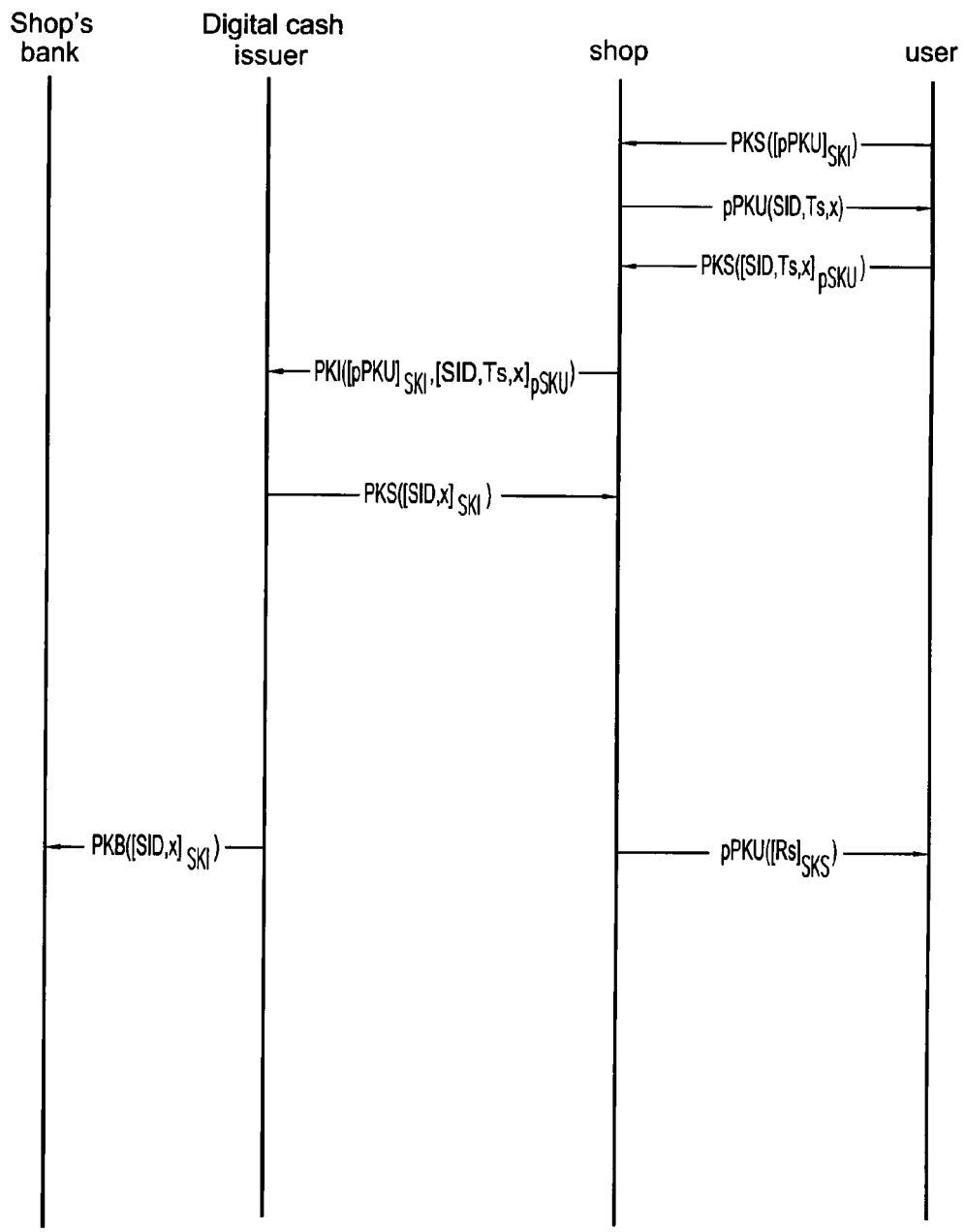
FIG. 41 is an exemplary payment protocol according to the fifth embodiment.
Figure 42:
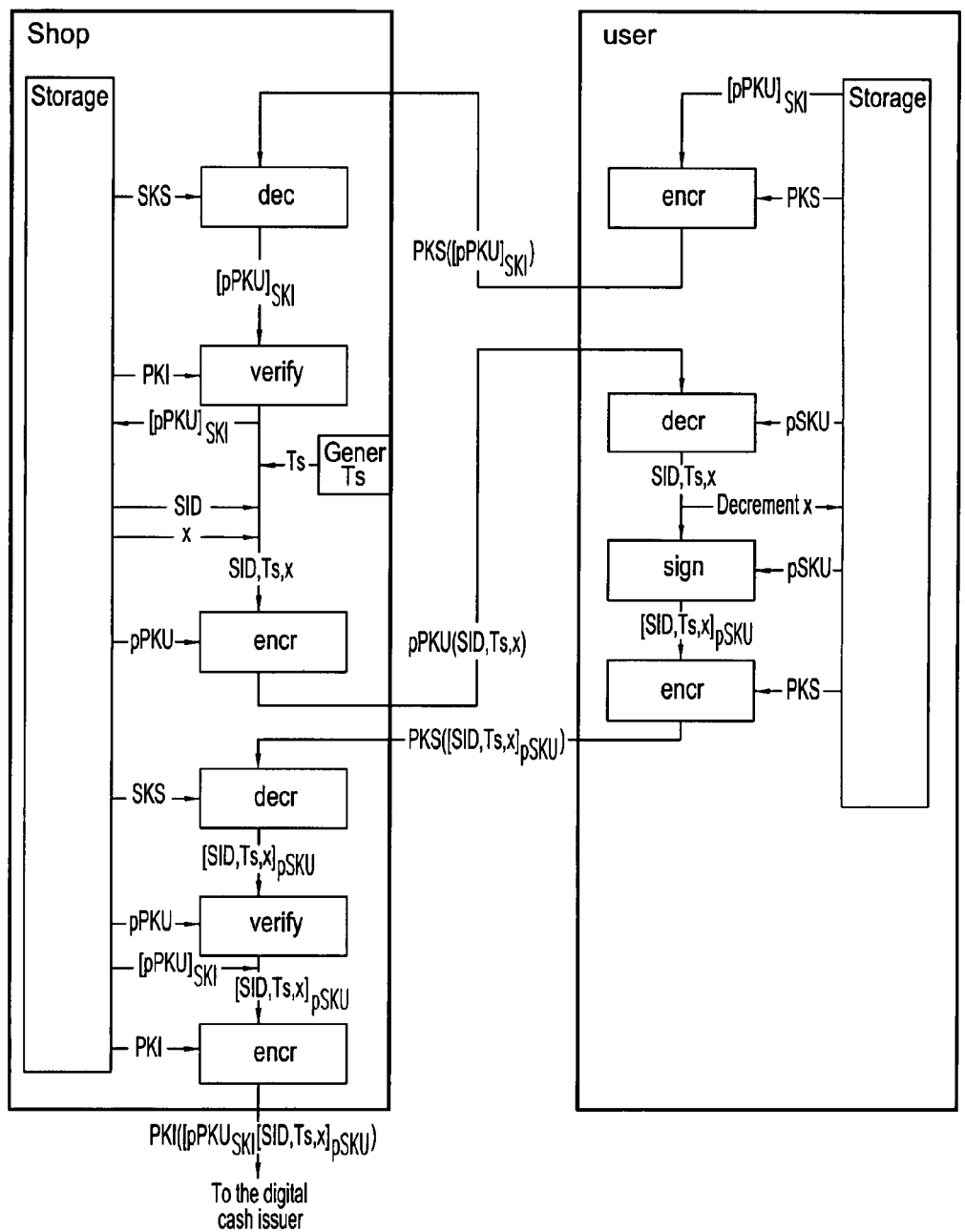
FIG. 42 is an exemplary payment process part 1 according to the fifth embodiment.

FIG. 41 shows the diagrammatic representation of the payment protocol, and FIGS. 42-45 show parts 1-4 of the payment process. Referring to FIGS. 41 and 42, the user encryption program encrypts the digital cash issuer license [pPKU]$_{SKI}$ using the public of the shop PKS and sends license to the shop as request for payment.

The shop decryption program decrypts the encrypted digital cash issuer license PKS([pPKU]$_{SKI}$) using the shop's secret key SKS. The signature verifying program verifies the signature of the issuer with the digital cash issuer public key PKI. If the signature is valid, the shop stores the user's digital cash issuer license and the time generating program generates the time Ts. The encryption program encrypts the shop identification SID, Ts, and the price of payment x using the user's pseudonym public key pPKU and sends pPKU(SID,Ts,x) to the user via a communications path.

The user receives pPKU(SID,Ts,x). The decryption program decrypts the information using the user's pseudonym secret key pSKU and decrements the cumulative amount of digital cash in the user's storage device by x. The signature generating program signs the shop identification SID, the time Ts, and the price of payment x using the user's pseudonym secret key pSKU. The encryption program encrypts the information using the public key of the shop PKS and sends PKS([SID,Ts,x]$_{pSKU}$) to the shop via a communications path.

The shop receives the information PKS([SID,Ts,x]$_{pSKU}$), and the decryption program decrypts the information using the shop's secret key SKS. The signature verifying program verifies the signature sing the user's pseudonym public key pPKU. If the signature is valid, the shop encryption program encrypts the user's digital cash issuer license [pPKU]$_{SKI}$ and [SID,Ts,x]$_{pSKU}$ using the public key of the digital cash issuer PKI and sends PKI([pPKU]$_{SKI}$, [SID,Ts,x]$_{pSKU}$) to the digital cash issuer via a communications path.

Figure 43:
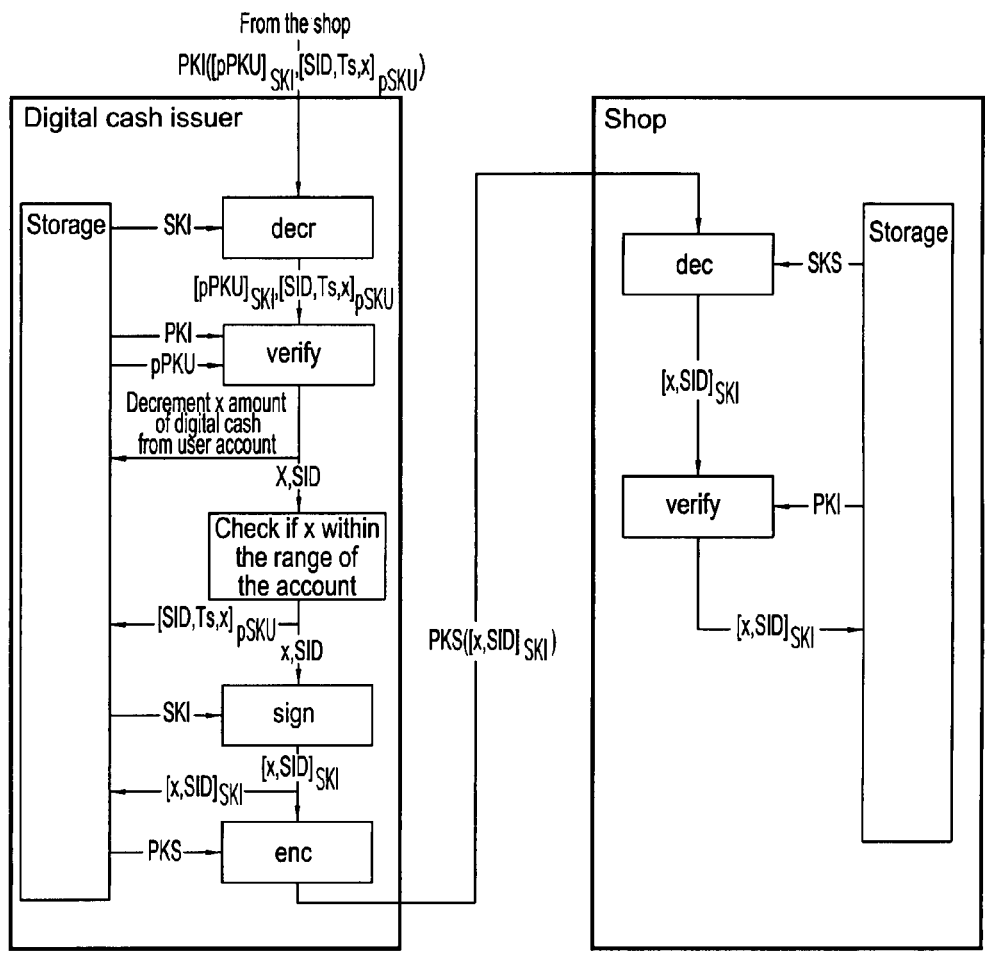
FIG. 43 is an exemplary payment process part 2 according to the fifth embodiment.

Referring to FIG. 43, the digital cash issuer decryption program decrypts PKI([pPKU]$_{SKI}$, [SID,Ts,x]$_{pSKU}$) using the secret key of the digital cash issuer SKI. The signature verifying program verifies the validity of the signatures using the digital cash issuer's public key PKI and the user's pseudonym public key pPKU. If the signatures are valid, the digital cash issuer decrements the user virtual account by the amount of payment x. If the digital cash issuer determines that the user has spent more than the amount in the virtual account, the real identity is revealed by sending the user's pseudonym public key pPKU to the certificate authority. If not, the digital cash issuer stores the challenge [SID,Ts,x]$_{pSKU}$, and the signature generating program signs the shop identification SID and the amount of digital cash x with the digital cash issuer's secret key SKI. [SID,x]$_{SKI}$ is temporarily stored to be sent to the shop's bank. The encryption program encrypts the information using the public key of the shop PKS and sends PKS ([SID,x]$_{SKI}$) to the shop via a communications path.

The shop receives PKS([SID,x]$_{SKI}$), and the decryption program decrypts the information using the secret key SKS. The signature verifying program verifies the signature with the public key of the issuer PKI.

Figure 44:
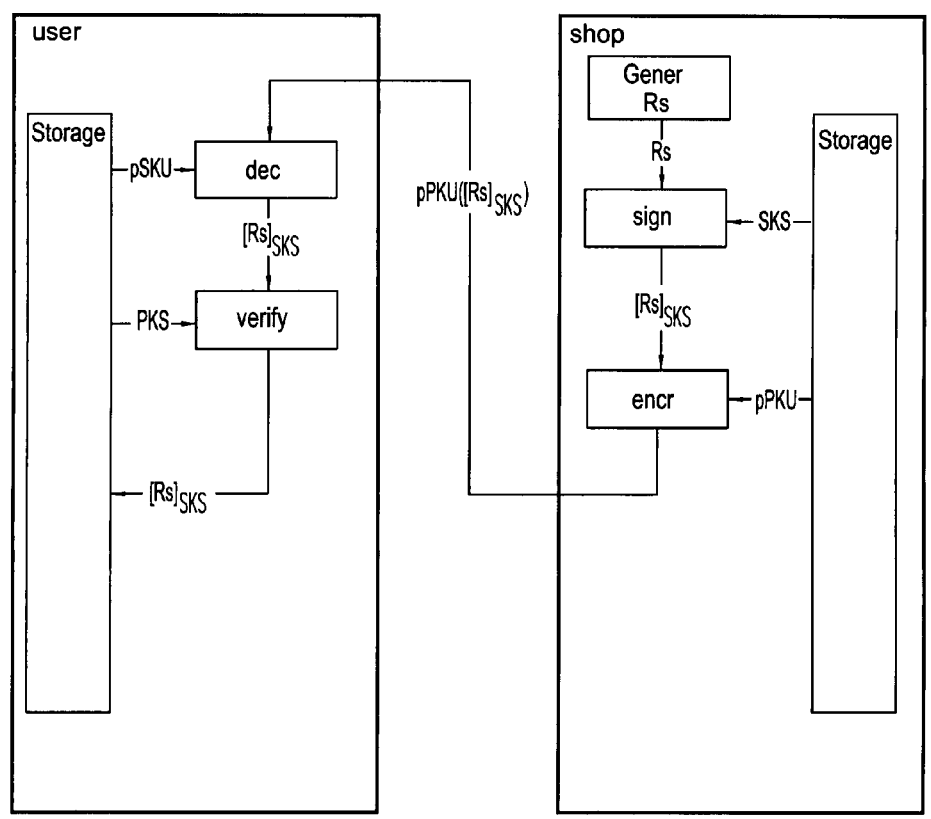
FIG. 44 is an exemplary payment process part 3 according to the fifth embodiment.

Referring to FIG. 44, if the signature is valid, the shop random number generating program generates a random number Rs and the signature generating program signs Rs with the shop's secret key SKS. The encryption program encrypts the signed random number [RS]$_{SKS}$ using the user's pseudonym public key pPKU and sends pPKU([Rs]$_{SKS}$) to the user via a communications path.

The user receives pPKU([Rs]$_{SKS}$), and the decryption program decrypt the information using the user's pseudonym secret key pSKU and stores [Rs]$_{SKS}$ in the storage device.

Figure 45:
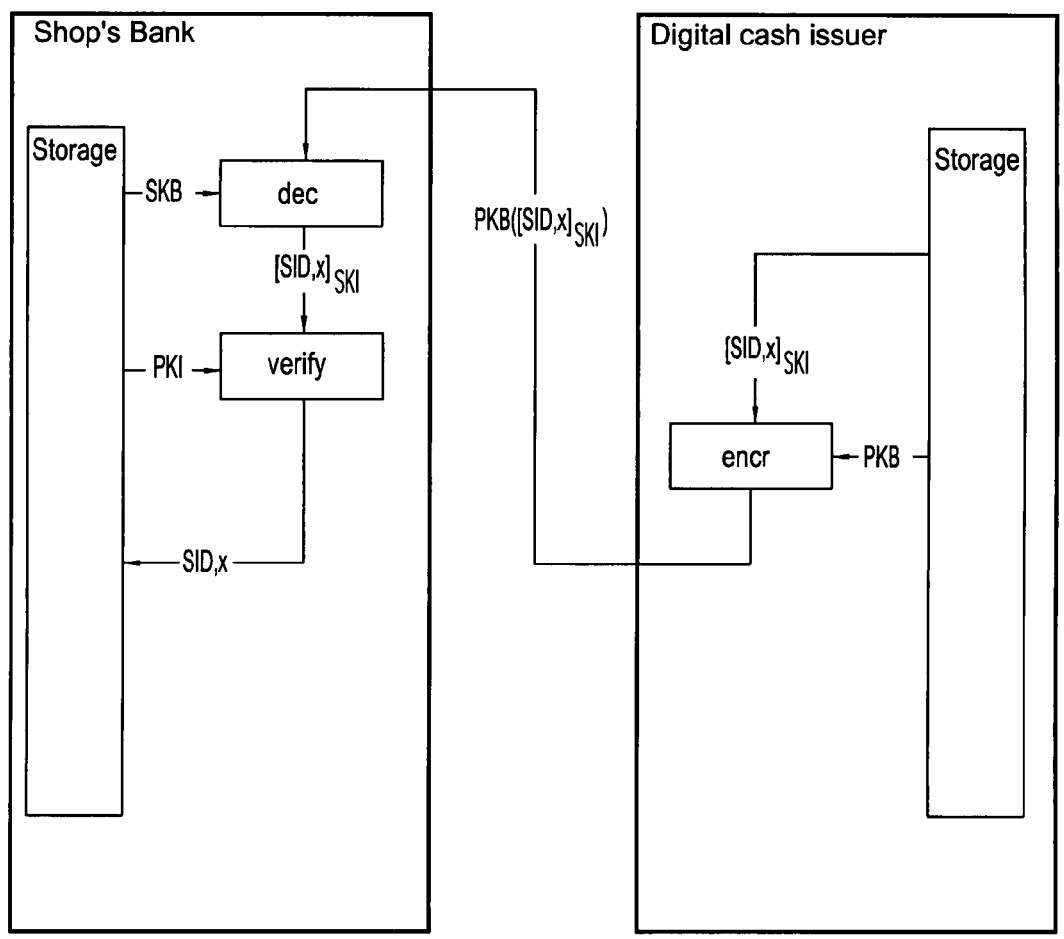
FIG. 45 is an exemplary payment process part 4 according to the fifth embodiment.

Referring to FIG. 45, the digital cash issuer retrieves the signed shop identification SID and the signed amount x to be deposited for the shop [SID,x]$_{SKI}$. The encryption program encrypts the information using the public key of the shop's bank PKB and sends PKB([SID,x]$_{SKI}$) to the shop's bank via a communications channel.

The shop's bank receives PKB([SID,x]$_{SKI}$), and the decryption program decrypts the information using the secret key SKB. The signature verifying program verifies the signature with the public key of the issuer PKI. If the signature is valid, the shop's bank add x amount of money to the shop account.

Sixth Embodiment

Figure 46:
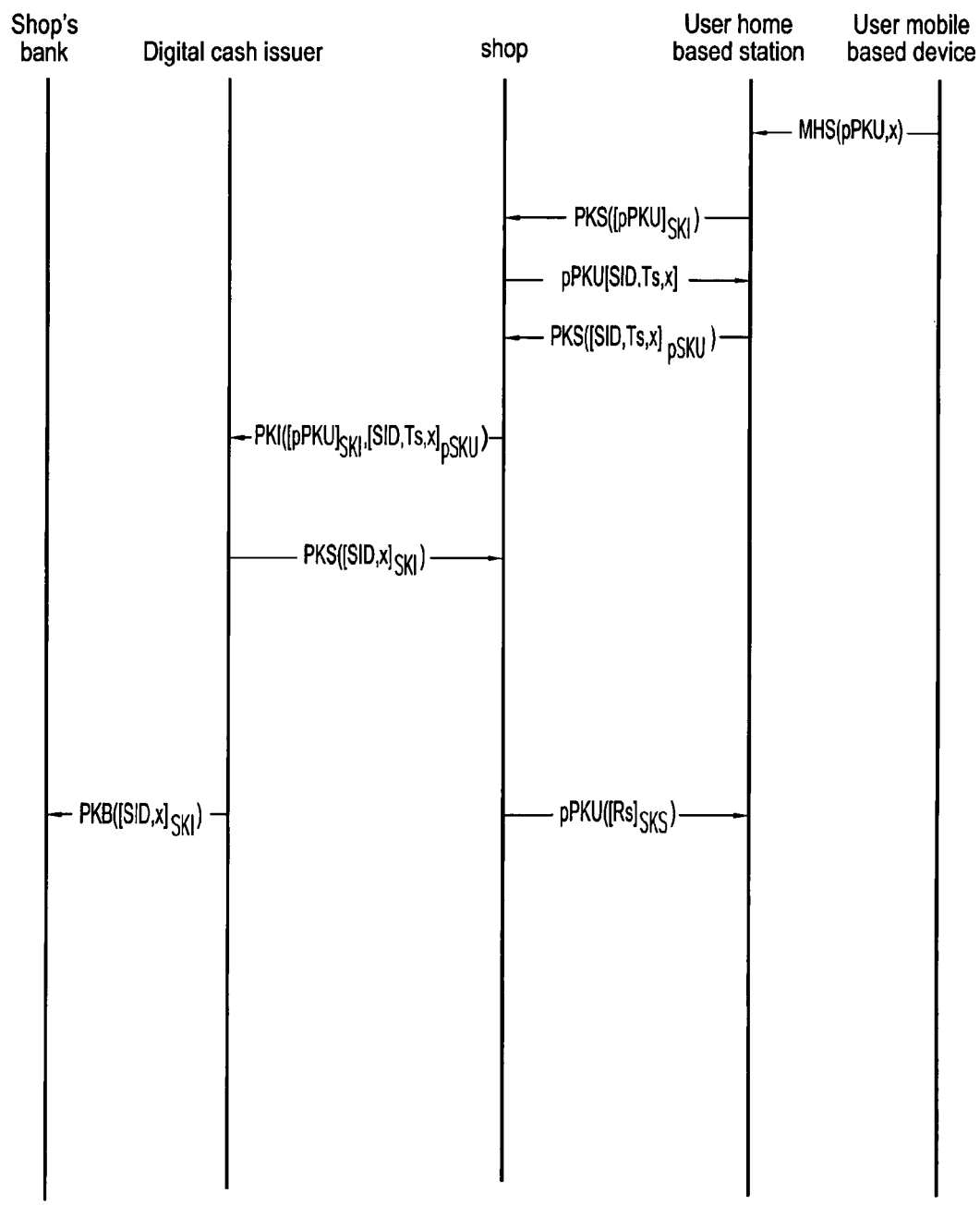
FIG. 46 is an exemplary payment protocol according to the sixth embodiment.
Figure 47:
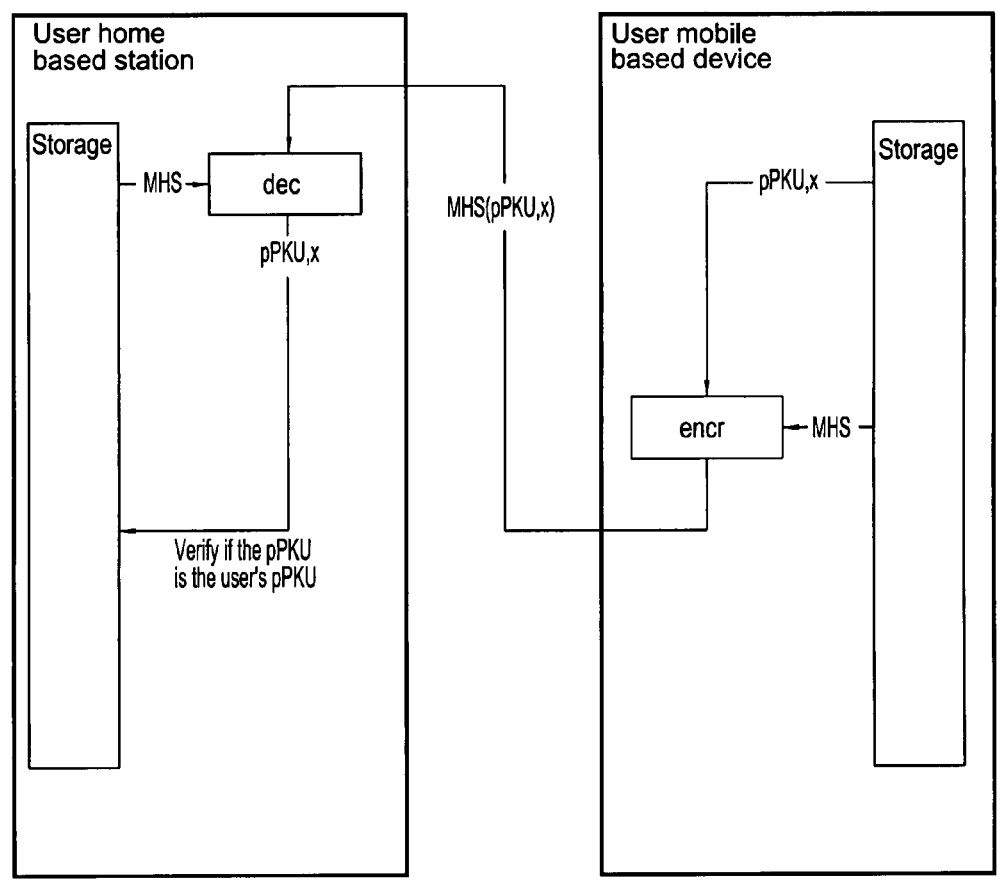
FIG. 47 is an exemplary payment process part 1 according to the sixth embodiment.

This is an online protocol with a mobile device.
(1) User Registration Procedure
The user registration procedure for this example is the same as described above for FIGS. 2-4.
(2) Withdrawal Procedure (Electronic Cash Issuing Procedure)
The withdrawal procedure for this example is the same as described above for FIGS. 14-20.
(3) Payment Procedure
FIG. 46 shows the diagrammatic representation of the payment protocol, and FIGS. 47-51 show parts 1-5 of the payment process. Referring to FIGS. 46 and 47, the user's mobile device encryption program encrypts the user's pseudonym public key pPKU and the price of the good x using the mobile-home shared secret key MHS and sends MHS(pPKU,x) to the user's station.

The user's station receives MHS(pPKU,x). The decryption program decrypts the information using the mobile-home shared secret key MHS, and determines whether the decrypted key matches the user's pseudonym public key to authenticate the user's mobile based device.

Figure 48:
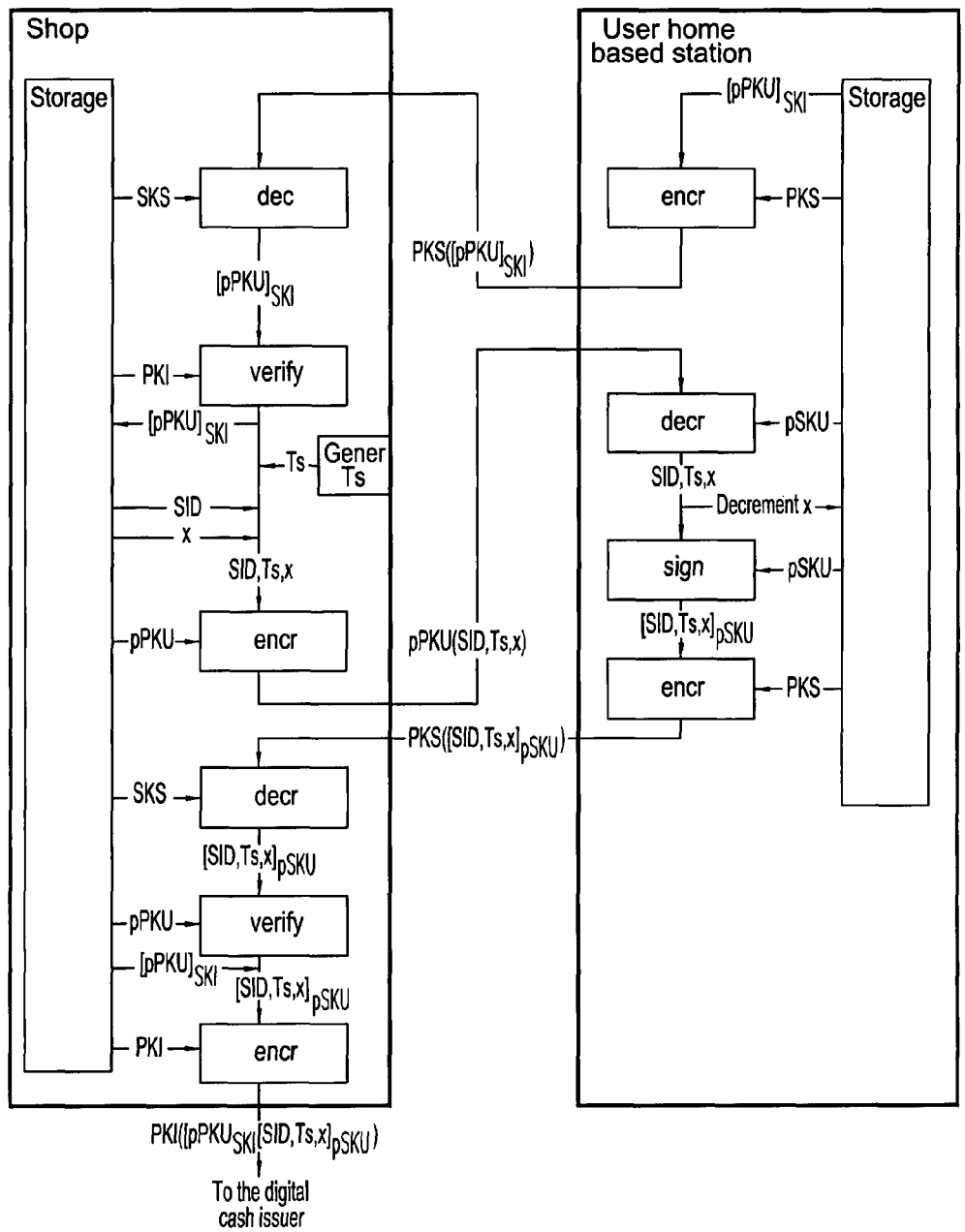
FIG. 48 is an exemplary payment process part 2 according to the sixth embodiment.

Referring to FIG. 48, the user station encryption program encrypts the digital cash issuer license [pPKU]$_{SKI}$ using the public key of the shop PKS then sends the information to the shop as request for payment via a communications path.

The shop decryption program decrypts the encrypted digital cash issuer license PKS([pPKU]$_{SKI}$) using the shop's secret key SKS. The signature verifying program verifies the signature of the issuer with the digital cash issuer public key PKI. If the signature is valid, the shop stores the user's digital cash issuer license, and the time generating program generates the time Ts. The encryption program encrypts the shop identification SID, Ts, and the price of payment x using the user's pseudonym public key pPKU and sends pPKU(SID,Ts,x) to the user station via a communications path.

The user station receives pPKU(SID,Ts,x). The decryption program decrypts the information using the user's pseudonym secret key pSKU and decrements the cumulative amount of digital cash in the user's storage device by x if the decrypted price equals the price of the good sent by the user's mobile based device, the signature generating program signs the shop identification SID, the time Ts, and the price of payment x using the user's pseudonym secret key pSKU. The encryption program encrypts the information using the public key of the shop PKS and sends PKS([SID,Ts,x]$_{pSKU}$) to the shop via a communications path.

The shop receives the information PKS([SID,Ts,x]$_{pSKU}$). The decryption program decrypts the information using the shop's secret key SKS. The signature verifying program verifies the signature using the user's pseudonym public key pPKU. If the signature is valid, the shop encryption program encrypts the user's digital cash issuer license [pPKU]$_{SKI}$ and [SID,Ts,x]$_{pSKU}$ using the public key of the digital cash issuer PKI and sends PKI([pPKU]$_{SKI}$, [SID,Ts,x]$_{pSKU}$) to the digital cash issuer.

Figure 49:
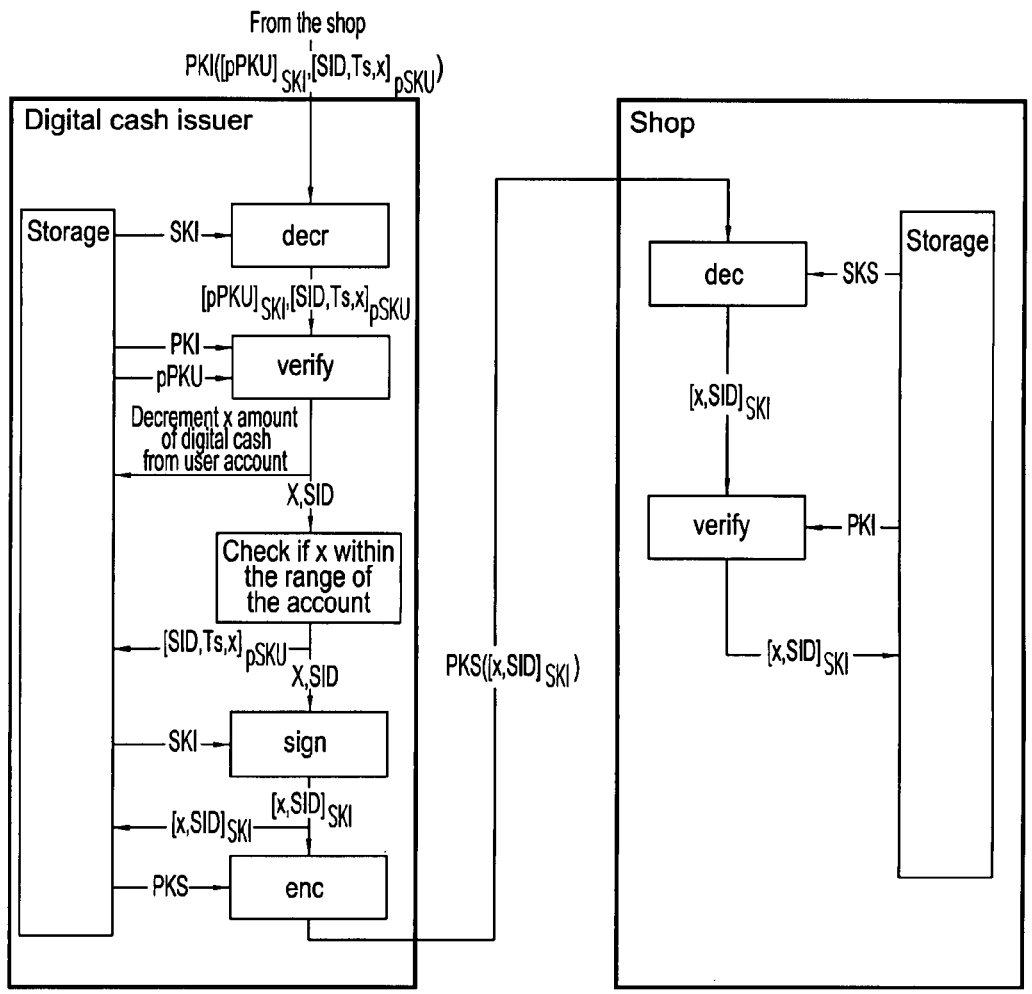
FIG. 49 is an exemplary payment process part 3 according to the sixth embodiment.

Referring to FIG. 49, the digital cash issuer decryption program decrypts PKI([pPKU]$_{SKI}$, [SID,Ts,x]$_{pSKU}$) using the secret key of the digital cash issuer SKI. The signature verifying program verifies the validity of the signatures using the digital cash issuer's public key PKI and the user's pseudonym public key pPKU. If the signatures are valid, the digital cash issuer decrements the user virtual account by the amount of payment x. If the digital cash issuer discovers that the user has spent more than is available in the virtual account, the real identity is revealed by sending the user's pseudonym public key pPKU to the certificate authority. If not, the digital cash issuer stores the challenge [SID,Ts,x]$_{pSKU}$ and the signature generating program signs the shop identification SID and the amount of digital cash x with the digital cash issuer's secret key SKI. [SID,x]$_{SKI}$ is temporarily stored to be to the shop's bank. The encryption program encrypts the information using the public key of the shop PKS and sends PKS([SID,x]$_{SKI}$) to the shop via a communications path.

The shop receives PKS([SID,x]$_{SKI}$), and the decryption program decrypts the information using the secret key SKS. The signature verifying program verifies the signature with the public key of the issuer PKI.

Figure 50:
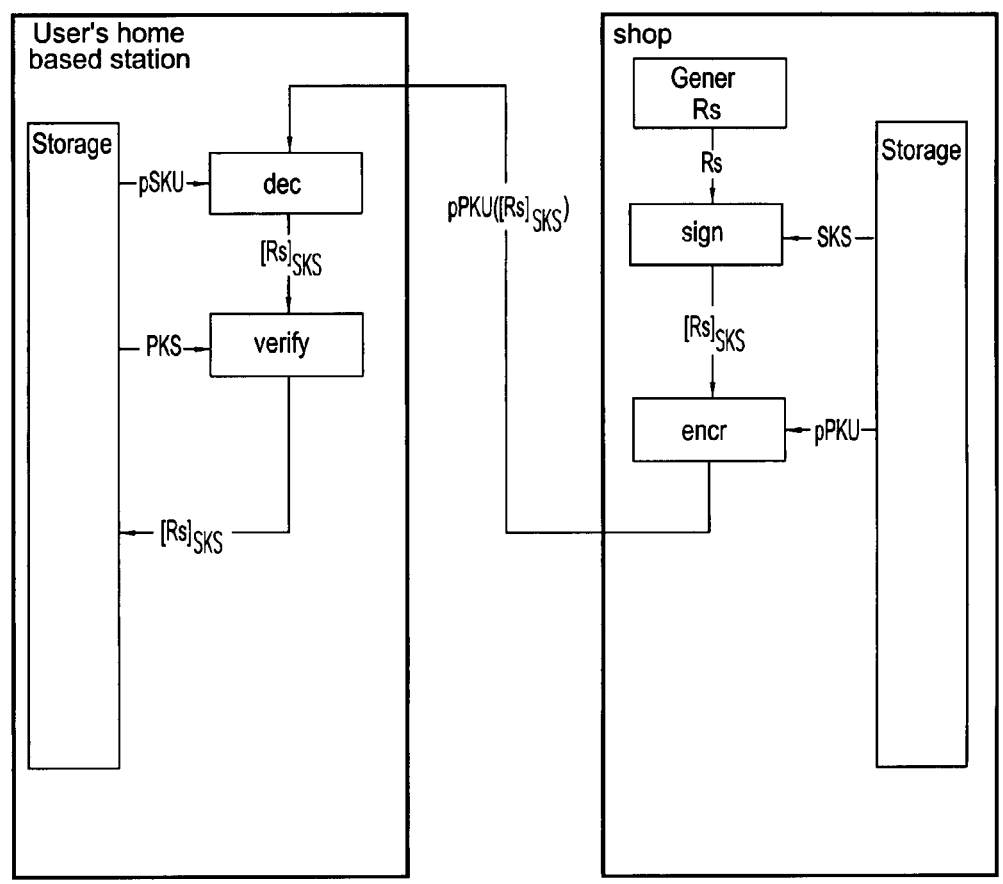
FIG. 50 is an exemplary payment process part 4 according to the sixth embodiment.

Referring to FIG. 50, if the signature is valid, the shop random number generating program generates a random number Rs and the signature generating program signs Rs with the shop's secret key SKS. The encryption program encrypts the signed random number [RS]$_{SKS}$ using the user's pseudonym public key pPKU and sends pPKU([RS]$_{SKS}$) to the user station.

The user based station receives pPKU([Rs]$_{SKS}$). The decryption program decrypt the information using the user's pseudonym secret key pSKU and stores [Rs]$_{SKS}$ in the storage device.

Figure 51:
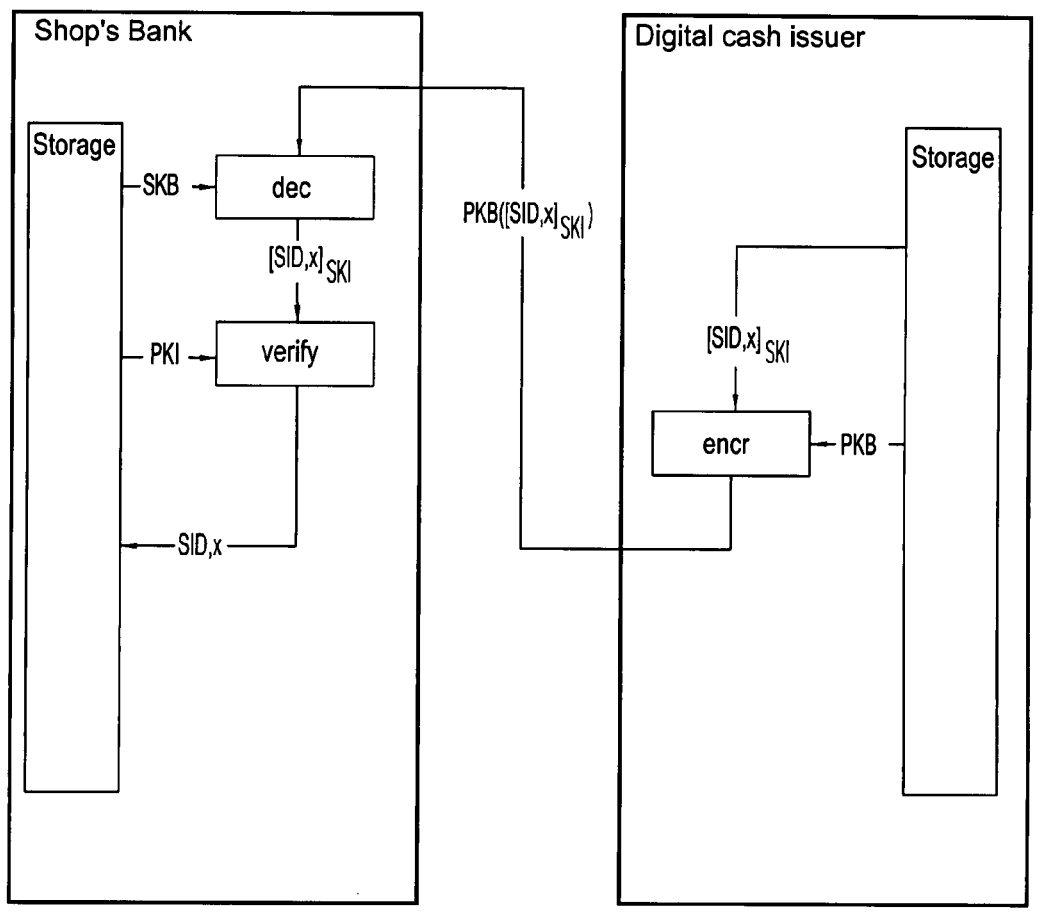
FIG. 51 is an exemplary payment process part 5 according to the sixth embodiment.

Referring to FIG. 51, the digital cash issuer retrieves the signed shop identification SID and the signed amount x to be deposited for the shop [SID,x]$_{SKI}$. The encryption program encrypts the information using the public key of the shop's bank PKB and sends PKB([SID,x]$_{SKI}$) to the shop's bank via a communications path The shop's bank receives PKB([SID,x]$_{SKI}$) and decryption program decrypts the information using the secret key SKB. The signature verifying program verifies the signature with the public key of the issuer PKI. If the signature is valid, the shop's bank adds the amount of money x to the shop account.

As mentioned, most of the conventional virtual account based digital cash protocols use blind signature to protect the privacy of the user which is not efficient and is vulnerable to fraud. In addition, some offline protocols do not use blind signature but still have deficiency in privacy protection and deficiency in authentications. The protocol provided herein may be implemented in a virtual account based digital cash system that provides: (i) strong protection of user's privacy (ii) authenticated protocol, (iii) traceability, and (iv) achieving all of these without using blind signature schemes.

The protocols described above provide strong protection of privacy for the user by separating information about the user's bank accounts identified with the real identity of the user from the information about digital cash virtual accounts of the same user under a pseudonym by using two pair of keys where one pair is linked to the real identity of the user, while the other pair is linked to the pseudonym identity of the user. The use of the two pair of keys allows the users to use one pair of keys for authenticating the user with an entity that holds information that is linked to the user's real identity such as a bank, and for encrypting information sent to the user by such entities. At the same time, the user can use another pair of keys to authenticate the user with an entity that holds information that is linked to the user's pseudonym identity such as an issuer of digital cash virtual accounts, and for encrypting information sent to the user by such entities.

Because there is no link between the master public key of the user with the pseudonym public key of the same user, there is no link between the real identity of the user and the user's pseudonym. The only exception to this is a certificate authority which certifies the pseudonym public key of a user given a user's master public key and id. There is no shared information about the user between the user's bank and the issuer of digital cash virtual accounts. The bank stores the user id and the amount of money, and the user's master pubic key as the user account information. The issuer of digital cash virtual accounts can store the user's pseudonym public key and the digital cash virtual accounts issued to the user. This separation makes it very difficult to link the real identity of the user with the user's pseudonym pubic key. Any leak of the private key of the bank or the issuer of digital cash virtual accounts is useless to break the privacy of the user. Since the user's master public key is not linked to digital cash virtual accounts and is not used for payments, the user's privacy is maintained. Therefore, strong protection is provided to maintain the user privacy without involving any blind signature scheme.

In the protocols described above, the user has two pair of keys wherein one pair represents master keys while the other pair represents pseudonym keys and wherein each public key is certified by a certifying authority using a separate certificate. Digital signatures with master keys are used for authentication with the certificate authority and the bank, wherein digital signatures with pseudonym keys are used for authentication with the issuer of digital cash virtual accounts and the shop. Since all transactions are authenticated using digital signatures, this prevents anyone from pretending to be someone else by providing information related to the real user. Traceability is ensured since (i) all transactions are made with certified public keys, (ii) a certifying authority can link the master public key with a pseudonym public key, and (iii) by keeping records of digital cash virtual accounts issued to/spent by user's pseudonym public key.

A number of exemplary implementations have been described. Nevertheless, it will be understood that various modifications may be made. For example, suitable results may be achieved if the steps of described techniques are performed in a different order and/or if components in a described system, architecture, device, or circuit are combined in a different manner and/or replaced or supplemented by other components. Accordingly, other implementations are within the scope of the following claims.

What is claimed is:

1. A computer assisted electronic cash implementing method providing a virtual account for a digital cash system utilizing a certificate authority, a bank and issuer of digital cash, said method comprising:

using a certificate authority's computer to provide two pair of certified keys from the certificate authority to a user including a master pair having a private key and a public key and pseudonym pair having a private and a public key;

using the user's computer and storing said private, master and pseudonym private keys as a secret, selecting a blinding function and corresponding unblinded functions that are secret to said user, applying said blinding function to face value X to obtain a blind number, BLIND (X), wherein said user signs BLIND (X), said user identification and a face value X using said user's master private key and using a digital signature method with message recovery, and shows said signed blinded number, BLIND (X), said user identification and said signed face value X to said bank and request said bank to issue digital cash E of said face value X;

said bank decrements send face value X from a bank account of said user associated with a real identity of said user, issues to said user, by a signature said digital cash E associated with said signed blinded value, BLIND (X), and corresponding to said face value X;

said user removes said user signature from said digital cash E by using message recovery to obtain digital cash D, uses said unblinding function that is secret to said user only to unblind digital cash D in order to obtain digital cash C, uses said unblinding function on blinded number, BLIND (X) to obtain unblinded number, UNBLIND (X), signs said digital cash C to obtain signed digital cash sC, signs UNBLIND (X) to obtain signed sUNBLIND (X), and said face value X to obtain signed face value X to obtain signed face value sX, all using pseudonym private key of said user, and shows said signed digital cash sC, said signed unblinded number sUNBLINDED (X), said digital cash C, said unblinded number UNBLIND (X), said face value, said signed face value X to said issuer of digital cash, and request said issuer of digital cash to credit a virtual bank account associated with said pseudonym public key of said user;

said issuer of digital cash verifies said user's pseudonym signature on said digital cash sC and said signed unblinded number sUNBLINDED (X) using said user's pseudonym public key, verifies said bank's signature on said digital cash C using said bank's public key of said digital cash face value X and said unblinded number UNBLIND (X), shows said digital cash C and said unblinded number UNBLIND (X) to said bank and requests payment from said bank, converts said digital cash C into a virtual based digital cash associated with said user's pseudonym pubic key upon receipt of payment from said bank;

said bank checks that said digital cash C associated to said unblinded number UNBLIND (X) which was sent by said issuer of digital cash has not been used before, and if it has been used, halts payment, and requests from said digital cash issuer said pseudonym public key used by said user in requesting digital cash C from said issuer of digital cash, and if it has not sends payment to said cash issuer;

spending by said user the digital cash from said virtual account using said pseudonym pair of keys.

2. The method of claim 1 further comprising:

certifying by a certificate authority the pseudonym public key of the user given a master public key and identification of the user.

3. The method of claim 1 wherein the user has one pair of master keys and a plurality of pairs of pseudonym keys and each public key is certified by a certifying authority using separate certificates.

* * * * *